(12) United States Patent
Filatov et al.

(10) Patent No.: US 11,686,319 B2
(45) Date of Patent: Jun. 27, 2023

(54) DOWNHOLE BLOWER SYSTEM WITH A PASSIVE MAGNETIC RADIAL BEARING ASSEMBLY

(71) Applicant: Upwing Energy, Inc., Cerritos, CA (US)

(72) Inventors: Alexei Filatov, Irvine, CA (US); Larry Hawkins, Cerritos, CA (US)

(73) Assignee: Upwing Energy, Inc., Cerritos, CA (US)

( * ) Notice: Subject to any disclaimer, the term of this patent is extended or adjusted under 35 U.S.C. 154(b) by 192 days.

(21) Appl. No.: 16/673,896

(22) Filed: Nov. 4, 2019

(65) Prior Publication Data

US 2020/0072030 A1 Mar. 5, 2020

Related U.S. Application Data

(63) Continuation of application No. 15/392,258, filed on Dec. 28, 2016, now Pat. No. 10,465,489.

(51) Int. Cl.
| | | |
|---|---|---|
| F04D 29/058 | (2006.01) | |
| F04D 19/02 | (2006.01) | |
| F04D 25/06 | (2006.01) | |
| H02K 7/09 | (2006.01) | |
| F04D 13/10 | (2006.01) | |

(Continued)

(52) U.S. Cl.
CPC .......... *F04D 29/058* (2013.01); *E21B 43/122* (2013.01); *E21B 43/128* (2013.01); *E21B 43/16* (2013.01); *F04D 13/10* (2013.01); *F04D 17/12* (2013.01); *F04D 19/02* (2013.01); *F04D 25/06* (2013.01); *F04D 25/0606* (2013.01); *F04D 25/0686* (2013.01); *F04D 29/668* (2013.01); *H02K 5/132* (2013.01); *H02K 7/09* (2013.01);
(Continued)

(58) Field of Classification Search
CPC .................................................. F04D 25/0633
See application file for complete search history.

(56) References Cited

U.S. PATENT DOCUMENTS

| | | | |
|---|---|---|---|
| 4,091,687 A | 5/1978 | Meinke et al. | |
| 5,547,350 A * | 8/1996 | Rawal ................. | F04D 25/0606 |
| | | | 417/354 |

(Continued)

FOREIGN PATENT DOCUMENTS

| | | |
|---|---|---|
| GB | 2501352 | 10/2013 |
| WO | 94/29597 | 12/1994 |

OTHER PUBLICATIONS

International Search Report and Written Opinion of the International Searching Authority issued in International Application No. PCT/US2017/068102 dated Mar. 21, 2018, 14 pages.

(Continued)

*Primary Examiner* — Nathan C Zollinger
*Assistant Examiner* — Timothy P Solak
(74) *Attorney, Agent, or Firm* — Fish & Richardson P.C.

(57) ABSTRACT

A blower can be positioned in a wellbore. The blower rotatably drives or is driven by a fluid produced through the well bore. An electric machine can be positioned downhole of the blower, the electric machine configured to rotatably drive or be driven by the blower. A bearing shaft couples the blower and the electric machine. The bearing shaft transfers rotation between the blower and the electric machine. A passive magnetic radial bearing assembly magnetically supports the bearing shaft.

19 Claims, 33 Drawing Sheets

(51) Int. Cl.
*F04D 17/12* (2006.01)
*E21B 43/16* (2006.01)
*H02K 5/132* (2006.01)
*H02K 7/14* (2006.01)
*E21B 43/12* (2006.01)
*F04D 29/66* (2006.01)
*F04D 13/04* (2006.01)
*F04D 13/08* (2006.01)

(52) U.S. Cl.
CPC ............... *H02K 7/14* (2013.01); *F04D 13/04* (2013.01); *F04D 13/086* (2013.01); *F04D 25/062* (2013.01)

(56) References Cited

U.S. PATENT DOCUMENTS

| | | | | |
|---|---|---|---|---|
| 5,679,992 | A | * | 10/1997 | Miyamoto ............ F04D 29/668 310/90.5 |
| 2004/0075355 | A1 | * | 4/2004 | Ries ......................... H02K 7/09 310/90.5 |
| 2005/0140228 | A1 | * | 6/2005 | Yeh ..................... F16C 32/0425 310/90.5 |
| 2008/0074010 | A1 | * | 3/2008 | Jungmayr ........... F04D 25/0653 318/632 |
| 2010/0127589 | A1 | * | 5/2010 | Kummeth ............. F16C 32/044 310/90.5 |
| 2011/0052432 | A1 | | 3/2011 | Cunningham et al. |
| 2014/0199179 | A1 | * | 7/2014 | Da Silva ................. F04D 25/16 310/90.5 |
| 2015/0114632 | A1 | | 4/2015 | Romer et al. |
| 2016/0273324 | A1 | * | 9/2016 | Yamaguchi ........... E21B 43/129 |

OTHER PUBLICATIONS

Examination report issued in Gulf Cooperation Application No. 2017-34534 dated Nov. 14, 2019, 4 pages.
Office Action in Australian Appln. No. 2017387014, dated Jan. 11, 2023, 4 pages.

\* cited by examiner

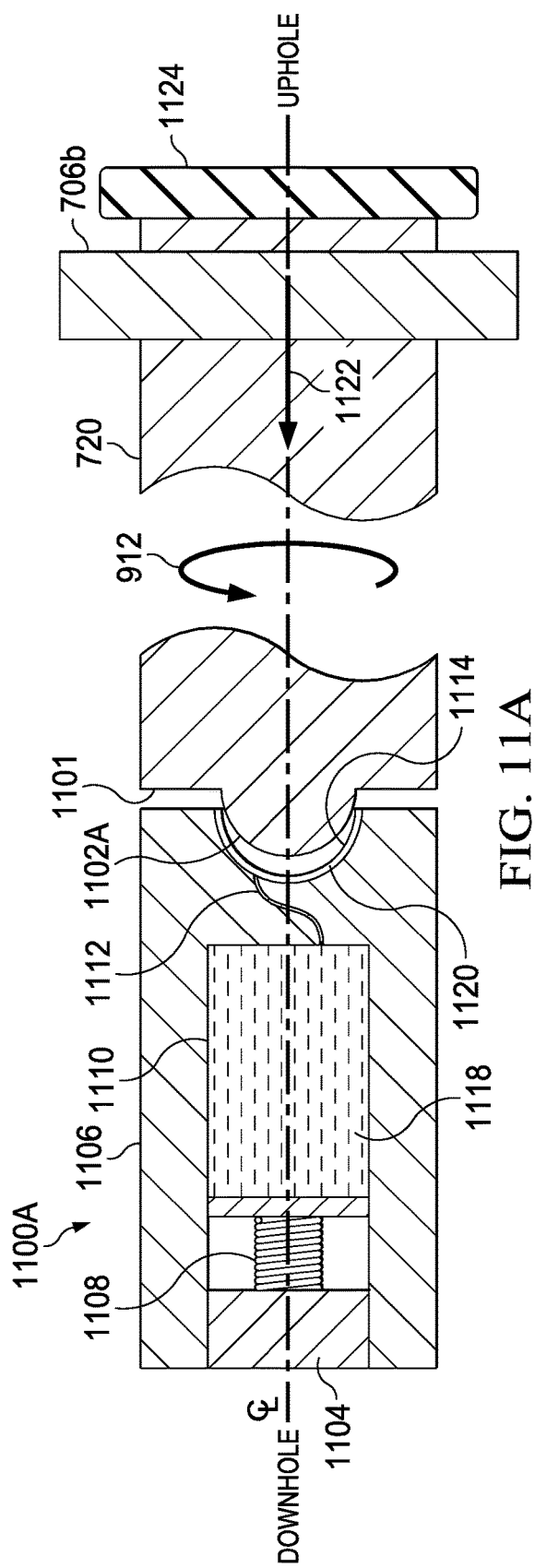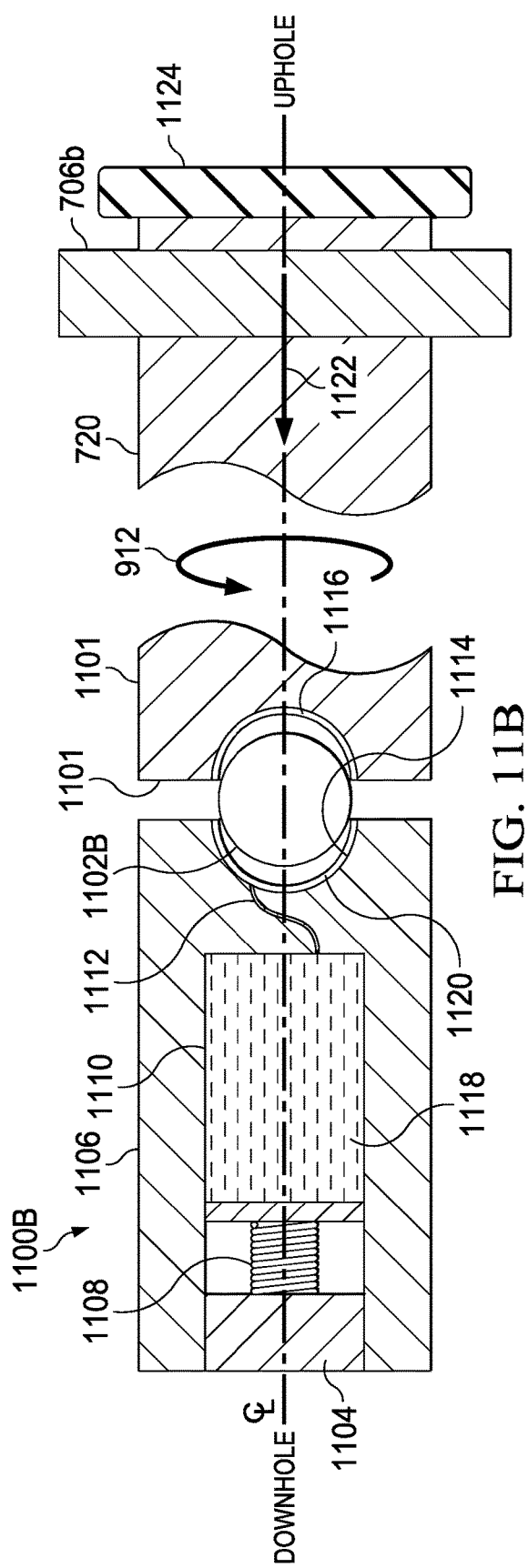
FIG. 11A
FIG. 11B

DOWNHOLE BLOWER SYSTEM WITH A PASSIVE MAGNETIC RADIAL BEARING ASSEMBLY

CROSS-REFERENCE TO RELATED PATENT APPLICATIONS

This application is a continuation of and claims the benefit of priority to U.S. patent application Ser. No. 15/392,258, filed Dec. 28, 2016, now U.S. patent Ser. No. 10/465,489, the contents of which are incorporated by reference herein.

BACKGROUND

Most wells behave characteristically different over time, as well as seasonally, due to geophysical, physical, and chemical changes in the subterranean reservoir that feeds the well. For example, it is common for well production to decline as the well reaches the end of its life. This decline in production is due to declining pressures in the reservoir, and can eventually reach a point where there is not enough pressure in the reservoir to push production through the well to the surface. In gas wells, a top side compressor is sometimes used to extend the life of the well by decreasing pressure at the top of the well. This decrease in pressure decreases the pressure head on the production flowing to the surface, enabling the well to continue producing when the reservoir pressures have dropped too low to drive the production to the surface.

SUMMARY

This disclosure describes boosting well production.

Certain aspects of the subject matter described here can be implemented as a downhole-type blower system. A blower can be positioned in a wellbore. The blower rotatably drives or is driven by a fluid produced through the wellbore. An electric machine can be positioned downhole of the blower, the electric machine configured to rotatably drive or be driven by the blower. A bearing shaft couples the blower and the electric machine. The bearing shaft transfers rotation between the blower and the electric machine. A passive magnetic radial bearing assembly magnetically supports the bearing shaft.

The bearings shaft is made from a non-magnetic material. The bearing shaft includes a shaft magnet assembly that includes multiple axially-magnetized magnets. The multiple axially-magnetized magnets are radially imbedded into the bearing shaft. The multiple axially-magnetized magnets are arranged so that magnet polarities alternate along an axis of the bearing shaft. An exterior surface the shaft magnet assembly is substantially flush with an outer surface of the bearing shaft. A stator magnet assembly surrounds the bearing shaft. The stator magnet assembly includes multiple stator magnets. Identical poles of the multiple stator magnets and the multiple axially-magnetized magnets are substantially in line with one another.

The multiple stator magnets are separated from each other by a first set of multiple spacers. The multiple axially-magnetized magnets are separated from each other by a second set of multiple spacers. The first plurality of spacers and the second plurality of spacers are non-magnetic and electrically non-conductive. The plurality of stator magnets and the plurality of axially-magnetized magnets are axially offset from each other.

The passive magnetic radial bearing assembly is a first passive magnetic radial bearing assembly. The downhole-type blower system also includes a plurality of passive magnetic radial bearing assemblies that magnetically support the bearing shaft. The multiple passive magnetic radial bearing assemblies include the first passive mag radial bearing assembly.

An active damper is coupled to the bearing shaft. The damper can damp a vibration of the bearing shaft responsive to transferring the rotation between the blower and the electric machine. The active damper assembly includes a damper magnet coupled to the bearing shaft. The damper magnet is positioned between the plurality of radial bearing assemblies. The vibration of the bearing shaft induces an induced vibration in the damper magnet. A first damper magnet pole shoe and a second damper magnet pole shoe are coupled to a first pole and a second pole, respectively of the damper magnet. The first damper magnet pole shoe and the second damper magnet pole shoe maintain uniformity of magnetic fields generated by the damper magnet. A damper sleeve is positioned over the outer diameters of the damper magnet, the first damper magnet pole shoe, and the second damper magnet pole shoe. Multiple radial velocity sensing coils are placed in a plane adjacent to the first damper magnet pole shoe and coupled to a first pole of the damper magnet. The multiple radial velocity sensing coils are exposed to a magnetic field emanated from the first pole of the damper magnet. A radial movement of the damper magnet induces an electrical voltage in the multiple radial velocity sensing coils. The damper magnet is a first damper magnet facing the multiple radial velocity sensing coils with the first pole. The system further includes a second damper sensing magnet positioned axially opposite the multiple radial velocity sensing coils and oriented to face the plurality of radial velocity sensing coils with a pole opposite the first pole. Multiple radial damper actuator coils are placed in a second plane adjacent to the second damper magnet pole shoe and coupled to a second pole of the damper magnet. the multiple radial damper actuator coils are exposed to a magnetic field emanated from the second pole of the damper magnet. An electrical current in the multiple radial damper actuator coils causes a force to be exerted on the damper magnet. The damper magnet is a first damper magnet facing the multiple radial damper actuator coils with the second pole, and wherein the system further comprises a second damper sensing magnet positioned on axially opposite the plurality of radial damper actuator coils and oriented to face the multiple radial damper actuator coils with a pole opposite the second pole. A first printed circuit board (PCB) can include the multiple radial velocity sensing coils. A second printed circuit board (PCB) can include the multiple radial damper actuator coils.

Certain aspects of the subject matter described here can be implemented as a method. a shaft is centrally positioned within a downhole-type blower system that includes a blower and an electric machine with a passive magnetic bearing assemblies coupled to the shaft and the downhole-type blower system. The shaft is rotated within the downhole-type blower system positioned within a wellbore. The shaft is axially pre-loaded towards a thrust bearing assembly attached to a downhole end of the shaft. The thrust bearing assembly can support the pre-loading.

Certain aspects of the subject matter described here can be implemented as a downhole-type compressor system. A compressor can be positioned in a wellbore. The compressor rotatably drives a fluid produced through the wellbore. An electric machine can be positioned downhole of the compressor. The electric machine rotatably drives the compressor. A bearing shaft couples the compressor and the electric machine. The bearing shaft transfers rotation between the compressor and the electric machine. A passive magnetic radial bearing assembly magnetically supports the bearing shaft. An active electronic damper assembly is coupled to the bearing shaft. The damper assembly can damp a vibration of the bearing shaft responsive to transferring the rotation between the compressor and the electric machine.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIG. 11A is a lateral cross-sectional view of a pin bearing assembly.

FIG. 11B is a lateral cross-sectional view of an alternative pin bearing assembly.

Like reference symbols in the various drawings indicate like elements.

DETAILED DESCRIPTION

Figure 1:
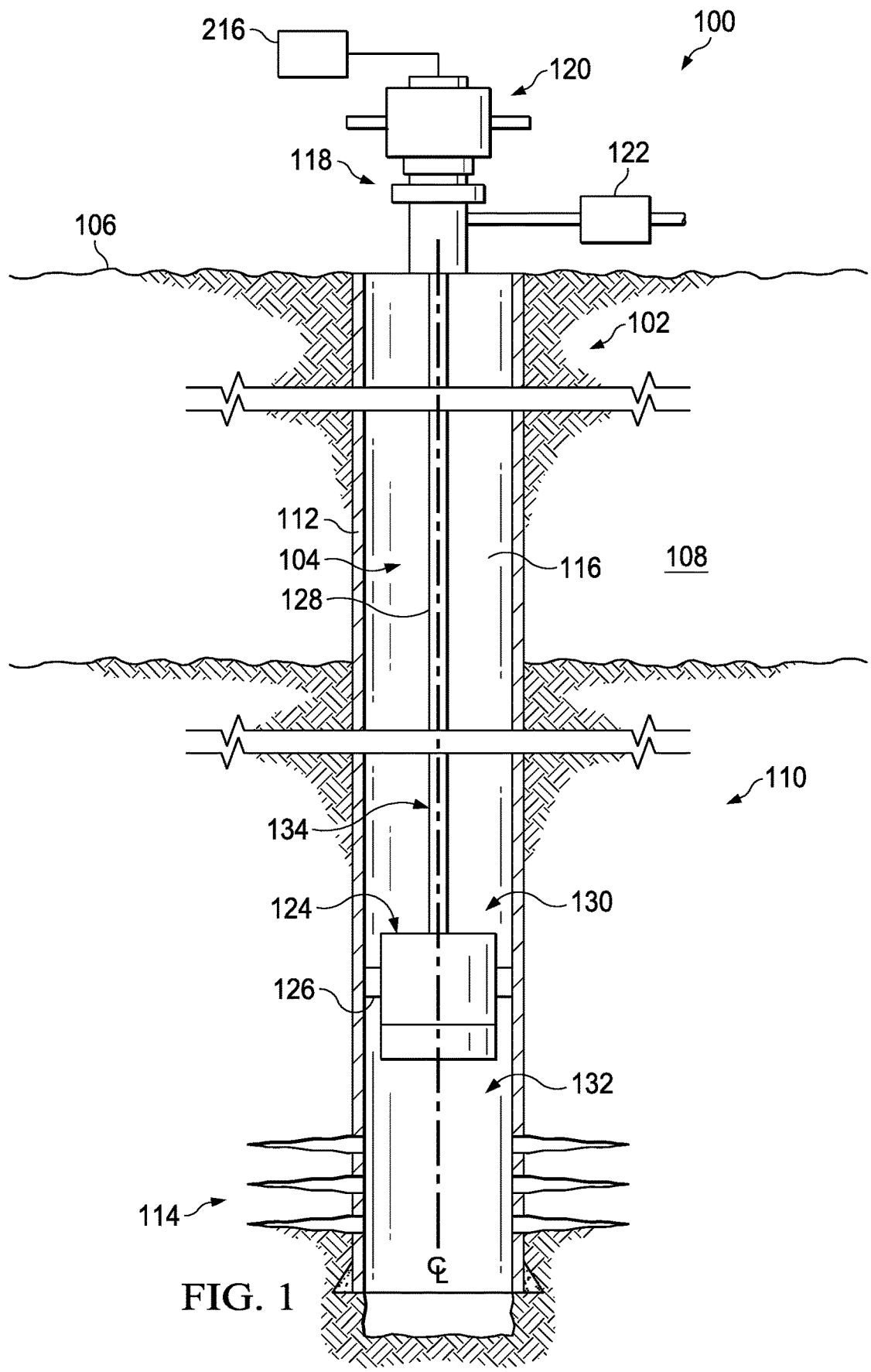
FIG. 1 is a schematic side view of an example well system including a downhole blower.

FIG. 1 depicts an example well system 100 constructed in accordance with the concepts herein. The well system 100 includes a well 102 having a wellbore 104 that extends from the terranean surface 106 through the earth 108 to one more subterranean zones of interest 110 (one shown). The well system 100 enables access to the subterranean zones of interest 110 to allow recovery, i.e., production, of fluids to the surface 106 and, in certain instances, additionally or alternatively allows fluids to be placed in the earth 108. In certain instances, the subterranean zone 110 is a formation within the Earth defining a reservoir, but in other instances, the zone 110 can be multiple formations or a portion of a formation. For simplicity sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downward into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadingly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

FIG. 1 shows a surface compressor 122 residing on the terranean surface 106 and fluidly coupled to the well 102 through the Christmas tree 120. The surface compressor 122 can include a variable speed or fixed speed compressor. The well system 100 also includes a downhole-type blower system 124 residing in the wellbore 104, for example, at a depth that is nearer to subterranean zone 110 than the terranean surface 106. The surface compressor 122 operates to draw down the pressure inside the well 102 at the surface 106 to facilitate production of fluids to the surface 106 and out of the well 102. The downhole blower system 124, being of a type configured in size and robust construction for installation within a well 102, assists by creating an additional pressure differential within the well 102. In particular, casing 112 is commercially produced in a number of common sizes specified by the American Petroleum Institute (the "API), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole blower system 124 can be configured to fit in, and (as discussed in more detail below) in certain instances, seal to the inner diameter of one of the specified API casing sizes. Of course, the downhole blower system 124 can be made to fit in and, in certain instances, seal to other sizes of casing or tubing or otherwise seal to the wall of the wellbore 104.

Additionally, as a downhole type blower system 124, the construction of its components are configured to withstand the impacts, scraping, and other physical challenges the blower system 124 will encounter while being passed hundreds of feet/meters or even multiple miles/kilometers into and out of the wellbore 104. For example, the downhole-type blower system 124 can be disposed in the wellbore 104 at a depth of up to 15,000 feet (4572 meters). Beyond just a rugged exterior, this encompasses having certain portions of any electronics being ruggedized to be shock resistant and remain fluid tight during such physical challenges and during operation. Additionally, the downhole blower system 124 is configured to withstand and operate for extended periods of time (e.g., multiple weeks, months or years) at the pressures and temperatures experienced in the wellbore 104, which temperatures can exceed 400° F./205° C. Finally, as a downhole type blower system 124, the blower system 124 can be configured to interface with one or more of the common deployment systems, such as jointed tubing (i.e., lengths of tubing joined end-to-end, threadingly and/or otherwise), coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (e.g., positioning connector 728 discussed below, which can be a jointed tubing connector, coiled tubing connector, or wireline connector). In FIG. 1, the blower system 124 is shown deployed on wireline 128.

A seal system 126 integrated with the downhole-type blower system 124, as shown, or provided separately, divides the well 102 into an uphole zone 130 above the seal system 126 and a downhole zone 132 below the seal system 126. FIG. 1 shows the downhole-type blower system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas tight seal at the pressure differential the blower system 124 creates in the well 102. In some instances, the seal system 126 of the downhole-type blower system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type blower system 124 from a pressure in the wellbore 104 uphole of the seal system 126 of the downhole-type blower system 124. Although FIG. 1 includes both the surface compressor 122 and the blower system 124, in other instances, the surface compressor 122 can be omitted and the blower system 124 can provide the entire pressure boost in the well 102.

In some implementations, the downhole type blower system 124 can be implemented to alter characteristics of a wellbore by a mechanical intervention at the source. Alternatively or in addition to any of the other implementations described in this specification, the downhole type blower system 124 can be implemented as a high flow, low pressure rotary device for gas flow in sub-atmospheric wells. Alternatively or in addition to any of the other implementations described in this specification, the downhole type blower system 124 can be implemented in a direct well-casing deployment for production through the wellbore.

The downhole blower system 124 locally alters the pressure, temperature, and/or flow rate conditions of the gas in the wellbore 104 proximate the blower system 124 (e.g., at the base of the wellbore 104). In certain instances, the alteration performed by the blower system 124 can optimize or help in optimizing gas flow through the wellbore 104. As described above, the downhole-type blower system 124 creates a pressure differential within the well 102, for example, particularly within the wellbore 104 the blower system 124 resides in. In some instances, a pressure at the base of the wellbore 104 is a low pressure (e.g., sub-atmospheric); so unassisted gas flow in the wellbore can be slow or stagnant. In these and other instances, the downhole-type blower system 124 introduced to the wellbore 104 adjacent the perforations 114 can reduce the pressure in the wellbore 104 near the perforations 114 to induce greater gas flow from the subterranean zone 110, increase a temperature of the gas entering the blower system 124 to reduce condensation from limiting production, and increase a pressure in the wellbore 104 uphole of the blower system 124 to increase gas flow to the surface 106.

The blower system 124 moves the gas at a first pressure downhole of the blower to a second, higher pressure uphole of the blower system 124. The blower system 124 can operate at and maintain a pressure ratio across the blower system 124 between the second, higher uphole pressure and the first, downhole pressure in the wellbore. The pressure ratio of the second pressure to the first pressure can also vary, for example, based on an operating speed of the blower system 124, as described in more detail below. In some instances, the pressure ratio across the blower system 124 is less than 2:1, where a pressure of the gas uphole of the blower system 124 (i.e., the second, higher pressure) is at or below twice the pressure of the gas downhole of the blower system 124 (i.e., the first pressure). For example, the pressure ratio across the blower system 124 can be about 1.125:1, 1.5:1, 1.75:1, 2:1, or another pressure ratio between 1:1 and 2:1. In certain instances, the blower system 124 is configured to operate at a pressure ratio of greater than 2:1.

The downhole-type blower system 124 can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The blower system 124 can operate in sub-atmospheric wellbore pressures, for example, at wellbore pressure between 2 psia (13.8 kPa) and 14.7 psia (101.3 kPa).

Figure 2A:
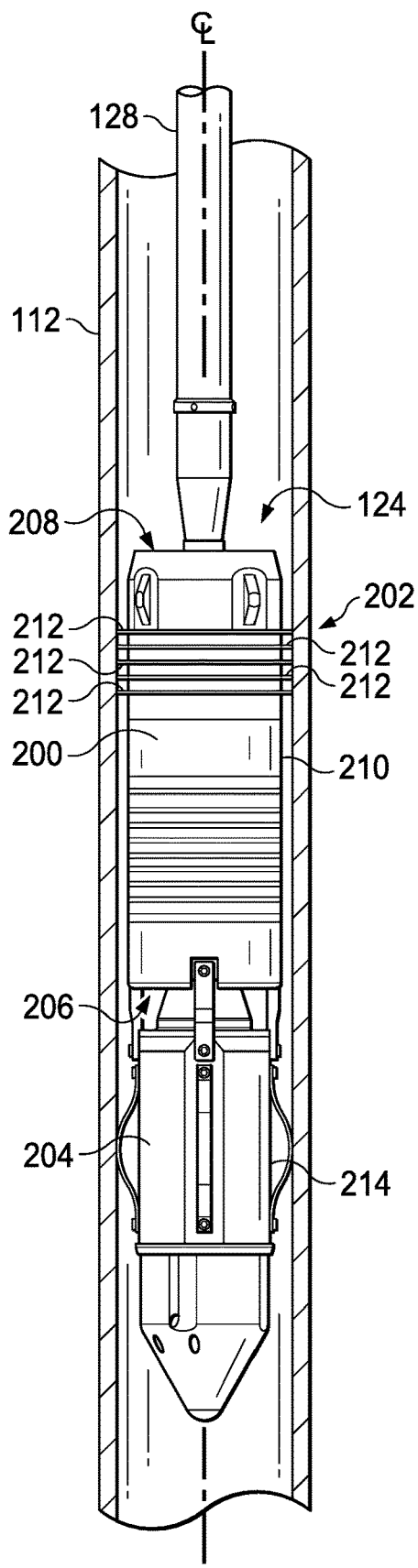
FIGS. 2A and 2B are partial side views of example downhole-type blower systems in a wellbore.

The blower system 124 is shown schematically in FIG. 1. FIG. 2A is a partial side view of the example blower system 124 disposed in the casing 112 of the wellbore 104 of FIG. 1. Referring to both FIGS. 1 and 2A, the example blower system 124 includes a blower 200, seal system 202, and an electric machine 204. The blower 200 includes an inlet 206 to receive a gas at the first pressure downhole of the blower 200 and an outlet 208 to output the gas at the second, higher pressure uphole of the blower 200. A blower housing 210 houses an impeller (not shown) in fluid communication with the inlet 206 to receive the gas from the wellbore 104 at the first pressure downhole of the blower 200 and to direct the gas to the outlet 208 at the second, higher pressure uphole of the blower 200. With the blower system 124 residing in the wellbore 104, the inlet 206 is at a downhole end of the blower 200, downhole from the seal system 202, and the outlet 208 is at an uphole end of the blower 200 on an opposite side of the seal system 202. In some instances, the blower system 124 can be positioned in the well with the downhole inlet 206 positioned adjacent to the perforations 114 in the wellbore 104. For example, the blower 200 can be positioned in the wellbore 104 such that the inlet 206 is disposed next to and immediately uphole of the perforations 114 to maximize or improve the gas flow from the perforations into the blower 200. In some examples, the inlet 206 may not be adjacent to perforations 114, such as the inlet 206 being positioned greater than about twenty feet away from the perforations 114. In some instances, a speed of the blower 200 is adjusted based on the gas flow from the subterranean zone into the wellbore 104 (e.g., via perforations 114). For example, as the gas flow from the subterranean zone into the wellbore 104 decreases, a speed of the blower 200 can increase to draw more gas flow from the subterranean zone into the wellbore 104.

The blower system 124 moves the gas from the downhole inlet 206 at the first pressure to the uphole outlet 208 at the second, higher pressure. This pressure differential promotes the gas flow to move uphole of the blower system 124, for example, at a higher flow rate compared to a flow rate in a wellbore without a downhole-type blower. The blower 200 can operate at a variety of speeds, for example, where operating at higher speeds increases fluid flow, and operating a lower speeds reduces fluid flow. For example, the impeller of the blower 200 can operate at speeds up to 120,000 revolutions per minute (rpm), yet be run at lower speeds (e.g., 40,000 rpm, or other) for a lower flow based on the well conditions and response. While the blower system has an optimal speed range at which it is most efficient, this does not prevent the blower system from running at less efficient speeds to achieve a desired flow for a particular well.

The electric machine 204 is connected to the blower 200 to drive the blower 200. The electric machine 204 can include an electric motor, such as a sensorless motor, a synchronous motor, and/or other electric motor type. For example, the electric motor can include a permanent magnet motor, a four-pole electric motor, and/or other electric motor arrangement. The electric machine 204 can connect to the blower 200 in a variety of ways. In some examples, the electric machine 204 can include a direct-drive electric motor coupled to a rotor of the blower 200, as described in more detail below, or the electric machine 204 and blower 200 can connect without a direct-drive arrangement. For example, the electric machine 204 can connect to a rotor of the blower 200 on a single, unitary shaft, with a shaft-rotor coupling or other 1:1 gear train, without a gearbox, or using another arrangement type, as described in more detail below. In some examples, as explained in more detail below, the electric machine 204 is an electric motor and a generator, where the electric machine 204 can operate in an electric motor mode to provide energy to a blower or a generator mode to receive energy from a blower. Although the electric machine 204 is shown in FIG. 2A as disposed downhole of the blower 200, the electric machine 204 can be positioned elsewhere, for example, uphole of the blower 200 or integral with the blower 200. The electric machine 204 can include a motor housing 214 to house the electric machine 204 (e.g., electric motor). In some instances, the motor housing 214 surrounds the electric motor of the electric machine, and absorbs heat (e.g., excess heat) from the electric motor during operation of the electric motor. The motor housing 214 can conduct heat from the electric motor of the electric machine 204 to the process gas in the wellbore 104, for example, to increase a temperature of the gas in the wellbore 104 close to and in contact with the motor housing 214. In some examples, the housing 214 is not thermally insulated from a stator of the electric motor and/or other heat producing portions of the electric motor. For example, the stator can be in conductive heat transfer with the housing 214, and in some instances, touching along its entire length or nearly its entire length fins on an exterior of the housing 214, where the fins contact the fluid in the wellbore 104. In certain instances, the portion of the housing 214 that contacts the fluid is above the motor, so as heat rises, it is transferred at least in part to the process fluid in the wellbore 104. Increasing the temperature of the gas can decrease a liquid content or condensation of the process gas entering the blower 200, reduce or prevent a condensation barrier forming in the gas flow path, reduce a condensation of moisture of the gas flow uphole of the blower system 124, and/or other benefits of increasing the gas temperature proximate the motor housing 214.

As shown, the electric machine 204 connects to a power source 216 at the well terranean surface 106 via conductor wires (not shown) adjacent to or within the conveyance 134 (e.g., wireline 128) extending between the electric machine 204 and the well surface 106. In some instances, the electric machine 204 includes a power source integral to or adjacent to the electric machine 204 to power the electric machine 204 to drive the blower 200. For example, the power source can include the generator, as described both above and below, and/or a local power source (e.g., battery) disposed downhole in the wellbore 104.

The seal system 202 is like the seal system 126 of FIG. 1, and isolates (substantially or completely) the first pressure downhole of the blower system 124 from the second wellbore pressure uphole of the blower system 124. The seal system 202 can take a variety of forms. FIG. 2A shows the seal system 202 as including multiple annular disk seals 212 on an exterior of the blower 200 to engage a wall of the casing 112 or an open hole wall of the wellbore 104. An outer diameter of the annular disk seal or seals 212 can be the same (substantially or exactly) or just larger than an inner diameter of the interior wall of the wellbore or casing. FIG. 2A shows five disk seals 212, but a different number of disk seals 212 can be utilized. For example, the seal system 202 can include any number of disk seals 212 (e.g., one, two, four, ten, or any other number of disk seals). The disk seals 212 can each be made of the same material, or one or more of the disk seals 212 can be a different material. The material of the disk seals 212 can vary, for example, to maintain the seal with the interior wall of the casing 112 or wellbore 104 while accounting for a wide range of downhole condition variances, such as temperature, pressure, vibration, and/or other variances. In some examples, a first disk seal includes a rubber polymer that can seal with an inner wall of the casing 112 or wellbore 104 while allowing some flex of the first disk seal. For example, a disk seal material can include a soft inert material, such as Viton™ or Teflon™. A second disk seal can include leather or Neoprene rubber. Disk seal materials can vary for compatibility with the well gas composition to meet life requirements, durability and survivability for depth of deployment, toughness in maintaining material and shape during deployment and/or engagement with (e.g., rubbing, sliding, or other) the wall of the wellbore or casing, ability to deal with sand and muck on the wall of the wellbore or casing, and/or temperature capability for an install location of the well, to name a few. The use of multiple materials allows benefiting characteristics of each material to be matched with the well in order to ensure a good seal that can maintain the pressure differential between the inlet and the outlet of the blower. Multiple disk seals 212 of different materials can strengthen the gas tight seal between the seal system 202 and the inner wall of the casing 112 or wellbore 104, for example, by including multiple materials that can respond differently to varying wellbore conditions. For example, a first disk seal material can be selected for maintaining a gas-tight seal at high or low temperatures better than other materials, a second disk seal material can be selected for maintaining a gas-tight seal at high or low pressures better than other materials, a third disk seal material can be selected for maintaining a gas-tight seal at high vibration better than other materials, and so on. At least one disk seal can be used for at least one of the variety of wellbore environments that the seal system 202 may be exposed to during operation of the blower system 124, such as high pressure, low pressure, high temperature, low temperature, high vibration, low vibration, and/or other wellbore environments. In some instances, the seal system 202 can be different. For example, the seal system 202 can include an actuatable annular packer seal configured to engage and seal against the inner surface of the wellbore 104, as described in more detail below.

In the example well system 100 of FIG. 1, the blower system 124 is supported in the wellbore 104 at least in part by a blind conveyance 134, which extends from the surface of the well 102 to support the blower system 124. The blind conveyance 134 connects to the blower system 124 and supports the blower system 124 within the wellbore 104, and excludes a fluid flow pathway for fluid flow. For example, the blind conveyance 134 excludes a production tubing that connects an interior of the production tubing to a gas flow outlet of the blower system 124. Instead, the blind conveyance 134 supports the blower system 124 in the wellbore without taking in the gas flow output from the blower system 124. For example, the blind conveyance 134 can include the common deployment systems discussed above, such as coiled tubing, jointed tubing, or wireline 128. In some instances, the blind conveyance 134 includes a seal passageway for electrical conductors extending between a surface of the well 102 and the blower system 124. In the example well system 100 of FIG. 1, the blind conveyance 134 includes the wireline 128.

Figure 2B:
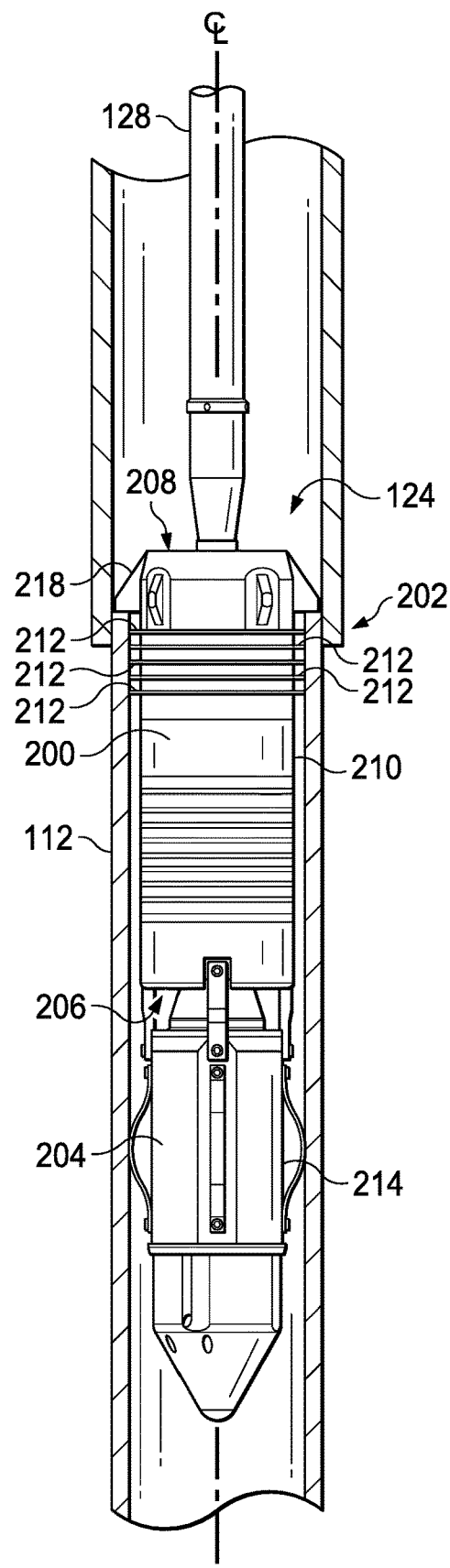

In some instances, as shown in FIG. 2B, the blower system 124 is supported in the wellbore 104 at least in part by a solid stop 218 against a wall of the wellbore 104 or casing 112. FIG. 2B is a partial side view of the example blower system 124 disposed in the casing 112 of the wellbore 104 of FIG. 1. The blower system 124 of FIG. 2B is the same as the blower system 124 of FIG. 2A, except that the blower system 124 is supported in the wellbore 104 by the solid stop 218. The solid stop 218 functions to support the blower system 124 in the wellbore 104 with or without a conveyance from a top surface of the well 102. The solid stop 218 is shown schematically in FIG. 2B, but the solid stop 218 can take a variety of forms. For example, the solid stop 218 can include a collar stop, a shoulder of the blower assembly 124 configured to engage an annular seat in the casing 112, a spider configured to engage a wall of the wellbore 104 (e.g., the casing 112 and/or other wall), slips that actuate to grip the wall of the wellbore 104 (e.g., the casing 112 and/or other wall), and/or another solid stop type.

The blower system 124 outputs a gas flow uphole of the blower system 124 toward the terranean surface 106 of the well 102. The gas flow is outputted from the blower system 124 to be in contact with the inner wall of the wellbore 104 and/or the inner wall of the casing 104 uphole of the blower system 124. In other words, the gas flow exits the blower system 124 to the open bore 116, or an open space of the wellbore 104 uphole of the blower system 124. The gas is not collected by a separate conduit positioned within the wellbore or casing. The blower system 124 boosts the gas flow within the wellbore 104 toward the well surface, for example, without conveying the gas flow output from the blower system 124 through production tubing or other open conveyance tubing. Instead, the blower system 124 boosts the gas flow within the wellbore 104, where the gas flow remains within the open space of the wellbore 104 and in contact with the inner wall of the wellbore 104 or casing 112 as it flows toward the terranean surface 106 of the well 102.

Figure 3A:
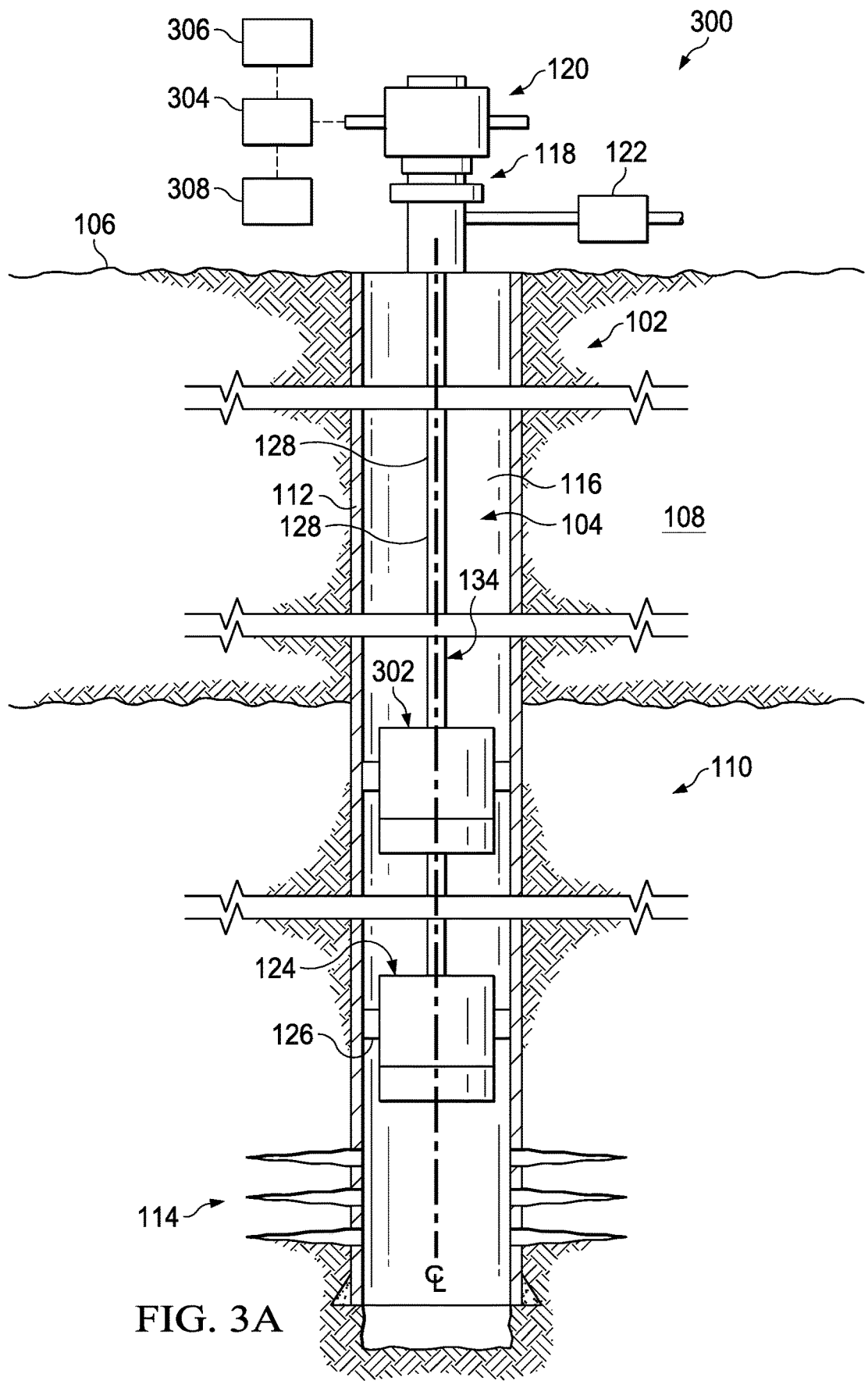
FIG. 3A is a schematic side view of an example well system including multiple downhole blowers.

Alternatively or in addition to any of the other implementations described in this specification, the downhole type blower system 124 can be implemented for integrated control of topside and downhole blowers. FIG. 3A is a schematic side view of an example well system 300. The well system 300 is like the well system 100 of FIG. 1, except the well system 300 includes a second blower system 302 supported in the wellbore 104 on the wireline 128 uphole of the (first) blower system 124. The second blower system 302 is positioned in the wellbore 104 between the first blower system 124 and the surface compressor 122 (e.g., surface blower). In other words, the first blower system 124 and the second blower system 302 are disposed in the wellbore 104 in series. Also, the surface compressor 122 is disposed in series with the first blower system 124 and the second blower system 302, with respect to the gas flow. In a multilateral well, as described in more detail below, the blower systems can be arranged differently, such as in parallel, or a combination of parallel and series arrangements of blower systems. The first blower system 124 and the second blower system 302 can operate separately or simultaneously to boost gas flow in the wellbore 104 to the terranean surface 106 of the well 102 and optimize or help in optimizing production through the well system 300. Each blower system creates a pressure differential in the wellbore 104 by locally altering the fluid flow, fluid pressures, fluid temperatures, and/or other characteristics of the fluid flow to optimize or improve the fluid flow through the wellbore 104. Although the well system 300 of FIG. 3A shows two downhole-type blower systems with a surface compressor 122 outside of the wellbore 104, the well system 300 can include additional blower systems (i.e., three or more) disposed within the wellbore 104, and/or can omit the surface compressor 122 so the one or more blower systems residing in the wellbore 104 provide the entire pressure boost in the well 102. In some examples, the blower systems are disposed in the wellbore 104 such that a distance between two adjacent blower systems is a maximum distance of 16,000 feet (4880 meters) and a minimum distance of two feet (0.6 meters) apart from one another. However, the distance between the blower systems can vary. For example, the distance between the blower systems can be selected based on an expected or desired pressure ratio at a downhole location in the wellbore 104. In some examples, the distance between blower systems can be selected based on a pressure head the blower system or systems expect to overcome, for example, so a lower blower system in the wellbore has enough pressure to communicate the fluid flow to an upper blower system (i.e., blower system more uphole than the lower blower system). In the example well system 300 of FIG. 3A, the first blower system 124 is nearer to the perforations 114 through which the production fluid (e.g., gas) enters the wellbore 104 than the terranean surface 106. The second blower system 302 of the example well system 300 can be nearer to the surface 106 than the perforation 114, or nearer to the perforations 114 than to the surface 106. However, the locations of the blower systems 124 and 302 residing in the wellbore 104 can vary, as described above.

As described above, the first blower system 124 includes a blower, a seal system, and an electric machine. The second blower system 302 includes a second blower, a second seal system, and a second electric machine electrically connected, mechanically connected, or both electrically and mechanically connected to the second blower. The second blower system 302 includes an uphole conveyance attachment at an uphole end of the second blower system 302 to interface with and attach to the conveyance 134 (e.g., wireline 128), and includes a downhole conveyance attachment at a downhole end of the second blower system 302 to interface with and attach to the section of the conveyance 134 (e.g., wireline 128) that extends downhole to the first blower system 124. For example, FIGS. 2A and 2B show a conveyance attachment to the first blower system 124 as a wireline attachment; however, the type of attachment can vary based on the type of conveyance 134 attaching to the respective blower system. For example, the conveyance attachment on the blower systems 124 or 302 can include a connector for any type of conveyance (e.g., wireline, coiled tubing, joint tubing, slickline, or other conveyance). The second blower system 302 can also include a bypass passageway to house the conductor wires that extend from the section of the wireline 128 uphole of the second blower system 302 through the bypass passageway of the second blower system 302 to the section of the conveyance 134 (e.g., wireline 128) downhole of the second blower system 302. The conductor wires connected to the electric machine of the first blower system 124 can bypass the second blower system 302 as the conductor wires extend from the terranean surface 106 of the well 102 to the first blower system 124.

A controller 304 is communicably coupled to the multiple blower systems (e.g., by wired techniques, wireless techniques, combinations of them or otherwise) to monitor characteristics of the gas proximate the blower systems and/or monitor characteristics of the blower systems, and adjust an operating parameter of the first blower system 124, the second blower system 302, or both blower systems. For example, the controller 304 can measure a parameter value representative of that parameter (e.g., temperature, pressure, density, flow, current, voltage, speed, and/or other), compare this measured parameter value against a stored or recorded value, and make a decision based on a result of the comparison. For example, one or more sensors coupled to the blower systems 124 and 302 can sense various operating parameters of the blower systems and the wellbore environment, and transmit signals representing the sensed parameters to the controller 304. In some instances, the controller 302 can identify a current or voltage at a respective blower system. The controller 304 is configured to receive signals from the blower systems 124 and 302 and/or the one or more sensors, and can send signals to the blower systems 124 and 302 and/or the one or more sensors. In certain instances, the controller 304 is also communicably coupled to the surface compressor 122. The controller 304 can be implemented as hardware, software, firmware, processing circuitry, or combinations of these. In some instances, the controller 304 can include one or more processors and a computer-readable medium storing instructions executable by the one or more processors to perform operations. FIG. 3A shows the controller at the terranean surface 10 of the well 102; however, the controller 304 can be implemented at or above the terranean surface 10, within the wellbore 104, or integrated with the first blower system 124 or second blower system 302.

Figure 3B:
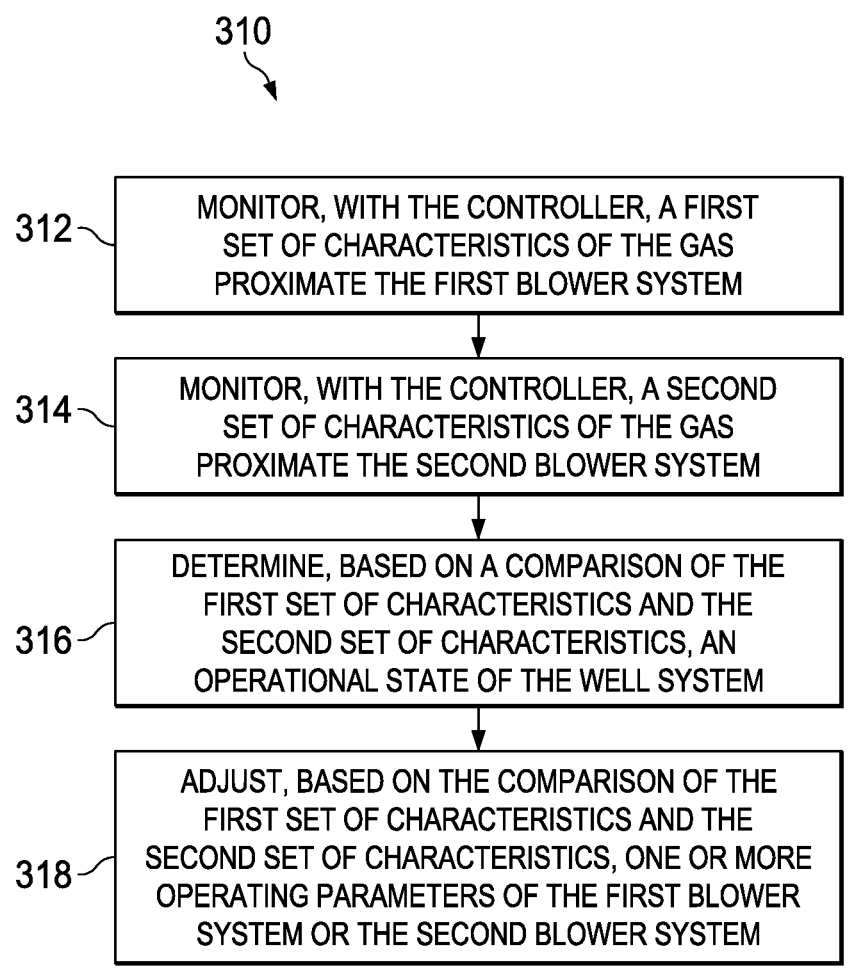
FIG. 3B is a flowchart of an example process for monitoring characteristics of a blower system.

FIG. 3B is a flowchart showing an example process 310 for monitoring characteristics in a wellbore, for example, implemented by the controller 304 in well system 300. At 312, the controller 304 monitors a first set of characteristics of the gas proximate the first blower system 124, and at 314, monitors a second set of characteristics of the gas proximate the second blower system 302. For example, the controller 304 can monitor one or more of pressure, temperature, liquid content, or flow rate of gas immediately downhole of or immediately uphole of the first blower system 124 and/or the second blower system 302. The controller 304 monitors these characteristics in real time, for example, to account for the dynamic and changing environment of the reservoir and/or the subterranean zone of interest 110 and the gas entering the wellbore 104 from the reservoir, such as liquid surges, and sudden drops or increases in pressure from pockets of gas trapped in cavities of the reservoir. Monitoring in real time means that a time interval between a time instant at which one or more characteristics are sensed by the blower sensors or one or more sensors and a time instant at which the sensed characteristics are transmitted to the controller 304 is negligible, for example, less than 1 second or less than 1 microsecond. In some examples, monitoring in real time includes a continuous monitoring of a set or sets of characteristics of the gas.

At 316, the controller 304 compares the first set of gas characteristics with the second set of gas characteristics to determine an operational state of the well system 300. For example, by comparing the two sets of gas characteristics, the controller 304 ensures that either or both of the blower systems 124 and 302 are operating at an optimal speed. Based on the comparison of the first set of characteristics with the second set of characteristics, and shown at 318, the controller can adjust one or more operating parameters (e.g., blower speed) of the first blower system 124, the second blower system 302, the surface compressor 122, or a combination of these. For example, the controller 304 can adjust (e.g., increase or decrease) the blower speed of the first blower system 124 or the second blower system 302 in response to the monitored pressure, temperature, or other measured characteristics of the gas flow in the wellbore 104. In certain instances, the controller adjusts the speed of the blower of the first blower system 124 or the second blower system 302 by adjusting a voltage and current to the electric machine of the first blower system 124 or the second blower system 302. The adjustment can include a stepped adjustment until a desired characteristic (or characteristics) is reached. For example, the adjustment can include a stepped increase or decrease in blower speed until a desired input pressure, output pressure, temperature, or other characteristic is reached. In some instances, the adjustment can include a straight adjustment, for example, increasing a blower speed from a first speed to a second, different speed. The controller can make these adjustments in real time, for example, immediately in response to changing wellbore conditions, desired blower system operation, or other.

In some examples, monitoring the first set of characteristics and the second set of characteristics includes monitoring a first inlet gas pressure at an inlet of the first blower, monitoring a first outlet gas pressure at an outlet of the first blower, monitoring a second inlet gas pressure at an inlet of the second blower, and monitoring a second outlet gas pressure at an outlet of the second blower. Since the first blower system 124 and the second blower system 302 each create a pressure differential in the wellbore 104 at their respective downhole locations, the first inlet gas pressure is less than the first outlet gas pressure, and the second inlet gas pressure is less than the second outlet gas pressure. In FIG. 3A, the second blower system 302 is adjacently uphole of the first blower system 124. That is, no blower system is disposed in the wellbore 104 between the first blower system 124 and the second blower system 302. So, during operation of the first blower system 124 and the second blower system 302, the second outlet gas pressure (i.e., the gas pressure uphole of the second blower system 302) is greater than the first outlet gas pressure (i.e., the gas pressure uphole of the first blower system 124 and downhole of the second blower system 302). In some examples, the second outlet gas pressure is less than or equal to two times the first outlet gas pressure.

In some instances, the controller 304 determines that the outlet (i.e., uphole) gas pressure of the first blower system 124 and/or the second blower system 302 is greater than a respective maximum threshold pressure or less than a respective minimum threshold pressure. Responsively, the controller 304 adjusts the respective blower speed of the first blower system 124 and/or the second blower system 302 to achieve a desired pressure in the wellbore 104, for example, between a maximum threshold pressure and a minimum threshold pressure. In certain instances, the controller 304 continuously adjusts an operating parameter of at least one of the first blower system 124 or second blower system 302 to maintain a pressure ratio across the respective blower system.

In certain examples, monitoring the first set of characteristics and the second set of characteristics can also include monitoring a first inlet gas temperature at the inlet of the first blower, monitoring a first outlet gas temperature at the outlet of the first blower, monitoring a second inlet gas temperature at an inlet of the second blower, and monitoring a second outlet gas temperature at an outlet of the second blower.

The controller 304 can control output from each blower system in the wellbore 104 to effectively maximize or improve wellbore production being delivered to the wellhead 118. The controller 304 can independently adjust blower speeds while monitoring pressure, temperature, flow, and other wellbore conditions, and use the monitored information to continuously adjust and balance production through the wellbore 104. In some instances, the well system 300 includes a variable speed drive (VSD) 306 and/or a variable frequency drive (VFD) 308 to assist the controller 304 in controlling and adjusting operational parameters of the one or more blower systems in the wellbore 104.

Alternatively or in addition to any of the other implementations described in this specification, the downhole type blower system 124 can be implemented to optimize production through multiple wellbores in a well system. To do so blower systems can be installed in respective wellbores. Sometimes, multiple wellbores are formed in a well system (e.g., a hydrocarbon field) and production fluids (e.g., hydrocarbons, gas, other production fluids or a combination of them) are produced through each wellbore. The multiple wellbores feed into a common manifold to supply the produced fluids, for example, to a gatherer process line.

As described below, the wellbore pressure, i.e., the pressure in a wellbore to produce the production fluids, is not always equal across the multiple wellbores. In some instances, a wellbore with the lowest wellbore pressure necessitates a throttling of other wellbores, thereby limiting the output of the other wellbores. One option to maintain pressure across the wellbores is to implement a system of valves that can be powered to open or close based on the wellbore pressure differential across the multiple wellbores. However, doing so can require production downtime resulting in loss of production and also incur additional cost to install and power the system of valves.

This disclosure describes techniques to maintain equal pressures (substantially or precisely) across the multiple wellbores in the well system to optimize production through the well system. Optimizing production through the well system can mean that the production fluid pressure in different wells in the well system can be substantially the same. Substantially same pressures across the wells can mean that a difference in production fluid pressures between any two wells is within a standard deviation ranging between 1% and 10%. In some implementations, multiple surface compressors, such as the surface compressor 122 described above, can reside on the terranean surface of the well system. Each surface compressor can be fluidly coupled to a respective wellbore. Also, in some implementations, a downhole-type blower, such as the downhole-type blower system 124, can reside in each wellbore in the well system. Each surface compressor operates to draw down the pressure inside each wellbore at the surface to facilitate production of the fluids to the surface and out of the wellbore. Each downhole-type blower assists by creating an additional pressure differential within each wellbore.

Each surface compressor can be coupled to (for example, electrically or mechanically or both) an electric machine (e.g., a motor, a generator, a motor-generator or other electric machine) that can operate in either a generator mode or a motor mode. In a generator mode, the electric machine receives energy (e.g., rotational energy of the compressor vanes, mechanical energy of compressed fluid, other energy or combinations of them) from the surface compressor and converts the energy into electrical energy or power. In a motor mode, the electric machine provides electrical energy to power the surface compressor. Similarly, each downhole-type blower can also be coupled to an electric machine.

When a pressure in the wellbore is sufficient to produce production fluids, each of the surface compressor and the downhole-type blower can provide energy to their respective electric machine. In turn, each electric machine can operate in the generator mode to generate power. When the pressure in the wellbore drops to a level that is insufficient to produce production fluids unassisted, each electric machine can operate in the motor mode to power the respective surface compressor or downhole-type blower. The surface compressor or the downhole-type blower (or both) can operate to assist producing the production fluids through the wellbore. As described below, the pressures in the multiple wellbores can be monitored, and, based on the monitored pressures, one or more or all of the electric machines can be operated in either a generator mode or a motor mode to maintain a substantially equal pressure across the multiple wellbores. By substantially equal pressure, it is meant that the pressure in each wellbore can be greater than or equal to a threshold pressure needed to produce through the wellbore, and the pressure across the multiple wellbores can fall within a standard deviation ranging between 5% and 10%.

Figure 4:
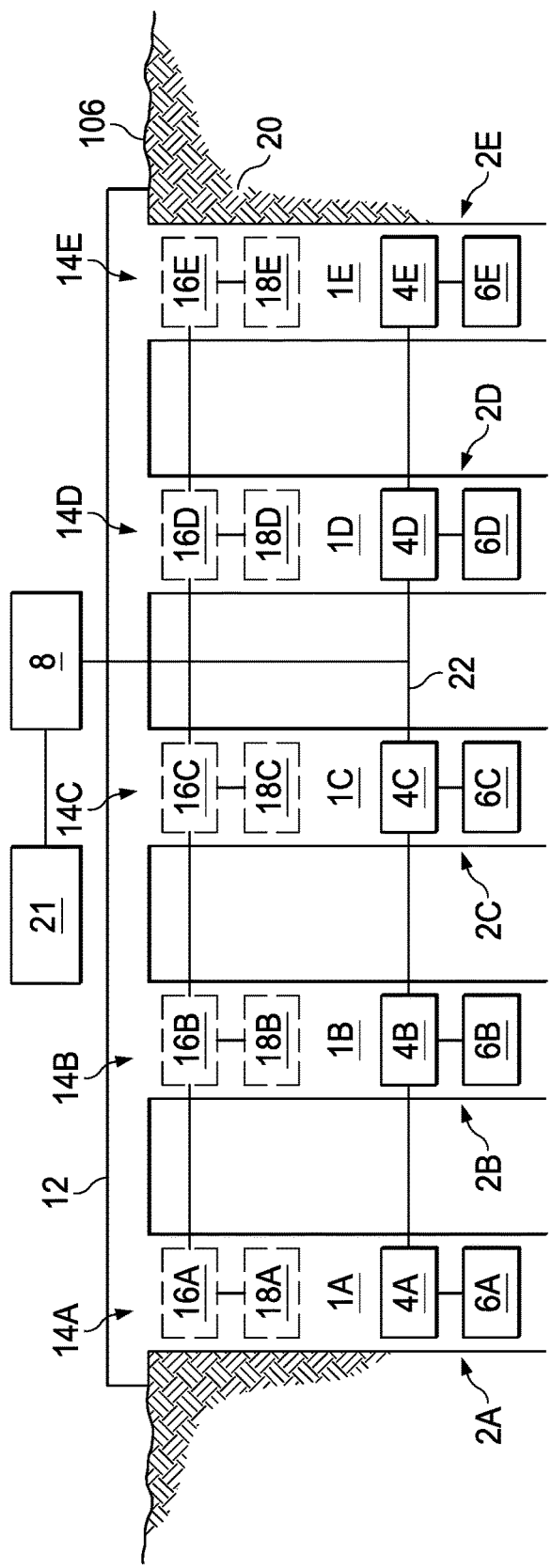
FIG. 4 is a schematic diagram of a system for maintaining substantially equal pressures across multiple wellbores in a well system.

FIG. 4 is a schematic diagram of a system for maintaining substantially equal pressures across multiple wellbores in a well system. The well system includes multiple wellbores (e.g., a first wellbore 1A, a second wellbore 1B, a third wellbore 1C, a fourth wellbore 1D, a fifth wellbore 1E, or more or fewer wellbores). Each wellbore is a production wellbore similar to wellbore 104 and can extend from a surface 106 into a hydrocarbon reservoir 21, for example, in the downhole zone 132. As described above, production fluids (e.g., hydrocarbons, gas, other production fluids or combinations of them) trapped in the hydrocarbon reservoir 21 can be produced to the surface 106 through the multiple wellbores. A collection manifold 12 can be implemented at the surface 106. The collection manifold 12 is fluidically coupled to the multiple wellbores to receive the production fluids produced through the multiple wellbores.

Multiple blower systems (for example, a first blower system 2A, a second blower system 2B, a third blower system 2C, a fourth blower system 2D, a fifth blower system 2E, or more or fewer blower systems) are disposed in corresponding wellbores. In some implementations, each of the blower systems described above is a downhole blower system that is positioned at a respective downhole location in the respective wellbore. The wellbore conditions (e.g., pressure, temperature, or other wellbore conditions) at a downhole location at which each blower system is disposed are different from corresponding conditions at a surface 106. Moreover, each downhole location is significantly nearer a bottom of a wellbore compared to a top of the wellbore. Each blower system can be deployed using risers.

Each blower system includes a blower (for example, a first blower 4A, a second blower 4B, a third blower 4C, a fourth blower 4D, a fifth blower 4E, or more or fewer blowers) and an electric machine (a first electric machine 6A, a second electric machine 6B, a third electric machine 6C, a fourth blower 6D, a fifth blower 6E, or more or fewer blowers). Each electric machine can drive or be driven by a respective blower to which each blower is coupled. As described above, each electric machine can operate in either a generator mode to generate power in response to being driven by the coupled blower or in a motor mode to power the coupled blower.

A controller 8 is coupled to the multiple blower systems. The controller 8 can be implemented as hardware, software, firmware, processing circuitry or combinations of them. In some implementations, the controller 8 can include one or more processors and a computer-readable medium storing instructions executable by the one or more processors to perform operations. The controller 8 can be implemented at or above the surface 106 or inside one of the wellbores. Exemplary operations implemented by the controller 8 are described with reference to FIGS. 5 and 6.

Figure 5:
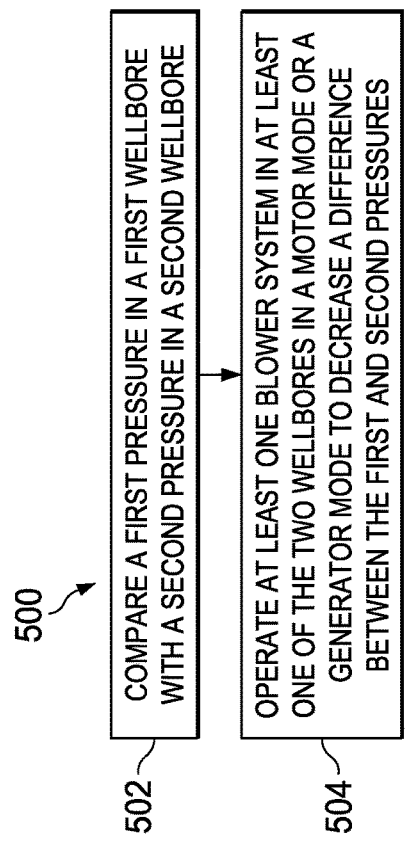
FIG. 5 is a flowchart of an example of a process implemented across the multiple wellbores in the well system.

FIG. 5 is a flowchart of an example of a process 500 implemented by the controller 8 across the multiple wellbores in the well system. At 502, the controller 8 compares a first pressure in the first wellbore 1A to produce production fluids and a second pressure in the second wellbore 1B to produce production fluids. At 504, based on a result of the comparing, the controller 8 operates either the first blower system 2A (specifically, the first electric machine 6A) or the second blower system 2B (specifically, the second electric machine 6B) in either a motor mode or a generator mode to optimize production through the two wellbores.

Figure 6:
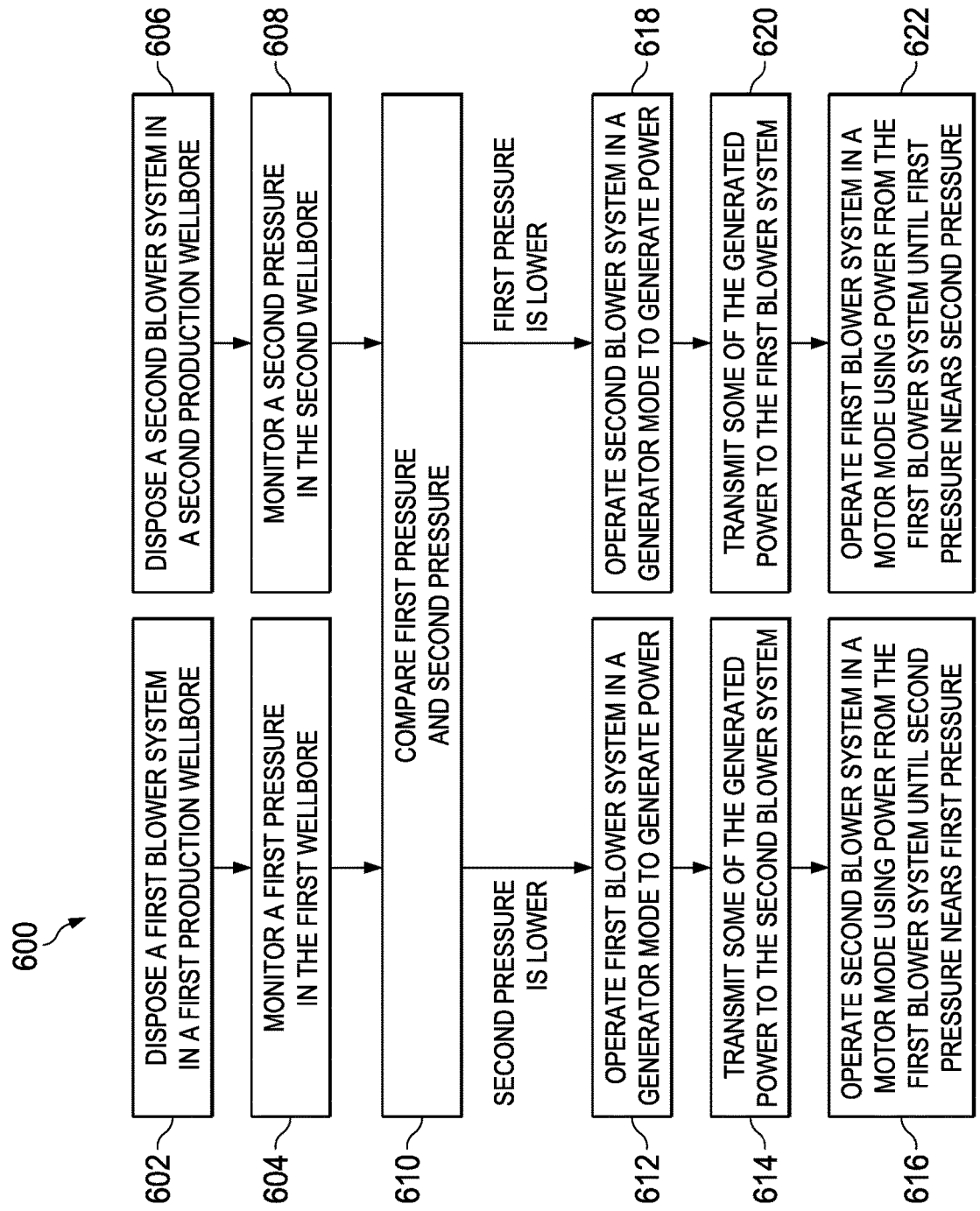
FIG. 6 is a flowchart of an example of a process implemented across two wellbores.

An example of the process is described in more detail in the context of two of the wellbores in the well system with reference to FIG. 6. The process can generally be implemented across more than two or across all the wellbores in the well system. In some implementations, the controller 8 can implement a load-balancing process in which the controller 8 compares pressures in the multiple wellbores in the well system, and simultaneously throttles one or more of the wellbores while increasing the pressures in one or more other wellbores. To throttle a pressure in a high-pressure wellbore, the controller 8 can operate an electric machine disposed in the high-pressure wellbore in a generator mode. To increase a pressure in a low-pressure wellbore, the controller 8 can transmit a portion of electrical energy or power generated by operating an electric machine in the high-pressure wellbore in a generator mode to power the electric machine in the low-pressure wellbore.

By implementing the process across the multiple wellbores, the controller 8 can control output from each wellbore to effectively maximize total wellbore production being delivered to the collection manifold 12. The controller 8 can independently adjust blower speeds while monitoring pressure, flow and other wellbore conditions, and use the monitored information to continuously adjust and balance production through each wellbore. In this manner, production through multiple wellbores that have a central gathering point, e.g., the central manifold 12, can be optimized. Such implementation can maximize the total production output of the wells, decrease the cost of intervention and negate a need for a valve system and associated power infrastructure.

FIG. 6 is a flowchart of an example of a process 600 implemented by the controller 8 across two wellbores, e.g., the first wellbore 1A and the second wellbore 1B, in the wellbore system. At 602, the first blower system 2A is disposed in the first wellbore 1A. At 606, the second blower system 2B is disposed in the second wellbore 1B.

At 604 and 608, a first pressure in the first wellbore 1A and a second pressure in the second wellbore 1B, respectively, are monitored. For example, one or more sensors (e.g., pressure sensors, flow sensors, other sensors or combinations of them) can be disposed at respective locations in each wellbore. The controller 8 can be coupled to each of the sensors. The controller 8 can receive sensor values (e.g., pressure value, volumetric flow rate, temperature or other sensor values) sensed by each sensor based on which the controller 8 can determine a pressure in each wellbore to produce the production fluids.

At 600, the first pressure and the second pressure are compared. For example, the controller 8 can compare the first pressure in the first wellbore 1A and the second pressure in the second wellbore 1B. In some implementations, for example, the controller 8 can determine that a second pressure in the second wellbore 1B is lower than the first pressure in the first wellbore 1A. For example, each of the first pressure and the second pressure is sufficient to produce through the respective wellbore; yet, the difference results in a higher rate of production in the first wellbore 1A relative to the second wellbore 1B. In another example, the controller 8 can determine that the first pressure is greater than a threshold pressure needed to produce through the first wellbore 1A and that the second pressure is less than a threshold pressure to produce through the second wellbore 1B. The threshold pressure for the first wellbore can be the same as or different from that for the second wellbore.

To optimize production through both wellbores, the controller 8 can implement operations to increase the second pressure and to throttle the first pressure. To do so, at 602, the first blower system is operated in a generator mode to generate power. For example, the controller 8 can operate the first electric machine 6A in a generator mode, in which, as described above, a flow of production fluid through the first blower 4A causes the first electric machine 6A to generate electrical energy or power. In addition, the first blower 4A operates as a power generation expander that decreases the first pressure in the first wellbore 1A. In other words, operating the first blower 4A in a generator mode throttles the first pressure in the first wellbore 1A.

At 604, at least a portion of the generated power is transmitted to the second blower system. For example, the controller 8 transmits at least a portion of the electrical energy or power generated by the first electric machine 6A to the second electric machine 6B in the second wellbore 2B. In some implementations, the multiple electrical machines in the multiple wellbores are electrically coupled in parallel via a common direct current (DC) bus 22. The controller 8 can transmit electrical energy between the different electric machines using the DC bus 22.

At 606, the second blower system is operated in a motor mode using power from the first blower system until the second pressure nears the first pressure. For example, the controller 8 operates the second electric machine 6B in a motor mode. In the motor mode, the second electric machine 6B uses the electrical energy or power received from the first electric machine 6A to drive the second blower 4B. The second blower 4B operates to increase the second pressure in the second wellbore 2B. The controller 8 can continue to throttle the first pressure and increase the second pressure until the second pressure increases beyond the threshold pressure to produce through the second wellbore 1B or further until the production rate through both wells is substantially equal. When this condition is satisfied, the controller 8 ceases to transmit power from the first electric machine 6A to the second electric machine 6B.

Conversely, in response to comparing the first pressure and the second pressure, the controller 8 can determine that a first pressure in the first wellbore 1A is lower than the second pressure in the second wellbore 1B. To optimize production through both wellbores, the controller 8 can implement operations to increase the first pressure and to throttle the second pressure. To do so, at 618, the second blower system is operated in a generator mode to generate power. At 620, at least a portion of the generated power is transmitted to the first blower system. At 622, the first blower system is operated in a motor mode using power from the second blower system until the first pressure nears the second pressure. The controller 8 can continue to throttle the second pressure and increase the first pressure until the first pressure increases beyond the threshold pressure to produce through the first wellbore 1A or further until the production rate through both wellbores is substantially equal. When this condition is satisfied, the controller 8 ceases to transmit power from the second electric machine 6B to the first electric machine 6A.

In some implementations, when the pressures in the wellbores are high (i.e., when the pressures are greater than the threshold pressures to produce through the wellbores), the controller 8 can operate all the blower systems in generator modes. In such implementations, power generated by the electric machines in the wellbores can be stored, for example, in a power system 20 coupled to the controller 8.

In some implementations, when the pressures in the wells are low (i.e., when the pressures are less than the threshold pressures to produce through the wellbores), the controller 8 can operate all the blower systems in generator modes. To do so, the controller 8 can route power stored in the power system 20, for example, through the DC bus 22, to each blower system in each wellbore. In this manner, a total micro-grid of power is formed when the pressures in the wellbores are high and used to assist production when the pressures drop to below threshold pressures.

In addition to the multiple downhole blower systems described above, multiple uphole blower systems (for example, a first uphole blower system 14A, a second uphole blower system 14B, a third uphole blower system 14C, a fourth uphole blower system 14D, a fifth uphole blower system 14E, or more or fewer blower systems) can be disposed in corresponding wellbores. The uphole blower systems can be disposed uphole of corresponding downhole blower systems, e.g., at or nearer the surface 106 compared to the downhole ends of the wellbores. Each uphole blower system includes a blower (for example, a first uphole blower 16A, a second uphole blower 16B, a third uphole blower 16C, a fourth uphole blower 16D, a fifth uphole blower 16E, or more or fewer blowers) and an electric machine (a first uphole electric machine 18A, a second uphole electric machine 18B, a third uphole electric machine 18C, a fourth uphole blower 18D, a fifth uphole blower 18E, or more or fewer blowers). Each electric machine can drive or be driven by a respective blower to which each blower is coupled.

Similar to each downhole blower system, each uphole electric machine can operate in either a generator mode to generate power in response to being driven by the coupled uphole blower or in a motor mode to power the coupled uphole blower. The uphole blower systems (e.g., the uphole electric machines) can be coupled to the controller 8, for example, via the DC bus 22. Based on monitored pressures in the wellbores, the controller 8 can operate one or more or all of the uphole electric machines in a generator mode or a motor mode to optimize production through the wellbores by implementing techniques similar to those described above with reference to the downhole blower systems.

In sum, implementing the techniques described in this disclosure can optimize wellbore output, optimize use of multiple types of equipment and operate equipment in cooperation rather than independently resulting in increased efficiency.

Figure 7:
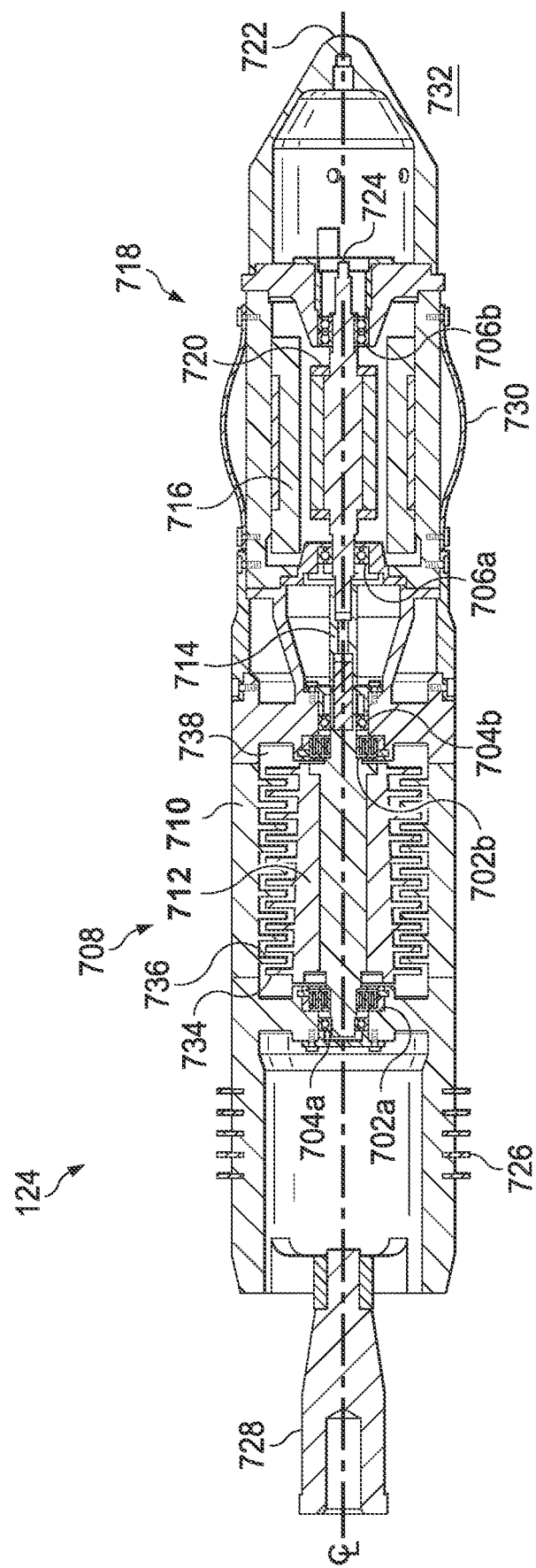
FIG. 7 is a schematic diagram of a lateral cross-section of a downhole-type blower system.

Alternatively or in addition to any of the other implementations described in this specification, the downhole type blower system 124 can be implemented using bearings and seals. FIG. 7 shows a schematic, half cross-sectional view of the example downhole-type blower system 124 described above. As discussed above, the downhole-type blower system 124 is a cylindrical body that can be positioned within the wellbore 104, and includes both a blower 708 and an electric machine 718. The blower 708 includes a fluid stator 710 and a fluid rotor 712 that is centrally located radially within and carried by the fluid stator 710. The fluid stator 710 is generally long and cylindrical with a cavity in its center. The fluid rotor 712 is also generally long and cylindrical and is carried in such a way that a longitudinal axis of the fluid stator 710 coincides with a longitudinal axis of the fluid rotor 712. In the illustrated implementation, the fluid rotor 712 is supported to rotate within the fluid stator 710 by a blower bearing assembly 702a and a blower bearing assembly 702b on each end of fluid rotor 712. The blower bearing assemblies 702a and 702b are protected from a downhole environment 732 by a bearing assembly seal 704a and a bearing assembly seal 704b, respectively. A more detailed implementation of the blower section 708 is described with reference to FIG. 8.

The fluid stator 710 includes multiple stator vanes 736 circumferentially spaced apart around the internal circumference of the stator's inner surface and extending radially inward from the stator inner surface. The stator vanes 736 direct the flow through an annular space between the fluid stator 710 and the fluid rotor 712 called the blower annulus 738. The fluid rotor 712 also includes multiple rotor blades 734. The rotor blades 734 are circumferentially spaced apart around the outer circumference of the fluid rotor 712 and extend radially outward from the rotor outer surface. As the fluid rotor 712 spins, the blades 734 impart kinetic energy on the wellbore gas to increase the pressure downstream of the fluid rotor 712. As fluid passes through the blower section 708, the stator vanes 736 help to guide the fluid flow and improve the efficiency of the blower section 708. In some implementations, the wellbore gas can impart kinetic energy on the fluid rotor 712 and cause the fluid rotor 712 to rotate. The blower section 708 can include multiple stages. Each stage can include one set of rotor blades 734 and one set of stator vanes 736. The pressure ratio across each stage is cumulative.

The electric machine 718, which is positioned downhole of the blower 708, includes an electric stator 716 and an electric rotor 720 that is centrally positioned within and carried by the electric stator 716. In certain instances, the electric machine 718 is a permanent magnet electric machine where the rotor 720 is a permanent magnet rotor having rotor core with a multiple permanent magnets arranged around its exterior to define two or more magnetic poles. Although described herein in connection with a permanent magnet machine, the electric machine need not be a permanent magnet machine, and could be another type. For example, the rotor could be a wound rotor, a squirrel-cage rotor, or any other electric machine rotor. The electric machine 718 can be utilized as either a motor or a generator. The electric machine 718 can be a synchronous electric machine, an induction electric machine, a brushed electric machine, or any other type of electric machine that is capable of converting electrical energy into rotational energy or vice versa. In the illustrated implementation, the permanent magnet rotor 720 is centrally supported radially to rotate within the electric stator 716 by an electric machine bearing assembly 706a and an electric machine bearing assembly 706b on each end of permanent magnet rotor 720. The electric stator 716 is generally long and cylindrical with a cavity in its center. The electric rotor 720 is also generally long and cylindrical and is carried in such a way that a longitudinal axis of the electric stator 716 coincides with a longitudinal axis of the electric rotor 720. In some implementations, a thrust bearing 724 can be included at the downhole end of the permanent magnet motor 720. The thrust bearing is oriented to support an axial load in a downhole direction. The electrical machine is fluidically isolated from the wellbore 104. As a result, the electrical-machine bearing assemblies 706a and 706b do not require the protection of seals and are left unsealed. The bearing assembly seals 704a and 704b protect the blower bearing assemblies 702a and 702b from the downhole environment 732.

The electric machine 718 also includes an electrical winding. The electric winding is connected to a topside facility with a power cable. The power cables can be connected to a control circuit. The control circuit can send an electrical current downhole through the power cable and to the electric machine 718. The current induces a torque on the permanent magnet rotor 720 and causes the permanent magnet rotor 720 to rotate. The electrical current can be a direct current, alternating current, or a multiple phase alternating current. In such implementations where one or more phases of alternating current is used, the speed of rotation is proportional to a frequency of the alternating current. In some implementations, the permanent magnet rotor 720 may receive a torque input from outside of the electric machine 718, such as from fluid flowing through the blower section 708. In such an instance, the fluid flow can induce a rotation within the fluid rotor 712 which can be transmitted to the electric rotor, such as the permanent magnet rotor 720 through a coupling 714. In such instances, the rotation of the permanent magnet rotor 720 induces an alternating current within the electric windings of the electric stator 716, i.e., the electric machine 718 generates electricity. The current is directed uphole to a control circuit located at a topside facility through the power cable. The frequency of the alternating current is proportional to the rate of rotation of the permanent magnet rotor 720. In some implementations, the control circuit can include a variable frequency drive (VFD) 308 of a variable speed drive (VSD) 306.

In the illustrated implementation, the blower 708 and the electric machine 718 are constructed and balanced separately. That is, the blower 708 and electric machine are separate, isolated machines that are connected when the downhole-type blower is fully assembled. As a result, the fluid rotor 712 and the permanent magnet rotor are connected with a coupling 714. The coupling 714 connects the downhole end of the fluid rotor 712 to the uphole end of the permanent magnet rotor 720. The coupling 714 is used to help absorb any misalignment that may occur between the fluid rotor 712 and the permanent magnet rotor 720 during assembly. The coupling 714 can be a flex pack, a simple hub, a disk coupling, a spline coupling, or any known coupling. The coupling 714 is housed in a separate compartment from the blower section 708 and is within the sealed section of the downhole-type blower system 124; that is, the coupling 714 is fluidically isolated from the wellbore 104 The coupling 714 has sufficient strength to transfer torque between the fluid rotor 712 and the permanent magnet rotor 720.

The downhole-type blower system 124 can also include a positioning connector 728 at the uphole end of the downhole-type blower system 124, a secondary wellbore seal 726 radially extending out from the outer surface of the downhole type blower system 124, a centralizer 730 extending radially out from the outer surface of the downhole-type blower system 124, and a sensor suite 722 located at the downhole end of the downhole-type compressor 124. The positioning connector 728 can be used to position the downhole-type blower within the wellbore 104 and retrieve the downhole-type compressor 124 from the wellbore 104. The positioning connector 728 can be configured to connect to coiled tubing, jointed tubing sucker pump rods, wireline or any other method of deployment. The positioning connector 728 can be configured differently based on the deployment method. For example, if sucker rod is used, the positioning connector 728 can be threaded to allow the sucked rod to be directly attached to the connector. If a wireline deployment is used, the positioning connector 728 could be a latch or other similar attachment. The secondary well bore seal 726 is made of a soft inert material, such as Viton™ or Teflon™, and provide a secondary seal in addition to other primary sealing methods discussed within this disclosure. The centralizers 730 can be made of either metal or a stiff polymer and are shown shaped as a leaf-spring. Multiple centralizers are circumferentially equally spaced around the downhole-type blower system 124 and at least partially centralize the downhole-type blower within the wellbore 104. Centralization within the wellbore 104 helps ensure even gas flow around the electric machine 718 and an even gas flow within the blower 708. An even gas flow across the electric stator 716 of the electric machine 718 ensures adequate cooling of the electric machine 718 during operation. An even gas flow through the blower 708 ensures an even load distribution on the fluid bearing assemblies 702a and 702b. Both of these factors help increase the life of the downhole-type blower system 124.

Figure 8:
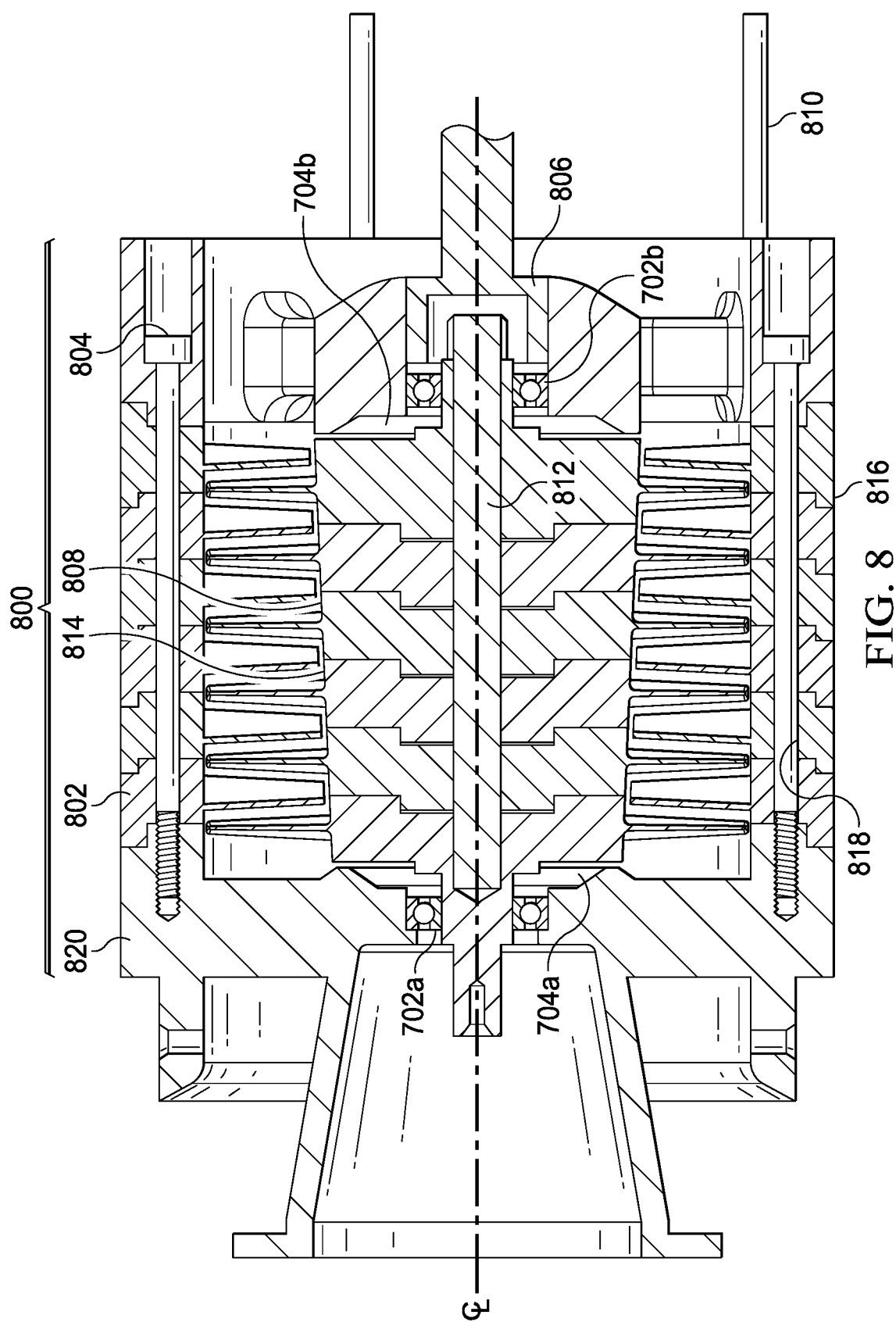
FIG. 8 is a schematic diagram of a lateral cross-section of a downhole-type blower system blower section.

In some implementations, such as the implementation of a blower section shown in FIG. 8, the blower section 708 can include a segmented fluid stator 800 that includes multiple axially stacked, clamped together segments 802, stacked against one another. Such an implementation includes the stacked stator segment 802, stacked rotor segments 808 located within the stacked stator segments 802, a blower shaft 812 centrally located within the stacked rotor segments 808, a spline coupling 806 at the downhole end of the fluid rotor 712, and a guide pin 810 located on the outer casing. The stacked-stator implementation has several benefits, particularly during assembly. Assembling stacked stator segments 802 and stacked rotor segments 808 one piece at a time significantly reduces weight during each assembly step. Such a process allows the rotor to be completed independent of the stator, where the stator stages are then built around the rotor for a simplified and lower cost build process. Any adjustment for alignment can be determined as the stages are stacked via shims to ensure the unit is aligned with rotor to stator blade clearances for optimal performance.

Each stator segment 802 is configured to stack against one another with a stator segment lip 816 that centers each stator segment 802 once stacked. The stator segments 802 are held together by one or more stator bolts 804. Each stator segment has one or more bolt holes 818 near the outer edge of the stator segment that allows the stator bolt 804 to pass though the stator segment 802. A final stator segment 820 is shown including a hole that does not fully pass through the stator segment, with threads for the stator bolt 804 to engage with. The outer casing can also include one or more guide pins 810. The guide pin 810 allows the fluid stator 710 to be aligned with the electric machine 718 during assembly. The guide pin 810 also prevents the fluid stator 710 to rotate relative to the electric machine stator 716. The stacked stator segments 802 can define the outer casing of the blower section 708.

The fluid rotor 712 can also include multiple rotor segments 808 that are designed to stack against one another with a rotor segment shoulder 814. Each rotor segment 808 has a central hole and are stacked upon one another around a blower shaft 812 that passes through the central hole. The rotor segments 808 are held in place by any method known in the art, such as press fitting, thermal fitting, or bolting. The illustrated implementation shows the blower shaft 812 with a threaded connection at one end that threads securely into a final rotor section. Such an implementation holds the rotor segments 808 together with a clamping force similar to how the stator segments 802 are held together in the illustrated implementation. In other implementations, a tie-bolt, geared teeth, keyed sections, or any combination of the methods previously listed can be used to mount the rotor segments 808. Torque can be transferred to or from the fluid rotor 712 through the spline coupling 806. The spline coupling 806 maintains radial alignment, but allows for axial movement. Such movement may be experienced due to thermal growth during operation. The spline coupling 806 connects the downhole end of the fluid rotor 712 to an uphole end of the permanent magnet rotor 720. In some implementations, the number of rotor segments 808 corresponds with the number of blower stages. During assembly of the blower section 708, the rotor segments 808 and stator segments 802 should be assembled in an alternating sequence.

As previously described, the bearing assembly seals 704a and 704b protect the blower bearing assemblies 702a and 702b from contact with fluids from the downhole environment 732 in order to protect a bearing grease from being stripped from the blower bearing assembly, such as bearing assembly 702a or 702b. In other words, the grease can flash off to the wellbore environment 732 and leave the blower bearing assemblies 702a and 702b dry. A dry blower bearing assembly 702a or 702b can lead to a decreased lifespan of the downhole blower system 124. The grease in the blower bearing assemblies 702a and 702b help absorb heat and prevents particulates, such as sand, from damaging the blower bearing assembly 702a or 702b. The grease can be designed for the downhole environment 732 to provide a minimum level of lubrication for the blower bearing assemblies 702a and 702b over the life of the downhole blower system 124.

Figure 9B:
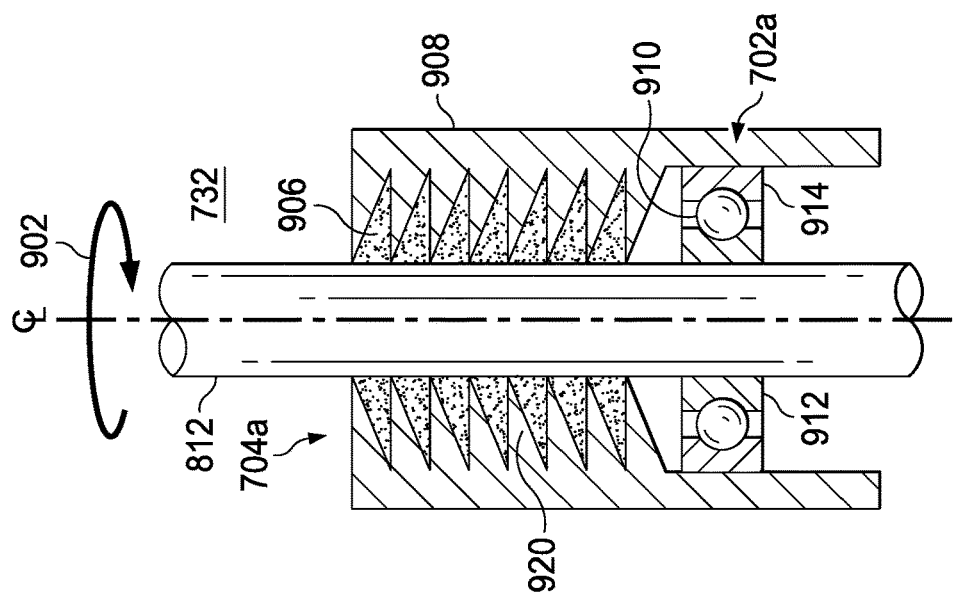
FIG. 9B is a detailed view of an alternative seal assembly.
Figure 9A:
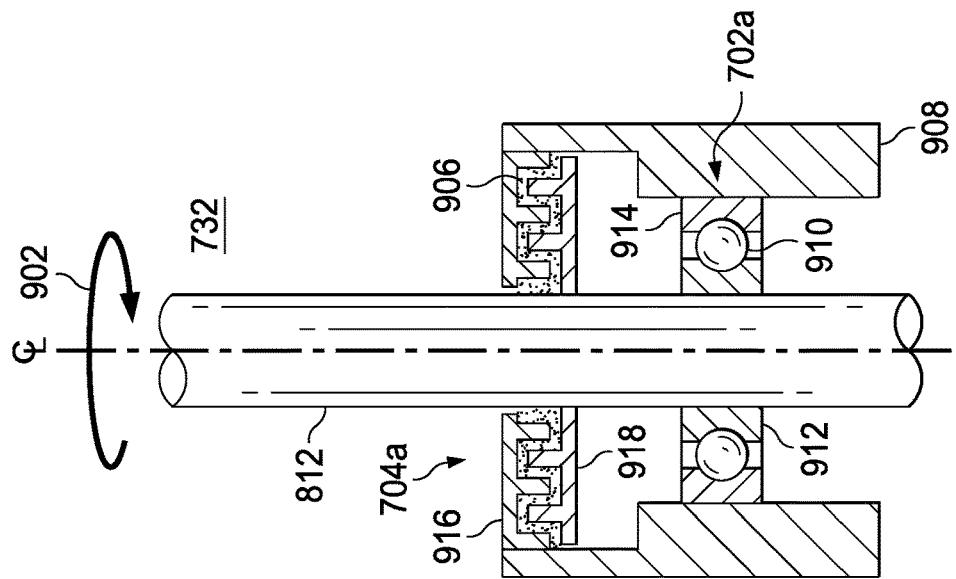
FIG. 9A is a detailed view of a seal assembly.

FIG. 9A shows a schematic diagram of an example of either seal 704a (or seal 704b) that can be utilized for fluid bearing assembly 702a (or fluid bearing assembly 702b, respectively). The bearing assembly 702a can include an inner race 912 attached to and surrounding the blower shaft 812, an outer race 914 attached to a bearing housing 908 and surrounding the blower shaft 812, and a ball 910 positioned between the inner race 912 and the outer race 914. The seal 704a is positioned between the bearing assembly 702a (or the bearing assembly 702b or both) and the downhole environment 732. No unsealed routes for fluid ingress to the bearings exist except for the flow path protected by the seals 704a and 704b. In the illustrated implementation, the seal 704a (or the seal 704b or both) is a labyrinth seal. Labyrinth seals work by forcing gas through a tortuous path that causes high pressure drop and low flow across the seal. In some implementations, the seal path may be filled sufficiently with a grease 906 to completely fill the seal path and further improve the sealing ability of seal 704a.

In the illustrated implementation, the seal 704a includes both an upper seal section 916 and a lower seal section 918. The lower seal section 918 is attached to the blower shaft 812 and spins with the blower shaft 812 while the upper seal section 916 is attached to the bearing housing 908 and remains stationary. The clearances between the upper seal section and the lower seal section are selected to provide an appropriate level of sealing for the required life expectancy of the bearings; that is, the clearances are designed such that the clearances regulate an exposure to the well fluids that the bearings can tolerate. Such tight clearances help mitigate gas migration towards the bearings. The grease 906 inserted within this gap to further reduce the clearance. In some implementations, the grease 906 can provide lubrication as well. This can be useful if tight machining tolerances cause rubbing with the seal 704a.

The bearing assembly 702a is a mechanical bearing, such as a ball bearing, journal bearing, sleeve bearing, roller bearing, or any other mechanical bearing. A ball bearing assembly reduces friction and allows the blower shaft 812 to experience a shaft rotation 902 when a torque is applied to the fluid rotor 712. While the ball bearing assembly is implemented primarily for radial loads, it may be configured to take some axial thrust loads as well. The inner race 912, outer race 914, and ball 910 can be made out of high-grade steel or a similar metal that is resistant to spalling and galling. Such bearings can also include a grease designed for the downhole environment 732. The grease can also provide cooling and lubrication to the bearing assembly 702a. In some implementations, the bearing assembly 702a can include a ball cage (not shown). A ball cage is used to evenly space a plurality of balls 910 within the inner race 912 and outer race 914. The ball cage is typically made of a softer metal than the ball 910, inner race 912, or outer race 914. Such a metal may, in certain instances, include a bronze alloy. While this section primarily discusses a ball bearing assembly, other radial bearings may be used in certain implementations, such as passive magnetic bearings. Other bearing types will be discussed in a later section of this disclosure.

FIG. 9B shows an alternative implementation of seal 704a (or 704b). In the illustrated implementation, the labyrinth seal is configured to seal against gas flowing parallel to the blower shaft 812 rather than perpendicular as was shown in FIG. 9A. This implementation still includes a bearing assembly 702a (or the bearing assembly 702b). The bearing assembly 702a is substantially similar to the bearing assembly 702a described above with reference to FIG. 9A.

In the implementation illustrated in FIG. 9B, the seal 704a includes a single seal with multiple teeth 920 that are biased against an ingress flow to the bearing assembly. The seal is attached to the bearing housing and remains stationary during operation. In some implementations, the illustrated labyrinth seal may be installed as a cartridge to allow for easy change-out in the field. Such a seal 704a can be made of soft metals, such as aluminum, or chemically resistant polymers, such as Teflon™ or Viton™. The clearances between the teeth 920 and the shaft 812 are selected to provide an appropriate level of sealing for the required life expectancy of the bearings; that is, the clearances are designed such that the clearances regulate an exposure to the well fluids that the bearings can tolerate. Such tight clearances help mitigate gas migration towards the bearings. In some implementations, the seal path may be filled sufficiently with a grease 906 to completely fill the seal path and further improve the sealing ability of seal 704a. In some implementations, the grease 906 can provide lubrication as well. Such lubrication can be useful if tight machining tolerances cause rubbing with the seal 704a.

Figure 10:
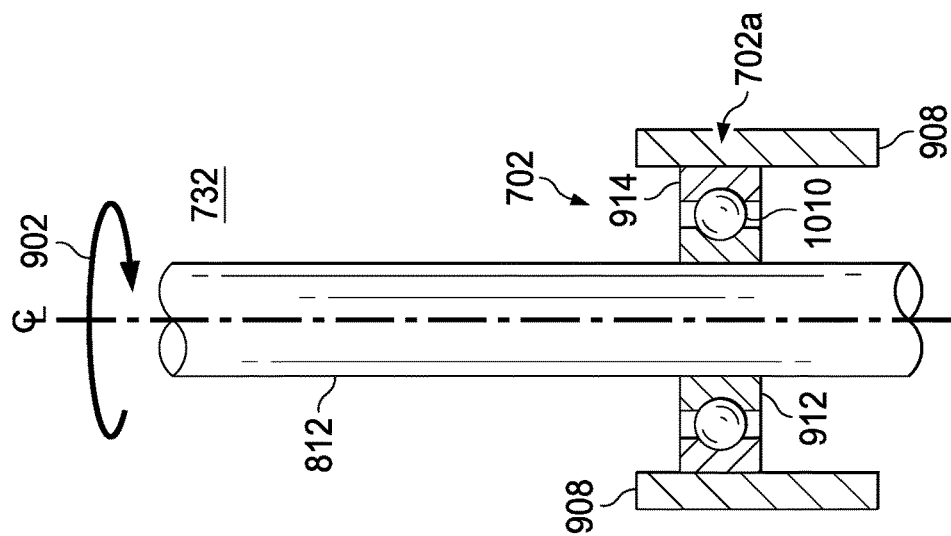
FIG. 10 is a schematic diagram of a seal-less bearing assembly.

FIG. 10 shows a schematic diagram of an alternative implementation of either the bearing assembly 702a or 702b. In the illustrated implementation, the seal, such as either seal 704a or 704b is not included. The bearing assembly 702a still includes the inner race 912 attached to and surrounding the blower shaft 812, the outer race 914 attached to the bearing housing 908 and surrounding the blower shaft 812, and a coated ball 1010 positioned between the inner race 912 and the outer race 914. In the illustrated implementation, the coated ball 1010 is coated with a soft material that breaks-up or offers low-friction characteristics when the bearing assembly is under load and provides lubrication to the bearings. Such coatings can include a lead alloy, molybdenum disulfide, graphite, or any other soft, low friction, or lubricating coating. In some implementations, the inner race 912, outer race 914, or both, could also be coated.

In such an implementation, the inner race 912, outer race 914, and ball 1010 can still be made out of high-grade steel or a similar metal that is resistant to spalling and galling, but the ball 1010 is coated with a soft, lubricating substance. The lubricating substance breaks off of the ball 1010 during operations of the downhole-type blower system 124 and coats the inner race 912, outer race 914, and ball 1010 to provide a low-friction coating that acts to lubricate the bearing assembly 702a. Such an implementation has distinct advantages over grease based lubrication. For example, grease based lubricants can flash off in low-pressure hydrocarbon-rich environments, such as downhole environment 732. Such flashing can lead to dry bearings and shorten the life of the downhole blower system 124. Such flashing does not occur with soft coatings, such as lead or graphite. The soft coatings are able to stay in place and provide lubrication for the life of the downhole blower system 124. In some implementations, a seal, such as seal 704a or 704b, may be used to provide additional protection to bearing assemblies utilizing the ball 1010, but the sealing provided is not as critical as previously discussed bearing implementations.

Alternatively or in addition to any of the other implementations described in this specification, the downhole-type blower system 124 can be implemented using a pin bearing for axial force and rotor position control. As mentioned previously, the downhole-type blower system 124 can include a thrust bearing 724 on the downhole end of the permanent magnet rotor 720. The thrust bearing 724 supports the axial load of the rotating components with the downhole-type blower system 124 during operation and while the downhole-type blower 124 sits idle with the wellbore 104. The thrust bearing 724 can be used to position the permanent rotor 720 or the fluid rotor 712 axially within their respective housings during assembly as well. In contrast, the radial bearings, such as electric machine bearing assembly 706b, only provide radial support to a rotor, such as the permanent magnet rotor 720. In some implementations, the bearing assembly 706b can be a passive magnetic radial bearing, such an implementation is described later in FIG. 12A. In some implementations, the thrust bearing 724 can include a pin bearing. Such a pin bearing can utilize a lubrication system. As previously mentioned, bearing lubrication can flash off in a downhole environment 732, especially when the downhole environment 732 has a sub-atmospheric pressure. A dry bearing can cause overheating, warping, and seizing of the permanent magnet rotor 720. Such situations can reduce the life of downhole-type blower system 124. In some implementations, it may be more economical to utilize a lubrication system to continuously replenish lubricant rather than a protective bearing assembly seal, such as seal 704a or 704b, that slows the loss of lubrication.

FIG. 11A shows a schematic drawing of an example pin bearing 1100A. The pin bearing 1100A includes a rotor extension 1102a, extending axially from the downhole end 1101 of the permanent magnet rotor 720, a reservoir housing 1106, a recess 1116 capable of receiving the rotor extension 1102a and positioned at an uphole end of the reservoir housing 1106, a cap 1104 positioned at the downhole end of the reservoir housing 1106, a lubricant reservoir 1110 within the reservoir housing 1106, a spring 1108 located within the reservoir housing 1106, and a lubricant flow path 1112 that connects the lubricant reservoir 1110 to the curved recess 1116. The rotor extension 1102a can be any shape that is appropriate for supporting a thrust load of a rotating shaft, such shapes can include a semi-spherical shape, a curved shape, a truncated cone, or any other axisymmetric shape. The recess 1116 is appropriately shaped to receive and support the rotor extension 1102a. In some implementations, a reversal of axial thrust is possible. Such an event can unseat the pin bearing assembly 724. Unseating the pin bearing assembly can result in bearing damage and reduced life of the downhole-type blower system 124. A thrust reversal can occur during transportation or during a surge event during operation of the downhole-type blower system 124. Such a thrust reversal can be mitigated by a bumper 1124 positioned at an uphole end of a shaft. The bumper 1124 can be made of Teflon™, Viton™, rubber, or any other resilient material that is softer than the shaft material. The bumper 1124 can provide at least a partial pre-load towards the thrust bearing 724. In some implementations, the bumper 1124 can include a spring to provide the pre-load force.

The pin bearing 1100A receives a thrust load 1122 in the downhole direction from the rotating components of the downhole-type blower system 124 through the permanent magnet rotor 720. The spring 1108 applies a force to the lubricant reservoir 1110 to pressurize a lubricant 1118 within the lubricant reservoir 1110. The pressurized lubricant flows through a flow channel 1112 to the curved recess 1116 where the lubricant 1118 is deposited as a thin oil film 1120 between the surface of the curved recess 1116 and the curved rotor extension 1102a. The flow channel 1112 and spring 1108 regulate a flowrate of the lubricant such that the thin oil film 1120 does not dry out. The spring 1108 regulates the flowrate by setting a pressure within the lubricant reservoir 1110 while the lubricant flow path 1112 regulates the flowrate by applying a constant pressure drop across the flow path. The pressure drop is configured based on the effective diameter and length of the lubricant flow path 1112. The lubrication reservoir 1110 is sized such that there is sufficient lubrication 1118 to last the lifetime of the downhole-type blower system 124. Such a lifetime may be, for example, greater than 2 years. In some implementations, the reservoir may have a capacity 0.25 cubic inches. The reservoir size can be tailored to suit the needs of any specific application. A number of lubricant types can be used in the lubricant reservoir 1110, such as oil or grease.

FIG. 11B shows a schematic drawing of an example alternative pin bearing 1100B. The pin bearing 1100B includes a ball 1102b positioned between a rotor indentation 1120 and extends into the downhole end 1101 of the permanent magnet rotor 720, a reservoir housing 1106, a thrust indentation 1114 and positioned at an uphole end of the reservoir housing 1106, a cap 1104 positioned at the downhole end of the reservoir housing 1106, a lubricant reservoir 1110 within the reservoir housing 1106, a spring 1108 located within the reservoir housing 1106, and a lubricant flow path 1112 that connects the lubricant reservoir 1110 to the semi-spherical recess 1116. The rotor indentation 1120 can be any shape that is appropriate for supporting a thrust load of a rotating shaft against the ball 1102B, such shapes can include a semi-spherical shape. The recess 1116 is appropriately similarly shaped to receive and support the ball 1102 when it is under load. In some implementations, the recess 1116 and the indentation 1114 may not be fully semispherical; rather, they may just partially conform to the curve of the ball 1102B.

The pin bearing 1100B receives a thrust load 1122 in the downhole direction from the rotating components of the downhole-type blower system 124 through the permanent magnet rotor 720. The spring 1108 applies a force to the lubricant reservoir 1110 to pressurize a lubricant 1118 within the lubricant reservoir 1110. The pressurized lubricant flows through a flow channel 1112 to the semi-spherical recess 1116 where the lubricant 1118 is deposited as a thin oil film 1120 between the surface of the semi-spherical recess 1116 and pin ball 1102B. The flow channel 1112 and spring 1108 regulate a flowrate of the lubricant such that the thin oil film 1120 does not dry out. The spring 1108 regulates the flowrate by setting a pressure within the lubricant reservoir 1110 while the lubricant flow path 1112 regulates the flowrate by applying a constant pressure drop across the flow path. The pressure drop is configured based on the effective diameter and length of the lubricant flow path 1112. The lubrication reservoir 1110 is sized such that there is sufficient lubrication 1118 to last the lifetime of the downhole-type blower system 124. Such a lifetime may be, for example, greater than 2 years. A number of lubricant types can be used in the lubricant reservoir 1110, such as oil or grease.

Figure 11C:
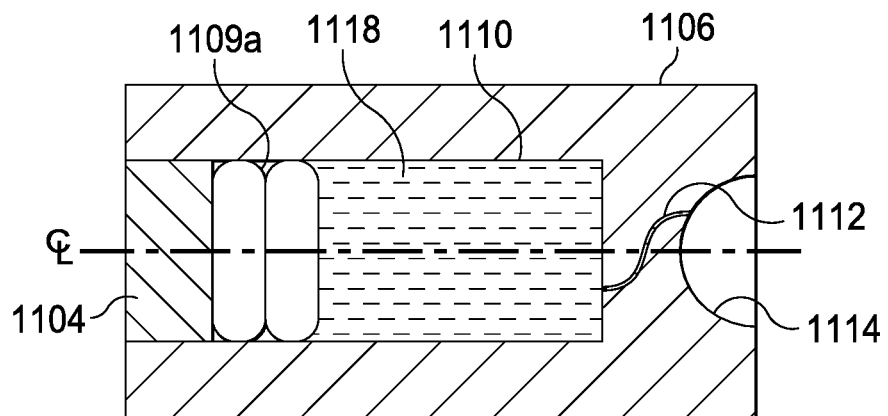
FIG. 11C is a lateral cross-sectional view of a lubrication reservoir.
Figure 11D:
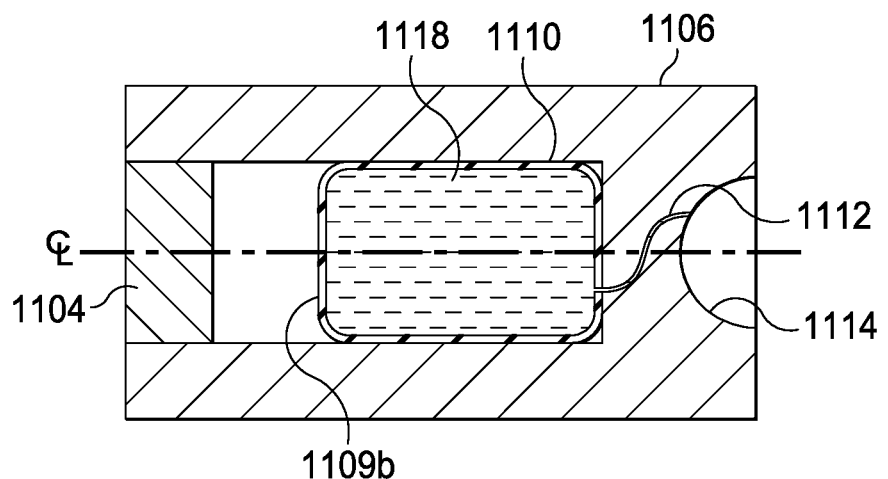
FIG. 11D is a lateral cross-sectional view of an alternative lubrication reservoir.

While the illustrated implementations show a metal spring 1108, other types of springs or pressurizers can be used to pressurize reservoir 1110. FIG. 11C shows an implementation where an air spring 1109a may be used in place of a metal spring. In some implementations, such as the illustrated implementation in FIG. 11D [[11d]], the lubricant 1118 may be stored and pressurized by a pressurized bladder 1109b, similar to a balloon.

Figure 12A:
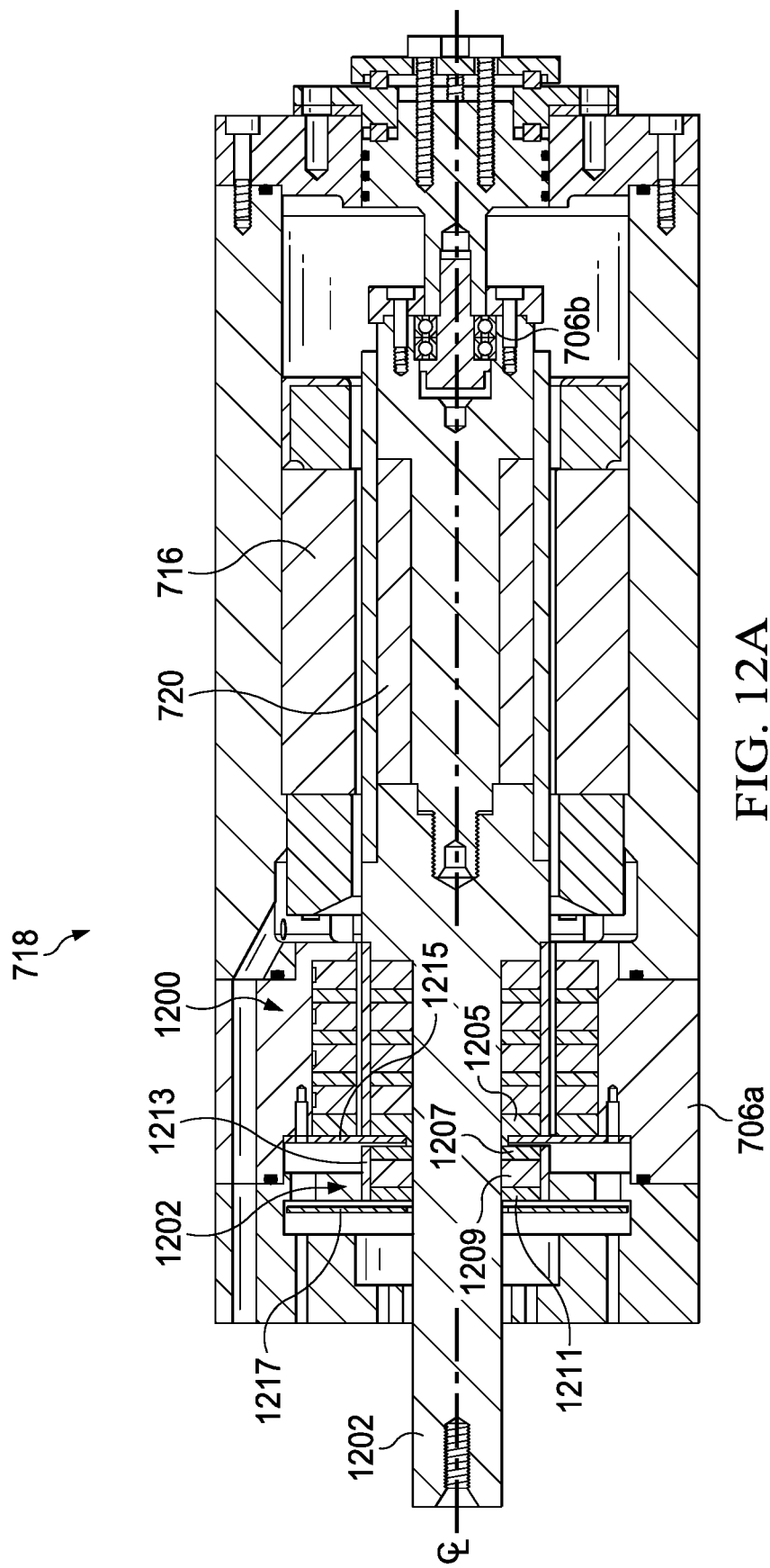
FIG. 12A is a schematic diagram of a detailed lateral cross-sectional view of an electric machine.

Alternatively or in addition to any of the other implementations described in this specification, the down-hole type blower system 124 can be implemented using a passive radial bearing. As previously discussed, some implementations of the down-hole type blower system 124 can utilize either passive or active magnetic radial bearings in bearing assemblies 702a, 702b, 706a, and 706b. An active magnetic bearing utilizes electromagnets positioned around either a ferrous shaft or a shaft with permanent magnets embedded within the shaft. The electromagnets are controlled with an active control system to adjust a shaft position and damp any vibrations that may occur during operation. A passive magnetic bearing utilizes permanent magnets of identical polarities in both a shaft and a stator to magnetically support a shaft. Typically, a separate damping system is needed for passive magnetic bearings. Such an example utilizing passive magnetic bearings is illustrated in FIG. 12A. FIG. 12A shows an example of the electric machine 718. In the illustrated implementation, bearing assembly 706b includes a set of ball bearings while bearing assembly 706a includes a passive magnetic radial bearing assembly 1200. The passive magnetic radial bearing assembly 1200 suspends the permanent magnet rotor 720 within the electric stator 716 with a magnetic field. In such an implementation, the permanent magnet rotor 720 does not come into contact with the housing. In some implementations, an active electronic damping assembly 1300 can be included in the downhole-type blower system 124. The active electronic damping assembly 1300 damps vibrations caused by a rotation 902 of a shaft of the downhole-type blower system 124.

Figure 12B:
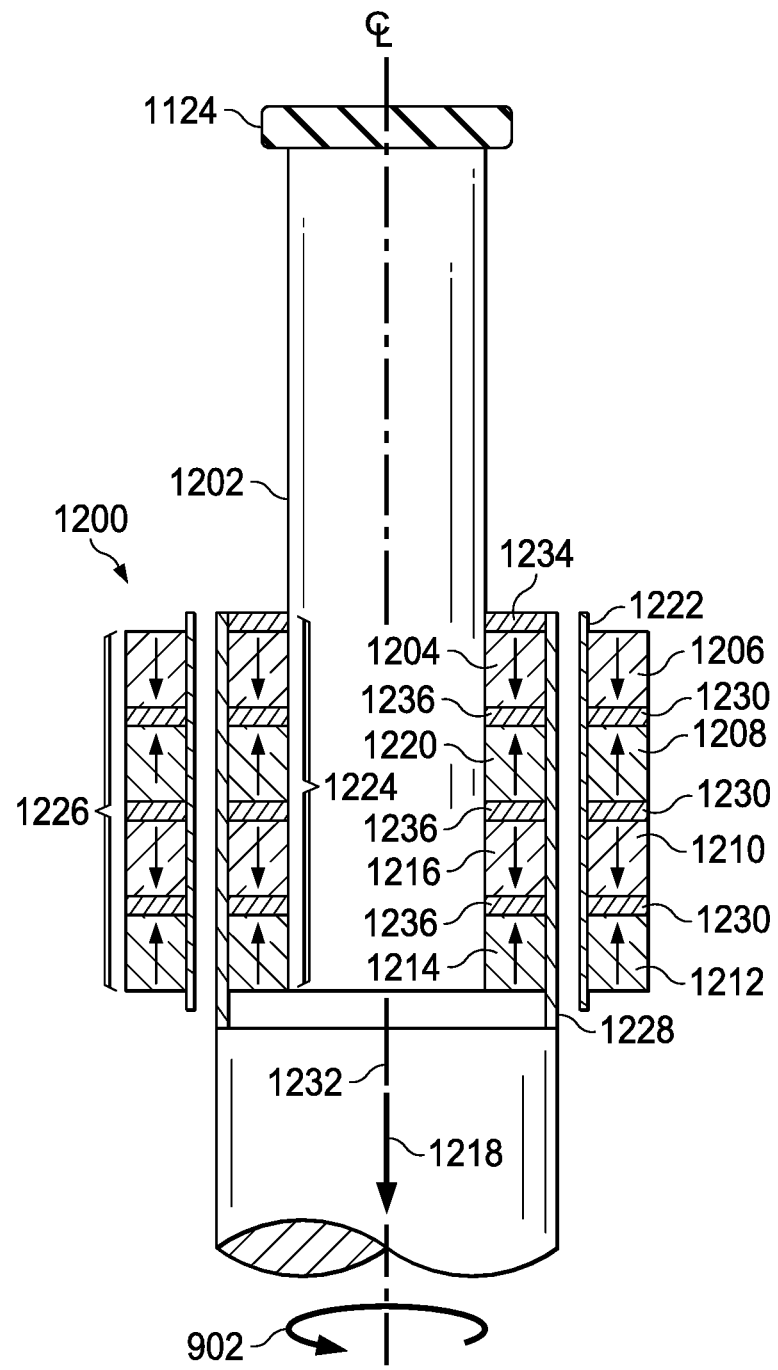
FIG. 12B is a schematic diagram of a detailed lateral cross-sectional view of a passive magnetic bearing assembly.

The passive radial magnetic bearing assembly 1200 is shown in greater detail in FIG. 12B. The passive magnetic bearing assembly 1200 includes a bearing shaft 1202. Bearing shaft 1202 can be included within either the fluid rotor 712 or the permanent magnet rotor 720. The bearing shaft 1202 is made of a non-magnetic material and includes a shaft magnet assembly 1224 which includes of individual axially-magnetized magnets (1204, 1220, 1216 and 1214 in this example) that are radially imbedded into the bearing shaft 1202 and each separated by a non-metallic, non-magnetic spacer 1236. In some implementations, the exterior surface of the shaft magnet assembly 1224 is substantially flush with the outer surface of the bearing shaft 1202 within standard machining tolerances. The shaft magnet assembly 1224 can be connected to the shaft by adhesive, slot fits, ring fits, an external sleeve, or any other manners of connection. The individual magnets within the shaft magnet assembly 1224 can be arranged so that the magnet polarities alternate along the shaft axis. For example, a first shaft magnet 1204 may have a north pole towards a downhole direction, a second shaft magnet 1220 may have a north pole towards an uphole direction, a third shaft magnet 1216 may have a north pole towards a downhole direction, and a fourth shaft magnet 1214 may have a north pole towards an uphole direction. In some implementations, the individual magnets within the shaft magnet assembly 1224, such as the first shaft magnet 1204, the second shaft magnet 1220, the third shaft magnet 1216, and the fourth shaft magnet 1214 shown in FIG. 12B, may each be composed of multiple smaller magnets of similar polarities.

The illustrated passive magnetic bearing 1200 also includes a stator magnet assembly 1226. The stator magnet assembly 1226 can be installed in a non-magnetic housing or holder and connected to either the fluid stator 710 or the electric stator 716 and surround the bearing shaft 1202. Each of magnets in stator magnet assembly 1226, such as magnets 1206, 1208, 1210 and 1212 in the example shown in FIG. 12B, are separated by the non-magnetic, electrically-conductive, spacers 1230. The stator spacer 1230 can act to generate eddy currents when an induced magnetic field changes as a result of a relative motion between the magnet rotor 720 and the stator magnet assembly 1226. The eddy currents act to oppose the change in the magnetic field and create a passive damping of a rotor radial vibration. The magnets within the shaft magnet assembly 1224 and the stator magnet assembly 1226 can be arranged so that that the identical poles of the individual magnets inside the shaft magnet assembly 1224 and the stator magnet assembly 1226 are substantially in line with one another. For example, a first stator magnet 1206 may have the same polarity as the first shaft magnet 1204, a second stator magnet 1208 may have the same polarity as the second shaft magnet 1220, a third stator magnet 1210 may have the same polarity as the third shaft magnet 1216, and a fourth stator magnet 1212 may have the same polarity as the fourth shaft magnet 1214. In some implementations, the individual stator magnets can be made-up of multiple smaller magnets having a similar polarity. Having magnets of similar polarities in proximity to one another creates a repulsion force that keeps the bearing shaft 1202 radially suspended within the stator magnet assembly 1226. While the shaft 1202 is suspended, the shaft 1202 can have a rotation 902 about a longitudinal axis 1232 that is not reduced by a surface-to-surface friction.

In some instances, the multiple shaft magnets and multiple stator magnets can be arranged in such a way as to create an axial force 1218, which could be directed either towards a thrust bearing, resulting in an additional thrust pre-load, or away from the thrust bearing, offsetting the weight of the rotor and therefore reducing the axial load on the thrust bearing, and, consequently, increasing its service life. This can be done by an axial offset in position of rotor magnets 1204, 1220, 1216, and 1214 to stator magnets 1206, 1208, 1210, and 1212 by less than a half of the axial magnet width: if the rotor magnets are shifted upwards with respect to the stator magnet, the axial force will be directed upwards and vice-versa. Even with the axial force 1218 directed towards the thrust bearing 724, a reversal of the axial thrust is possible during events such as transportation or a surge while operating the downhole-type blower system 124. As mentioned previously, such a thrust reversal can be mitigated by a bumper 1124 positioned at an uphole end of the shaft 1202. In some implementations, an inner protective can 1222 made out of a non-magnetic alloy can be installed to cover the inner diameter of the stator magnet assembly 1226, protecting its components from mechanical damage and sealing them from the environment. In some implementations, disk-shaped end pieces 1234 can be added to the ends of the shaft magnet assembly 1224, primarily to protect the free faces of the magnets within this assembly. The end pieces 1234 can be made identical to the shaft magnet spacers 1236. In some implementations, a sleeve 1228 made of a non-magnetic high strength alloy can be installed to cover outer diameter of the shaft magnet assembly 1224 and the end pieces 1234 to secure relative position of its components during high speed operation, protect them from damage and seal from the environment.

In some implementations, the inherent damping of the passive radial bearing assembly 1200 may be insufficient. In such instances, an active damper, such as the active damper 1300 shown in FIGS. 13A-13D, can be implemented.

The active damper 1300 includes a damper magnet 1302 that is radially imbedded into the bearing shaft 1202, in conjunction with the passive radial bearing shaft magnet assembly 1224. Each pole of the damper magnet 1302 is equipped with ferrous magnetically conductive damper magnet pole shoes 1304a and 1304b to ensure uniformity of the magnetic fields generated by the damper magnet 1302 around the rotor axis 1232. A damper sleeve 1306 may be placed over the outer diameters of the damper magnet 1302 and the damper magnet pole shoes 1304*a*, 1304*b* to hold them in place and prevent relative motion during rotation 902 of the shaft 1202.

Figure 13A:
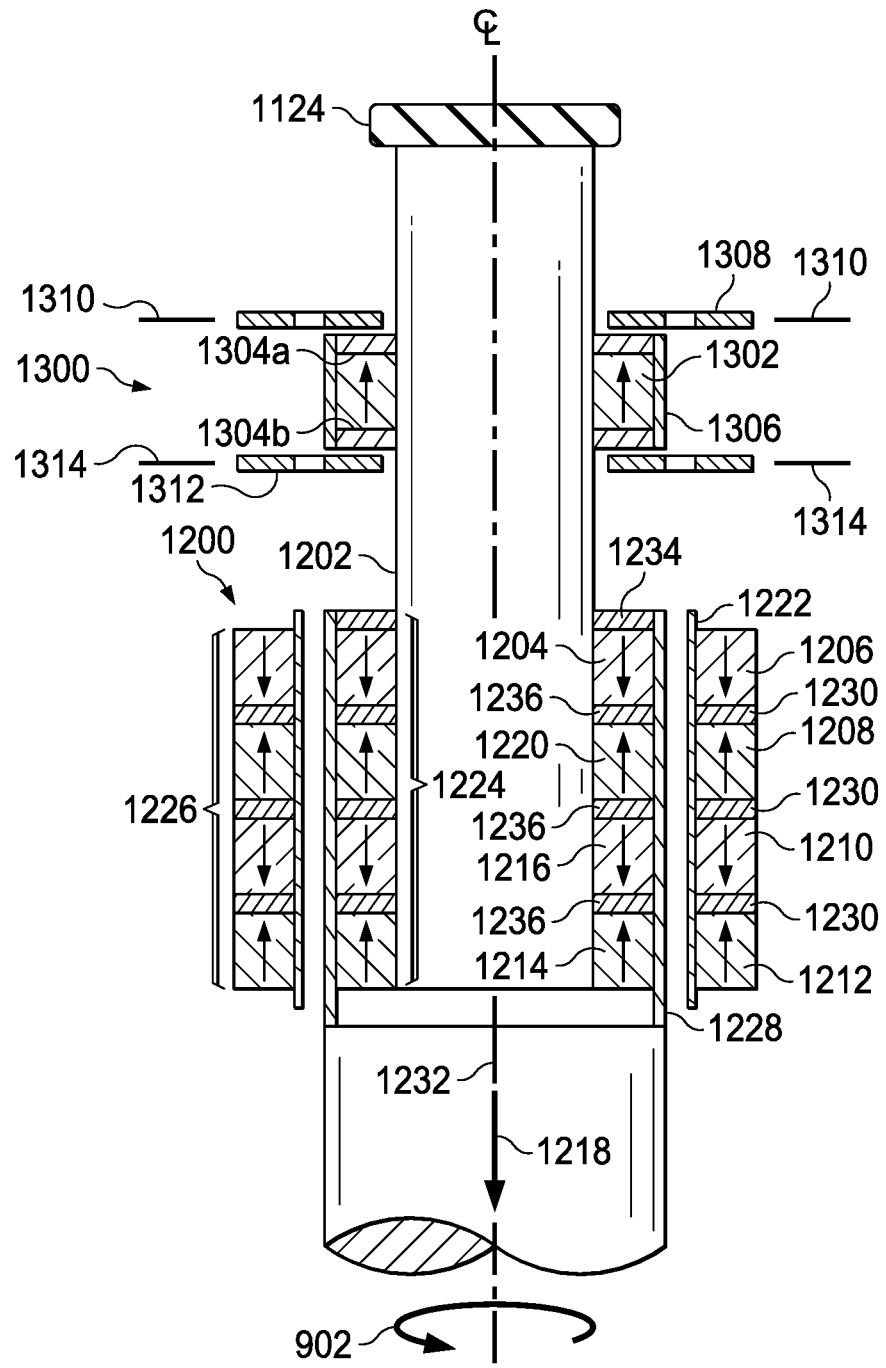
FIGS. 13A-13D are schematic diagrams of active dampers.

The active damper 1300 further includes a set of radial velocity sensing coils 1308 placed in the plane 1310 located close to the damper magnet pole shoe 1304*a*, coupled to the North pole of the damper magnet 1302 in the example shown in FIG. 13A.

The active damper also includes a set of the radial damper actuator coils 1312 placed in the plane 1314 located close to the damper magnet pole shoe 1304*b*, coupled to the South pole of the damper magnet 1302 in the example shown in FIG. 13A.

The radial velocity sensing coils within the coil set 1308 are partially exposed to a magnetic field emanated from the North pole of the damper magnet 1302, which has a substantial axial component. As will be discussed in more details later, when the damper magnet 1302 moves radially, the magnetic flux linked to at least some of the radial velocity sensing coils within the coil set 1308 will change. This, in accordance with Faraday's law, will induce electrical voltages on the terminals of those coils. The stronger the axial component of the magnetic field emanated from the damper magnet 1302, the higher will be voltages on the coil terminals for the same radial velocity of the magnet 1302.

Figure 13B:
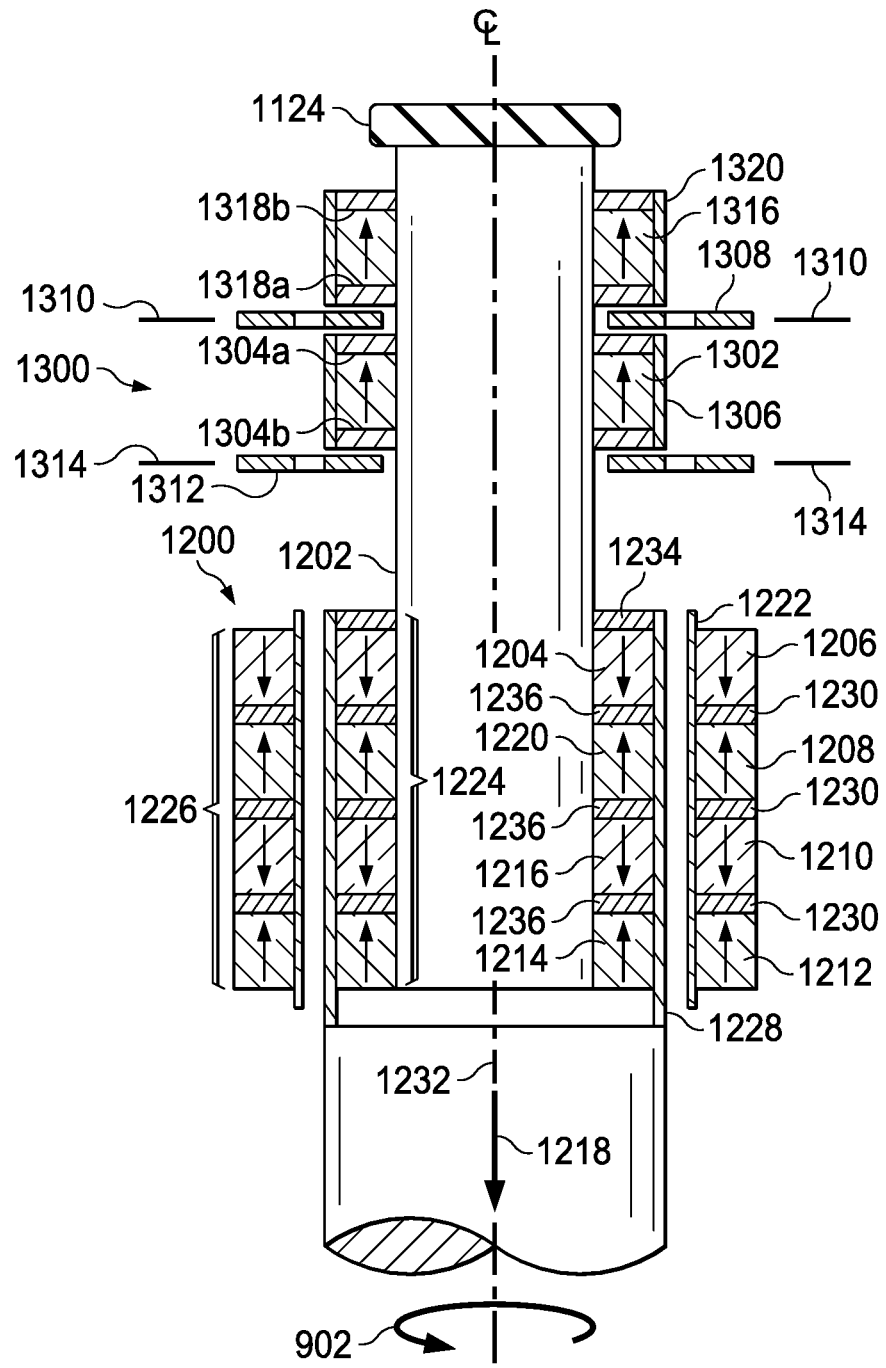

In order to further enhance voltages on the radial velocity sensing coils within the set 1308, an additional damper sensing magnet 1316 can be added to the shaft 1202 on the damper radial velocity sensing coil side opposite to the first damper magnet 1302 with the damper sensing magnet pole facing the coil set 1308 having the opposite polarity to the first damper magnet pole facing the coil set 1308 as illustrated in FIG. 13B. More specifically, in the example shown in FIG. 13B the first damper magnet 1302 is facing the radial velocity sensing coil set 1308 with the North pole, and, correspondingly, the additional damper sensing magnet 1316, located on the opposite axial side of the coil set 1308, is oriented so that it faces these coils with the South pole. In this configuration the magnetic fields from the first damper magnet 1302 and the additional damper sensing magnet 1316 add, resulting in the radial velocity sensing coils 1308 being exposed to a larger magnetic field than that produced by the first damper magnet 1302 alone, which leads to higher voltages induced in the radial velocity sensing coils 1308 when the shaft 1202 moves radially.

Similarly to the first damper magnet 1302, the damper sensing magnet 1316 might be equipped with at least one damper sensing magnet pole shoe 1318*a* made of a soft-magnetic material attached to the magnet pole facing the radial velocity sensing coil set 1308 (the South pole in FIG. 13B) in order to ensure the magnetic field uniformity around the bearing axis 1232. In addition, a second damper sensing magnet pole shoe 1318*b* can be attached to the remaining pole of the damper sensing magnet 1316, primarily to protect a face of the damper sensing magnet 1316 from mechanical damage. The second magnet pole shoe 1318*b* might be made of either soft-magnetic or non-magnetic material. Furthermore, similarly to the first damper sleeve 1306, an additional damper sensing magnet sleeve 1320 may be placed over the outer diameters of the damper sensing magnet 1316 and the damper sensing magnet pole shoes 1318*a*, 1318*b* to hold them in place and prevent relative motion during rotation 902 of the shaft 1202.

Similarly to the damper velocity sensing coils 1308, the damper actuator coils 1312 are partially exposed to a magnetic field emanated from the South pole of the damper magnet 1302, which also has a substantial axial component. As will be discussed in more details later, when an electrical current flows thru the coils 1312, Lorenz's force is exerted on the damper magnet 1302. The stronger the axial component of the magnetic field emanated from the damper magnet 1302, the larger will be Lorenz's force exerted on the damper magnet 1302 for the same electrical current in the coils 1312.

Figure 13C:
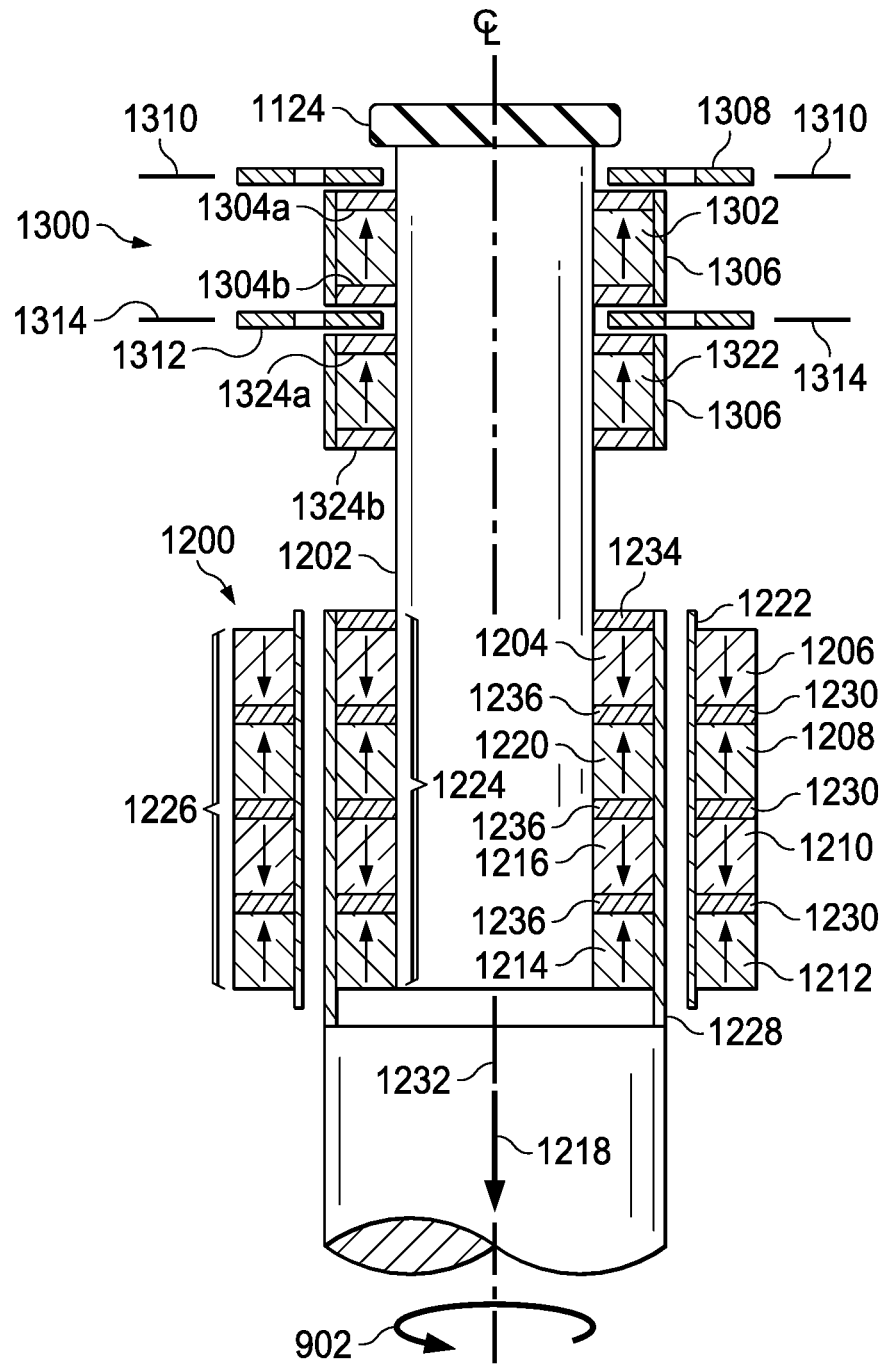

In order to further enhance the Lorenz's force exerted on the magnet 1302 when electrical currents flow in the damper actuator coils 1312, an additional damper actuator magnet 1322 can be added to the shaft 1202 on the damper actuator coil side opposite to the first damper magnet 1302 with the damper actuator magnet pole facing the coil set 1312 having the opposite polarity to the first damper magnet pole facing the coils 1312 as illustrated in FIG. 13C. More specifically, in the example shown in FIG. 13C the first damper magnet 1302 is facing the damper actuator coil set 1312 with the South pole, and, correspondingly, the additional damper actuator magnet 1322, located on the opposite axial side of the coil set 1312, is oriented so that it faces these coils with the North pole. In this configuration the magnetic fields from the first damper magnet 1302 and the additional damper actuator magnet 1322 add, resulting in the damper actuator coils 1312 being exposed to a larger magnetic field than that produced by the first damper magnet 1302 alone, which leads to larger Lorenz's forces exerted on the shaft 1202 when the damper actuator coils 1312 are energized with electrical currents.

Similarly to the first damper magnet 1302, the damper actuator magnet 1322 might be equipped with at least one damper actuator magnet pole shoe 1324*a* made of a soft-magnetic material attached to the magnet pole facing the damper actuator coils within the set 1312 (the North pole in FIG. 13C) in order to ensure the magnetic field uniformity around the bearing axis 1232. In addition, a second damper actuator magnet pole shoe 1324*b* can be attached to the remaining pole of the damper actuator magnet 1322, primarily to protect a face of the damper actuator magnet 1322 from mechanical damage. The second damper actuator magnet pole shoe 1324*b* might be made of either soft-magnetic or non-magnetic material. Furthermore, similarly to the first damper sleeve 1306, a damper actuator sleeve 1326 may be placed over the outer diameters of the damper actuator magnet 1322 and the damper actuator magnet pole shoes 1324*a*, 1324*b* to hold them in place and prevent relative motion during rotation 902 of the shaft 1202.

Figure 13D:
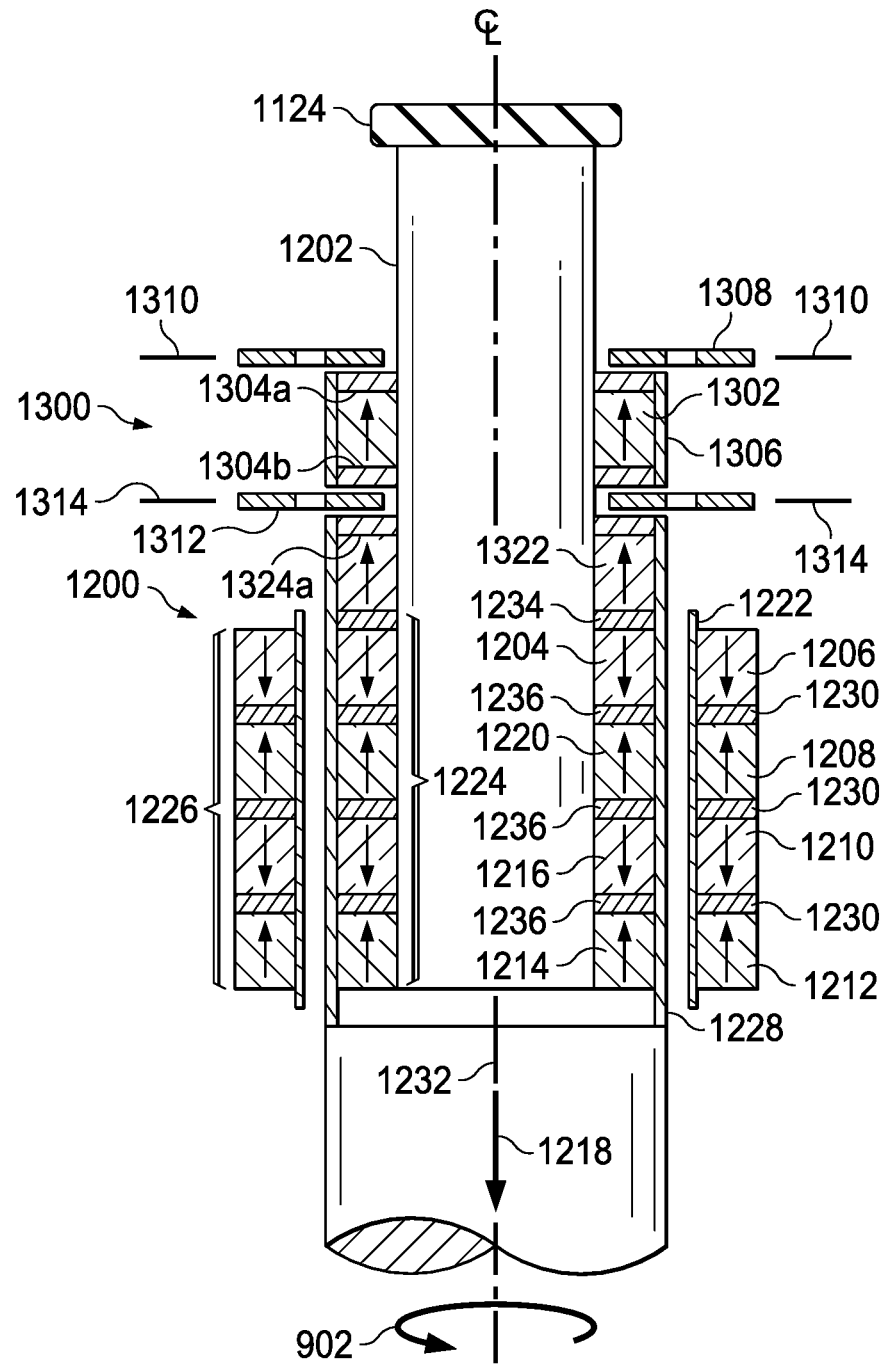

Alternatively, the additional damper actuator magnet 1322 can be configured as an additional magnet in the raw of the shaft magnet assembly magnets 1224 as illustrated in FIG. 13D with the end piece 1234 playing role of the damper actuator magnet pole shoe 1324*b* in FIG. 13C. The sleeve 1228 can be extended to cover the outer diameters of both the damper actuator magnet 1322 and the pole shoe 1324*a*.

Both the additional damper sensing magnet 1316 (FIG. 13B) and the additional damper actuator magnet 1322 (FIGS. 13C and 13D) can be used at the same time.

The roles of the radial velocity sensing coils 1308 and the damper actuator coils 1312 can be swapped.

The active damping circuit includes a shaft magnet 1209 that is radially imbedded into the bearing shaft 1202, in conjunction with the passive radial bearing rotor magnet 1204. Where 1204 may have a north pole towards an uphole direction, the magnet 1209 may have a north pole towards a uphole direction, to produce the highest field possible for the active damper circuit, 1215 and 1217. On each side of magnet 1209 is a ferrous magnetically conductive spacer 1207 and 1211. In addition, the spacer 1205 is also a ferrous magnetically conductive spacer. The spacers act to provide a lower reluctance path for each field produced by the permanent magnet. A non-magnetic high strength alloy material 1213 may be used over the magnets and spacers to hold them in place and prevent relative motion.

Figure 14A:
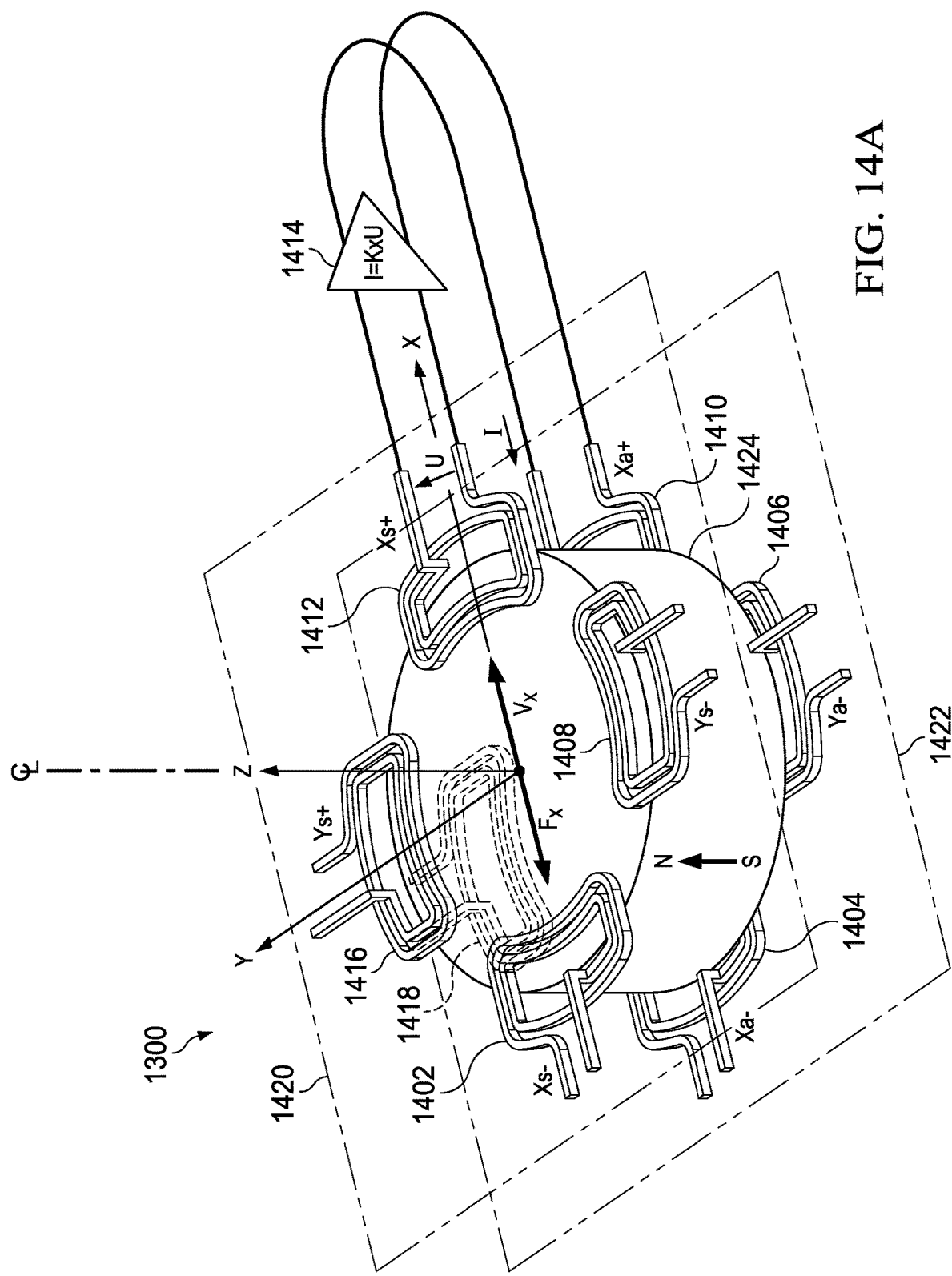
FIG. 14A is a schematic diagram of an electronic damping assembly.

The operational principle of the active damper 1300 is shown in FIG. 14A, which does not show the damper magnet pole shoes 1304a, 1304b and the damper sleeve 1306 for clarity. In addition to the damper magnet 1302, the set of the radial velocity sensing coils 1308 and the set of the damper actuator coils 1312, FIG. 14A shows an electronic amplifier 1414. One more additional component of the active damper 1300 that is not shown in either FIG. 13A or FIG. 14A for clarity is a power supply needed to operate the electronic amplifier 1414.

The radial velocity sensing coil set 1308 and the damper actuator coil set 1312 each includes of two or more planar electrical coils situated around the rotor axis; all the coils within the same set being placed in the same plane normal to the rotor axis. If only two coils are used in a set, they should not be placed along the same diagonal in order to be able to sense velocity or generate force in all radial directions.

The illustrated example shows that each coil set 1308 and 1312 includes identical planar coils located in the proximity of the axially opposite faces (poles) of an axially magnetized circular (disk-shaped) permanent damper magnet 1302 to be mounted on the shaft 1202. The coils within each set are situated uniformly around the shaft 1202 axis and are partially exposed to a magnetic field emanated from the magnet poles, which have substantial axial components.

The coils within the radial velocity sensing coil set 1308, an Xs+ coil 1412, an Xs− coil 1402, a Ys+ coil 1416, and a Ys− 1408 are used to measure the radial velocity of the damper magnet 1302. The coils within the damper actuator coil set 1312, an Xa+ coil 1410, an Xa− coil 1404, a Ya+ coil 1418, and a Ya− coil 1406, are used to exert radial forces on the damper magnet 1302. In the illustrated example, the damper magnet 1302 is moving in the positive "X" direction with velocity "Vx". This causes changes of the magnetic fluxes linked to the two top coils located along the X-axis: increase of the magnetic flux linked to the Xs+ coil 1412 and decrease of the magnetic flux linked to the Xs− coil 1402.

In accordance with Faraday's law, magnetic flux change in time results in an electromotive force, and, subsequently, electrical voltage "U" induced on the terminals of a sensing coil, such as Xs+ coil 1412. The voltage is proportional to a velocity of the magnet 1302. The voltage is applied to the input of an electronic amplifier 1414, which produces an output current "I" proportional to the input voltage. The current is subsequently applied to the terminal of the actuator coil Xa+ 1410 clocked identically to the sensing coil Xs+ 1412. Interaction between the current and the magnetic field emanated from the south pole of the illustrated permanent magnet will results in a radial Lorentz force exerted on the magnet, which will be proportional to the current. Reversing direction of the current will reverse direction of the force and the coil wiring polarity can be chosen so that the force will be directed opposite to the velocity, as required from a damping force. Applying the same technique to all four pairs of sensing and actuator coils would produce damping in all radial directions. In such implementations, one amplifier 1414 is needed for each sensing/actuating coil pair.

Figure 14B:
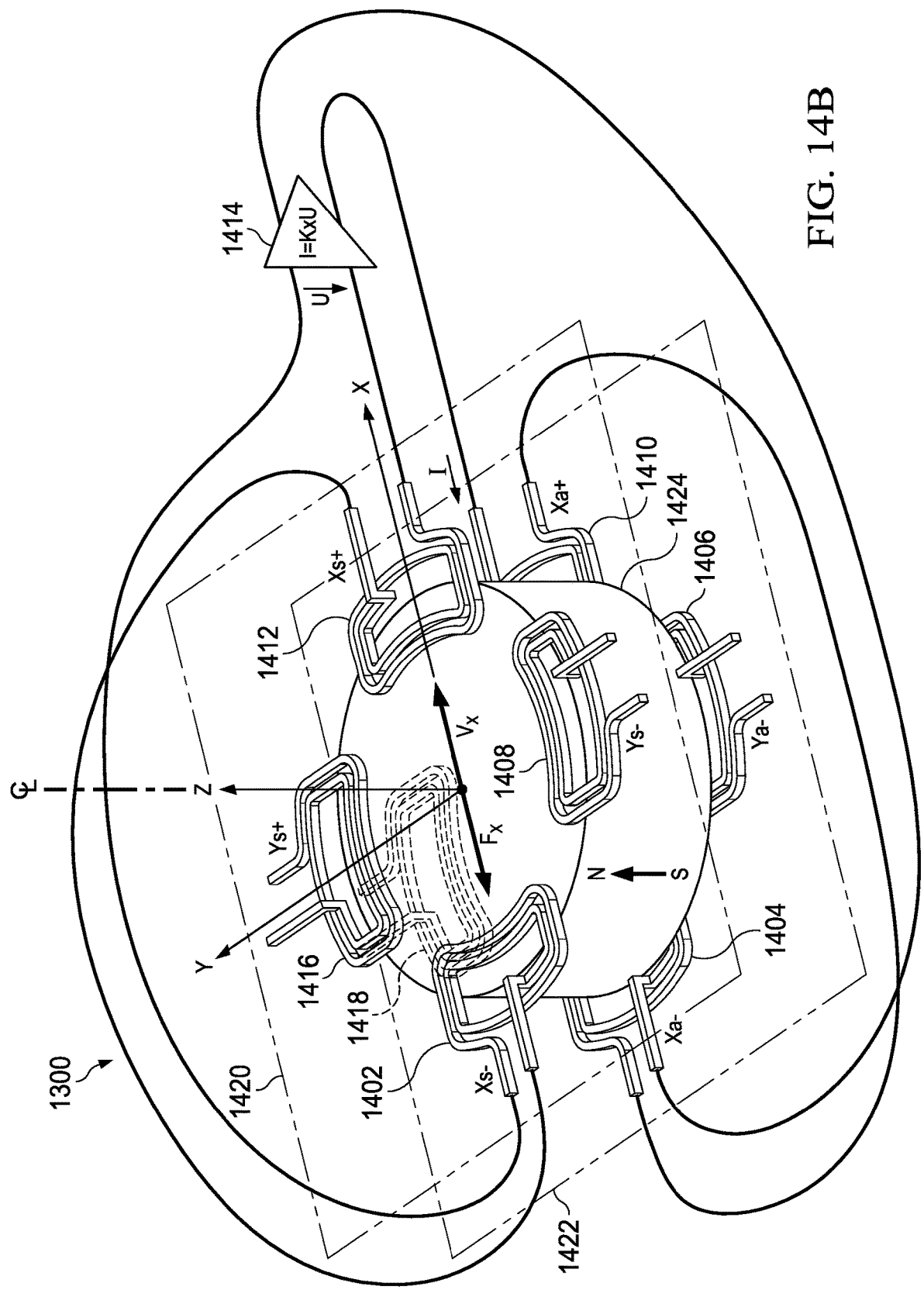
FIG. 14B is a schematic diagram of an electronic damping assembly.

An alternative implementation of an active damper 1300 is shown in FIG. 14B. When an even number of coils are used, two diametrically opposite sensing coils and two diametrically opposite actuator coils can be wired in series and only one amplifier is needed per axis as shown in FIG. 14B. Similar to the previous implementation, the coils within the radial velocity sensing coil set 1308, the Xs+ coil 1412, the Xs− coil 1402, the Ys+ coil 1416, and the Ys− 1408 are used to measure the radial velocity of the magnet. The coils within the damper actuator coil set 1312, an Xa+ coil 1410, an Xa− coil 1404, a Ya+ coil 1418, and a Ya− coil 1406, are used to exert radial forces on the magnet. In the illustrated example, the magnet 1424 is moving in the positive "X" direction with velocity "Vx". This causes changes of the magnetic fluxes linked to two top coils located along the X-axis (Xs+ coil 1412 and Xs− coil 1402) leading to an increase of the magnetic flux linked to the Xs+ coil 1412 and decrease of the magnetic flux linked to the Xs− coil 1402. The sensing coils, coil Xs− 1412 and coil Xs+ 1402 can be wired so that the voltages induced in the two coils is summed and the respective actuator coils, Xa+ 1410 and Xa− 1404, can be wired so that the forces they produce are summed. In such implementations, one amplifier 1414 is needed for each sensing/actuating coil quad, that is, one amplifier per damped axis.

As previously mentioned, a power supply is needed for the operation of the electronic amplifier, such as amplifier 1414. A large damping coefficient is needed from the active damper 1300 to keep the system stable, but the load capacity does not need to be substantial. Therefore, the active damper 1300 is not expected to consume large power. A sufficient power supply may be obtained by either adding an additional turn to the electric stator 716 winding or adding an additional generator magnet to the permanent magnet rotor 720 and a pickup coil to the electric stator 716 in the proximity of the generator magnet so that the generator magnet would induced a voltage in the pickup coil whenever the permanent magnet rotor 720 is spinning. In either case, the voltage on the terminal of either additional motor winding coil or the pickup coil can be rectified and used to provide power for the damper 1300 or amplifier 1414, eliminating the need for additional power supply wires.

Figure 15A:
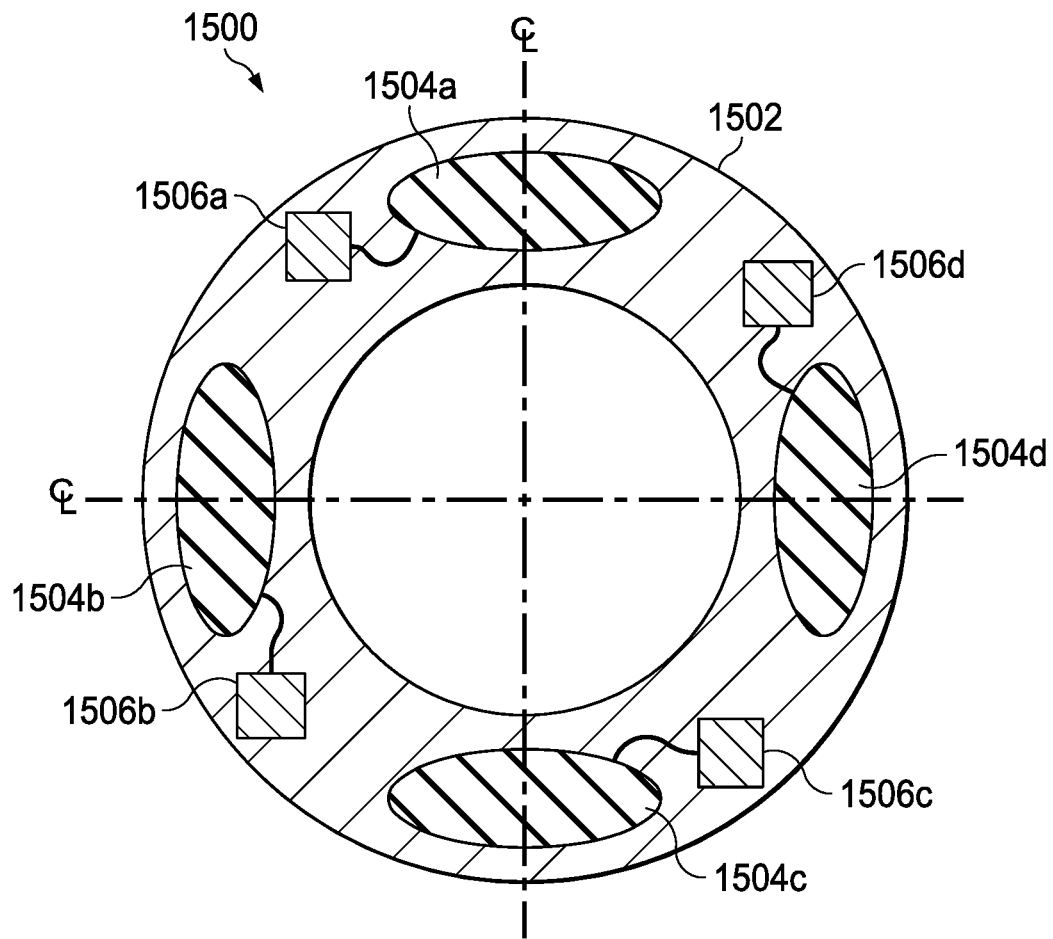
FIG. 15A is a schematic diagram of a top-view of a printed circuit board.

FIG. 15A shows a schematic diagram of the planar coils discussed previously implemented using Printed Circuit Board (PCB) technology. The illustrated PCB assembly 1500 includes a PCB board 1502, a first coil 1504a, a second coil 1504b, a third coil 1504c, and a fourth coil 1504d. The PCB assembly also includes a first electronic amplifier 1506a that is configured to interface with the first coil 1504a, a second electronic amplifier 1506b that is configured to interface with the second coil 1504b, a third electronic amplifier 1506c that is configured to interface with the third coil 1504c, and a fourth electronic amplifier 1506d that is configured to interface with the fourth coil 1504d. To complete the active damper 1300, a first and second PCB 1502 (PCB with the radial velocity sensing coils and the damper actuator coils), one for each side of the disc shaped magnet 1424, can be used. Alternatively, the electronic amplifiers 1506a, 1506b, 1506c and 1506d can be placed on a dedicated PCB and connected by wires to the radial velocity sensing coils and the damper actuator coils as illustrated in FIGS. 14A and 14B.

Figure 15B:
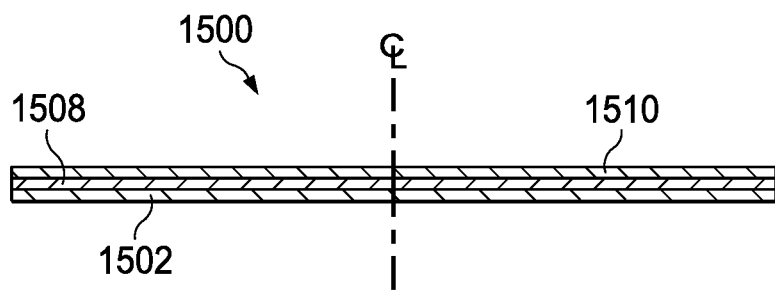
FIG. 15B is a schematic diagram of a side-view of a printed circuit board.

FIG. 15B shows a side view of PCB assembly 1500. The PCB assembly can include the PCB layer 1502, the component layer 1508, and a protective sheet 1510. The protective sheet 1510 can be constructed with sheets of a non-magnetic corrosion resistant material, such as stainless steel, for mechanical protection.

Figure 16:
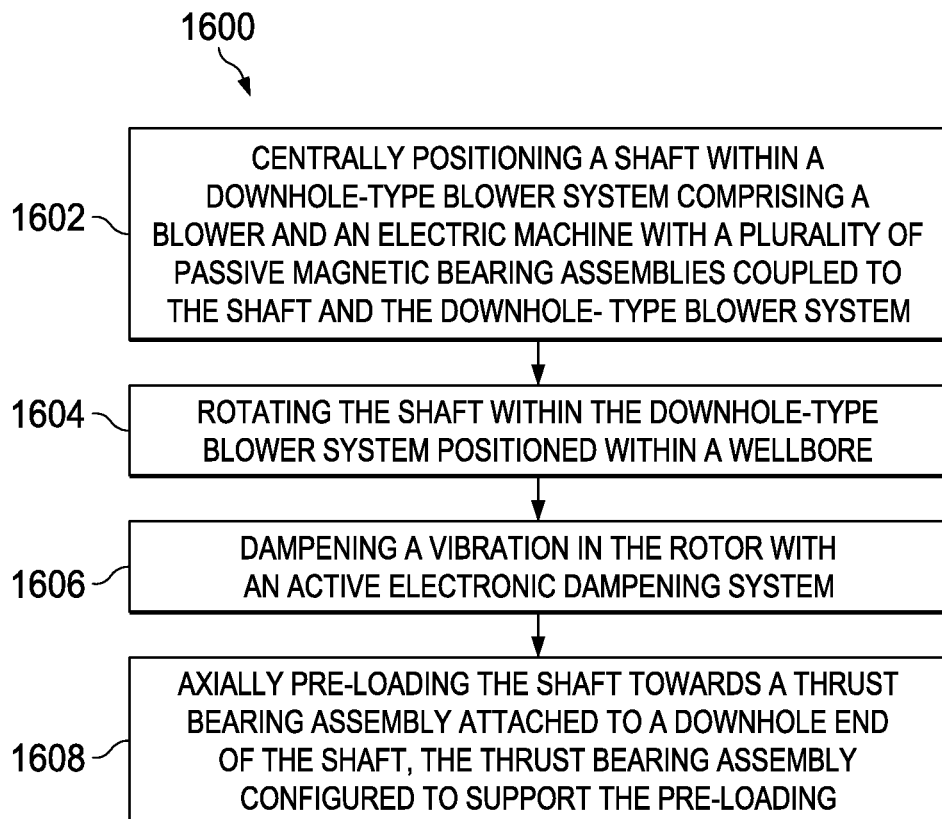
FIG. 16 is a flowchart showing an example method for utilizing a shaft supported with passive magnetic bearings.

FIG. 16 shows a flowchart with an example method 1600 that can be utilized with magnetic bearings within the downhole-type blower system 124. At 1602, a shaft 1202 is centrally positioned within a downhole-type blower system 124. The downhole-type blower system 124 can include a blower 708 and an electric machine 718 with a passive magnetic bearing assembly 1200 coupled to the shaft 1202 and the downhole-type blower system 124. At 1604, the shaft 1202 is rotated within the downhole-type blower system 124 positioned within a wellbore. At 1606, a vibration in the rotor is damped with an active damper. To damp the vibration in the shaft 1202, a voltage from a sensor coil, such as Xs+ coil 1412, is directed to an amplifier, such as amplifier 1414. The voltage is induced by a changing magnetic flux linked to the sensor coil. A positive feedback current is applied to an actuator coil, such as coil Xa+ 1410, with the amplifier. A force created by the current in the actuator coil is applied to the shaft 1202. The applied force counteracts the vibration. At 1608, a static offset force is exerted on the shaft 1202 by axial offsetting the shaft magnet assembly 1224 with respect to the stator magnet assembly 1226.

Alternatively or in addition to any of the other implementations described in this specification, the down-hole type blower system 124 can be implemented with a common shaft integrating the blower and the electric machine. In some implementations, the downhole-type blower system 124 is constructed with a single shaft. Constructing the rotating parts of the downhole-type blower system 124 on a single shaft can reduce the required number of radial bearings and other system components. The single shaft implementation can also allow for a shorter construction length of the downhole-type blower system 124 as the coupling 714 is no longer necessary. Constructing the rotating parts on a single shaft can also minimize or eliminate alignment issues. The elimination of such issues can result in reduced vibrations, lower costs, increased ease of assembly and installation, improved reliability, and extended life of the downhole-type blower system 124.

Figure 17:
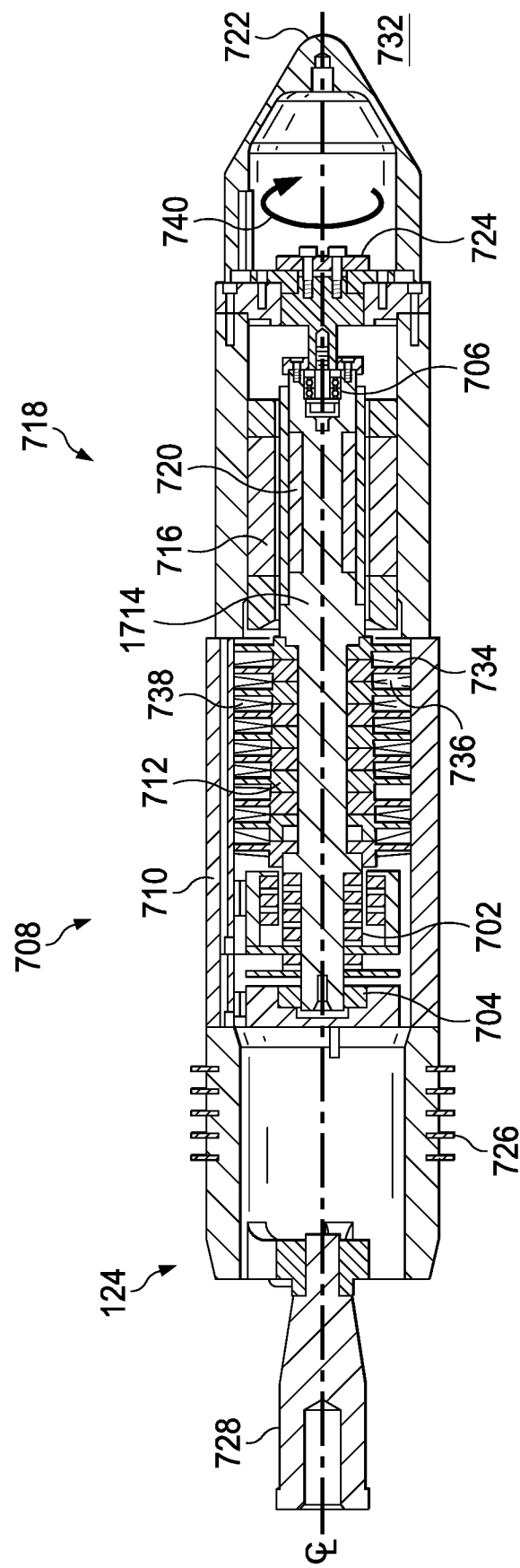
FIG. 17 is a schematic diagram of a lateral cross-section of a downhole-type blower system with a single shaft.

FIG. 17 shows a schematic diagram of a downhole-type blower system 124 constructed using a single shaft. In the illustrated implementation, the downhole-type blower system 124 includes a cylindrical body that can be positioned within the wellbore 104. The downhole type blower system 124 includes both a blower 708 and an electric machine 718. The blower 708 and the electric machine 718 are constructed and balanced as a single unit. That is, the blower 708 and electric machine are in the same housing and are constructed on a single shaft 1714. The single shaft 1714 is a solid and continuous body with no breaks or and lacks any couplings to couple a blower shaft to an electric machine shaft. As the fluid rotor 712 and the permanent magnet rotor 720 are constructed on the same shaft or shafts that are mechanically locked together, such as with a high strength sleeve, both rotors are constructed and balanced together during construction. The single shaft 1714 has sufficient stiffness to support both the fluid rotor 712 and the permanent magnet rotor 720 without sagging; that is, the shaft 1714 is unsupported between bearing assembly 706 and bearing assembly 702. The single shaft 1714 has sufficient strength to transfer torque between the fluid rotor 712 and the permanent magnet rotor 720.

In some implementations, the single shaft 1714 can be configured to not operate at or above the critical speed for the single shaft 1714. The single shaft 1714 can be longer and less stiff than other implementations. As a result of the lower stiffness, the critical speed is lower for a single shaft implementation. A critical speed is the speed at which a shaft rotates at its natural frequency. Machinery can be classified as operating at a supercritical speed (above the critical speed) or at a subcritical speed (below the critical speed). While a single shaft can be less stiff than each individual shaft of a multiple coupled shaft system, a single shaft can rotate at the same speed as the multiple coupled shafts, and can be rotating at a subcritical speed or can be rotating at a supercritical speed.

As above, the blower 708 includes a fluid stator 710 and a fluid rotor 712 that is centrally located within and carried by the fluid stator 710, and includes multiple stator vanes 736 that extend inward from the stator inner surface and multiple rotor blades 734.

In the illustrated implementation, the fluid rotor 712 is supported within the fluid stator 710 by a blower bearing assembly 702 on an uphole end of fluid rotor 712. The blower bearing assembly 702 can be protected from a downhole environment 732 by a bearing assembly seal 704.

The electric machine 718, which is positioned downhole of the blower 708, includes an electric stator 716 and a permanent magnet rotor 720 that is centrally positioned within and carried by the electric stator 716. The electric machine 718 can be utilized as either a synchronous motor or a synchronous generator. The permanent magnet rotor 720 is supported within the electric stator 716 by an electric machine bearing assembly 706 on the downhole end of the permanent magnet rotor 720. In some implementations, a thrust bearing 724 can be included at the downhole end of the permanent magnet motor 720. In some implementations, the thrust bearing 724 can be included in the bearing assembly 706. The entire electrical machine 715 in which the electrical-machine bearing assembly 706 are located is sealed from the downhole environment 732. As a result, the electrical-machine bearing assembly 706 does not require the protection of seals and are left unsealed.

The electric machine 718 also includes electrical windings. The electric windings are connected to a topside facility (not shown) with a power cable (not shown). In some instances, the power cables can be connected to a control circuit (not shown). The control circuit can send an alternating electrical current downhole through the power cable and to the electric machine 718. The current induces a torque on the permanent magnet rotor 720 and creates a rotation 740 in the permanent magnet rotor 720. The speed of the rotation 740 is proportional to a frequency of the alternating current. In some implementations, the permanent magnet rotor 720 may have a torque input outside of the electric machine 718. In such an instance, the rotation 740 of the permanent magnet rotor 720 induced an alternating current within the electric windings of the electric stator 716. The current is directed uphole to a control circuit located at a topside facility through the power cable. In some implementations, the control circuit can include a variable frequency drive (VFD) 308 of a variable speed drive (VSD) 306. The frequency of the alternating current is proportional to the rate of rotation 740 of the permanent magnet rotor 720.

The downhole-type blower system 124 can also include a positioning connector 728 at the uphole end of the downhole-type blower system 124, a secondary wellbore seal 726 radially extending out from the outer surface of the downhole type blower system 124 and downhole of the positioning connector 728, a centralizer 730 extending radially out from the outer surface of the downhole-type blower system 124, and a sensor suite 722 located at the downhole end of the downhole-type compressor 124. The positioning connector 728 can be used to position the downhole-type blower within the wellbore 104 and retrieve the downhole-type compressor 124 from the wellbore 104. The positioning connector 728 can be configured to connect to coiled tubing, twist rods, or any other method of deployment. The positioning connector 728 can be configured differently based on the deployment method. For example, if sucker rod is used, the positioning connector 728 can be threaded to allow the sucked rode to be directly attached to the connector. If a wireline deployment is used, the positioning connector 728 could be a latch or other similar attachment. The secondary wellbore seal 726 is made of a soft inert material, such as Viton™ or Teflon™, and provide a secondary seal in addition to other primary sealing methods discussed within this disclosure. The centralizers 730 can be made of either metal or a stiff polymer shaped as a leaf-spring. Multiple centralizers are radially equally spaced around the downhole-type blower system 124 and at least partially centralize the downhole-type blower within the wellbore 104. Centralization within the wellbore 104 helps ensure even gas flow around the electric machine 718 and an even gas flow within the blower 708. An even gas flow across the electric machine 718 ensures adequate cooling of the electric machine 718 during operation. An even gas flow through the blower 708 ensures an even load distribution on both the blower bearing assembly 702 and the electric machine bearing assembly 706. Both of these factors help increase the life of the downhole-type blower system 124.

Alternatively or in addition to any of the implementations described in this specification, the blower system can be configured with an integrated blower and electric machine. The resulting blower system is more compact compared to the blower system with the discreet compressor and motor sections.

In some implementations, the blower and the electric machine are integrated by using the lamination features of the electric machine at the stator bore to be the flow path stator of the blower. As described below, the rotor is designed as an alternating stack of magnetic sections and aerodynamic blower vane rings. The magnetic sections of the rotor interact with stator vane sections. The integrated electric machine can be on any type of bearing, for example, an active bearing, a passive bearing, a combination magnetic bearing or other bearing. In some implementations, a derived voltage from the stator can be used to power up the active components of the magnetic bearing. In some instances, a top-side compressor can be installed uphole of the integrated electric machine, for example, at the surface of the wellbore, to assist production as described earlier. In such instances, the operation of the top-side compressor can cause freewheeling of the blower. In response, the electric machine can power itself up on magnetic bearings without the aid of an external power supply.

The integrated electric machine described here can be more compact, easier to install, more reliable, and lower cost compared to a blower system in which the blower and the electric machine are separate. Because the integrated electric machine described here does not need a coupling and implements only two bearing systems, the cost and maintenance of the integrated electric machine can be lower compared to the blower system with separate blower and electric machine.

Figure 18:
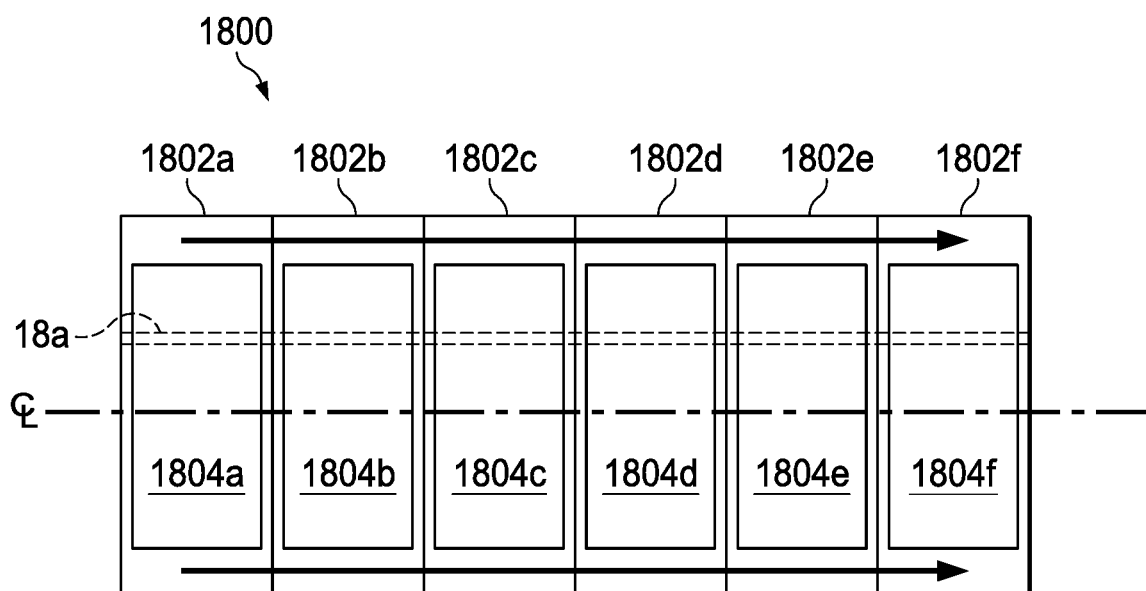
FIG. 18 is a schematic diagram of an integrated blower system.

FIG. 18 is a schematic diagram of an integrated blower system 1800. The system 1800 includes multiple stators (e.g., a first stator 1802a, a second stator 1802b, a third stator 1802c, a fourth stator 1802d, a fifth stator 1802e, a sixth stator 2f, or more or fewer stators), arranged on a longitudinal axis. The system 1800 also includes multiple rotors (e.g., a first rotor 1804a, a second rotor 1804b, a third rotor 1804c, a fourth rotor 1804d, a fifth rotor 1804e, a sixth rotor 1804f, or more or fewer rotors). Each rotor is positioned and carried to rotate within a respective stator about the longitudinal axis. A stator and a rotor positioned within the stator can form a blower system stage. Thus, the blower system can include one stage (i.e., one stator and one rotor) or multiple stages (i.e., multiple stators and multiple rotors) arranged serially on the longitudinal axis. In some implementations, the multiple stages (for example, the multiple rotors) can be connected using a tie bolt 18a to lock the multiple stages together to form a stiff shaft assembly. The features of each stator and each rotor are described below with reference to the first stator 1802a and the first rotor 1804a, respectively.

Figure 19:
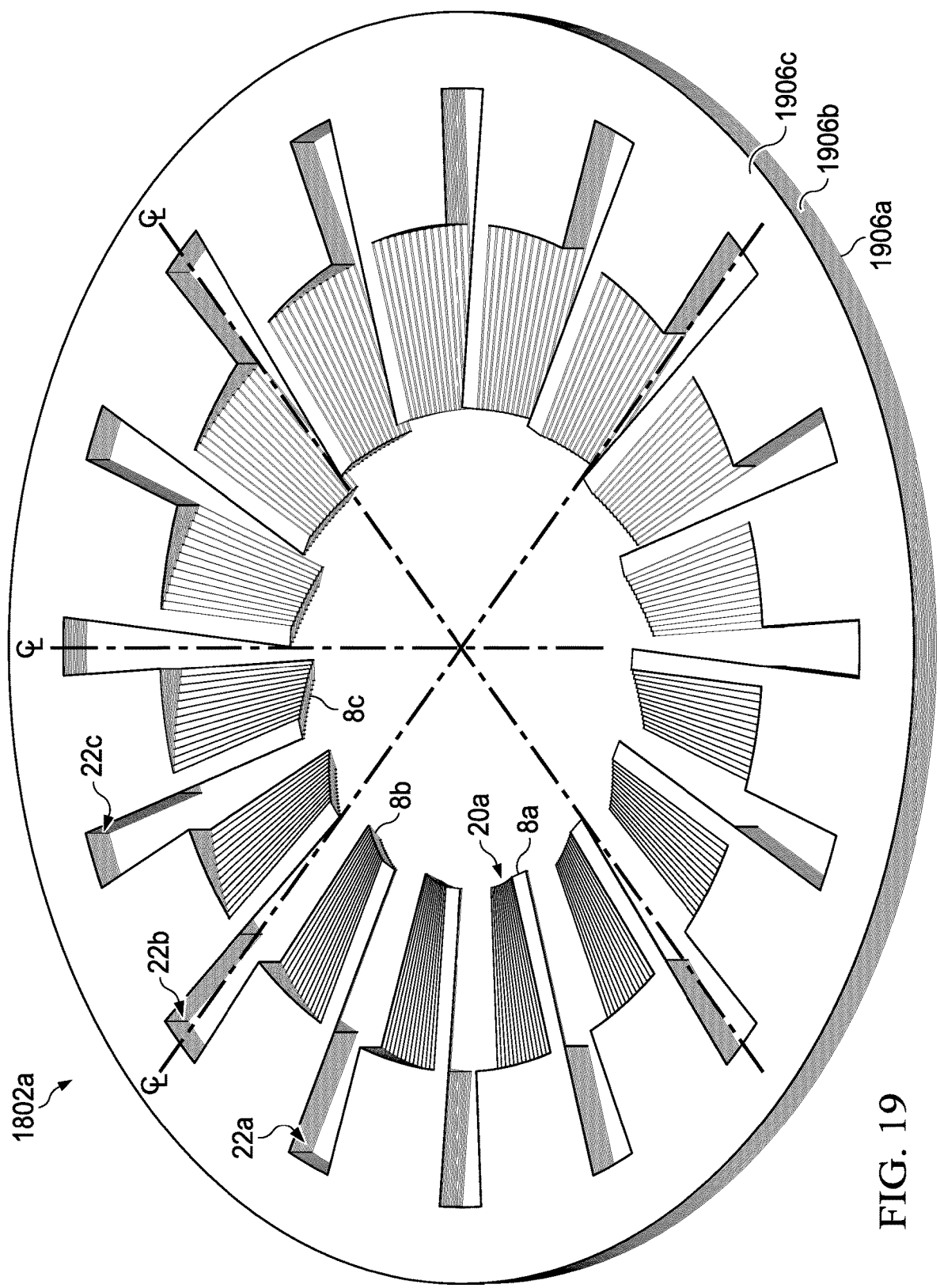
FIG. 19 is a schematic diagram of a stator which includes multiple stator sub-assemblies.

FIG. 19 is a schematic diagram of the first stator 1802a, which includes multiple stator sub-assemblies (e.g., a first stator sub-assembly 1906a, a second stator sub-assembly 1906b, a third stator sub-assembly 1906c, or more or fewer stator sub-assemblies). Each stator sub-assembly can be a lamination stacked with other laminations to form the first stator 1802a. A lamination is made of electrical steel and can be thin. Multiple such laminations can be stacked together to make the stator core of the stator-subassembly that can resist formation of electrical eddy currents. The first stator 1802a includes multiple stator vanes (e.g., a first stator vane 8a, a second stator vane 8b, a third stator vane 8c, or more or fewer stator vanes). Each stator vane tip (e.g., stator vane tip 20a) can have a unique lamination tip design to provide a necessary flow pattern to drive the fluid through the blower system. The first stator 1802a includes multiple slots (e.g., a first slot 22a, a second slot 22b, a third slot 22c, or more or fewer slots). Each slot serves a dual purpose—a pole in which an electric machine winding is disposed and a space between two blower vanes through which the fluid is flowed or driven. The laminations used to construct each stator sub-assembly are stacked or cut to form each slot and each stator vane tip as an angled vane that can drive the fluid.

Figure 20:
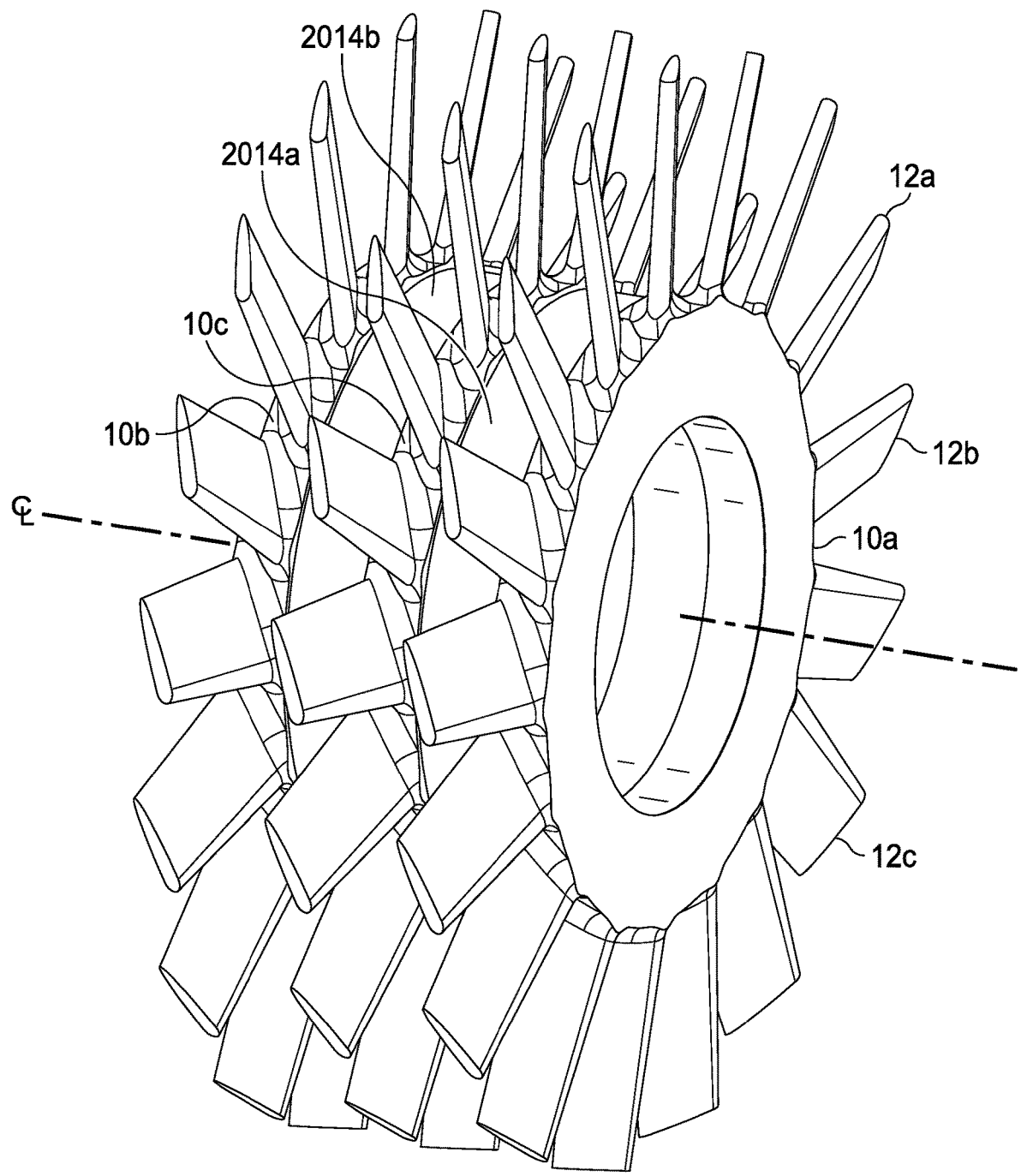
FIG. 20 is a schematic diagram of a rotor which includes multiple vane sections.

FIG. 20 is a schematic diagram of the first rotor 1804a, which includes multiple vane sections (e.g., a first vane section 12a, a second vane section 12b, a third vane section 12c, or more or fewer vane sections). The first rotor 1804a comprises a ring-shaped inner portion having an outer circumference to which the multiple vane sections are attached. Each vane is designed to drive fluid between the first rotor 1804a and the first stator 1802a when the first rotor 1804a rotates within the first stator 1802a or to be rotated by fluid flowed between the first rotor 1804a and the first stator 1802a.

The first rotor 1804a also includes multiple magnetic sections (e.g., a first magnetic section 2014a, a second magnetic section 2014b, or more or fewer magnetic sections) arranged (for example, alternatingly arranged) between the multiple vane sections. Each magnetic section includes a ring-shaped permanent magnet having substantially the same size and shape as the ring-shaped inner portion of the first rotor 1804a. Each magnetic section is arranged in a two or more-pole arrangement. In some implementations, the first rotor 1804a includes a sleeve in which a vane section is positioned. Alternatively or in addition, the rotor 1804a includes an extension member to hold the vane section in place and to seal the vane sections from the fluid flowed through the blower system 1800.

Figure 21:
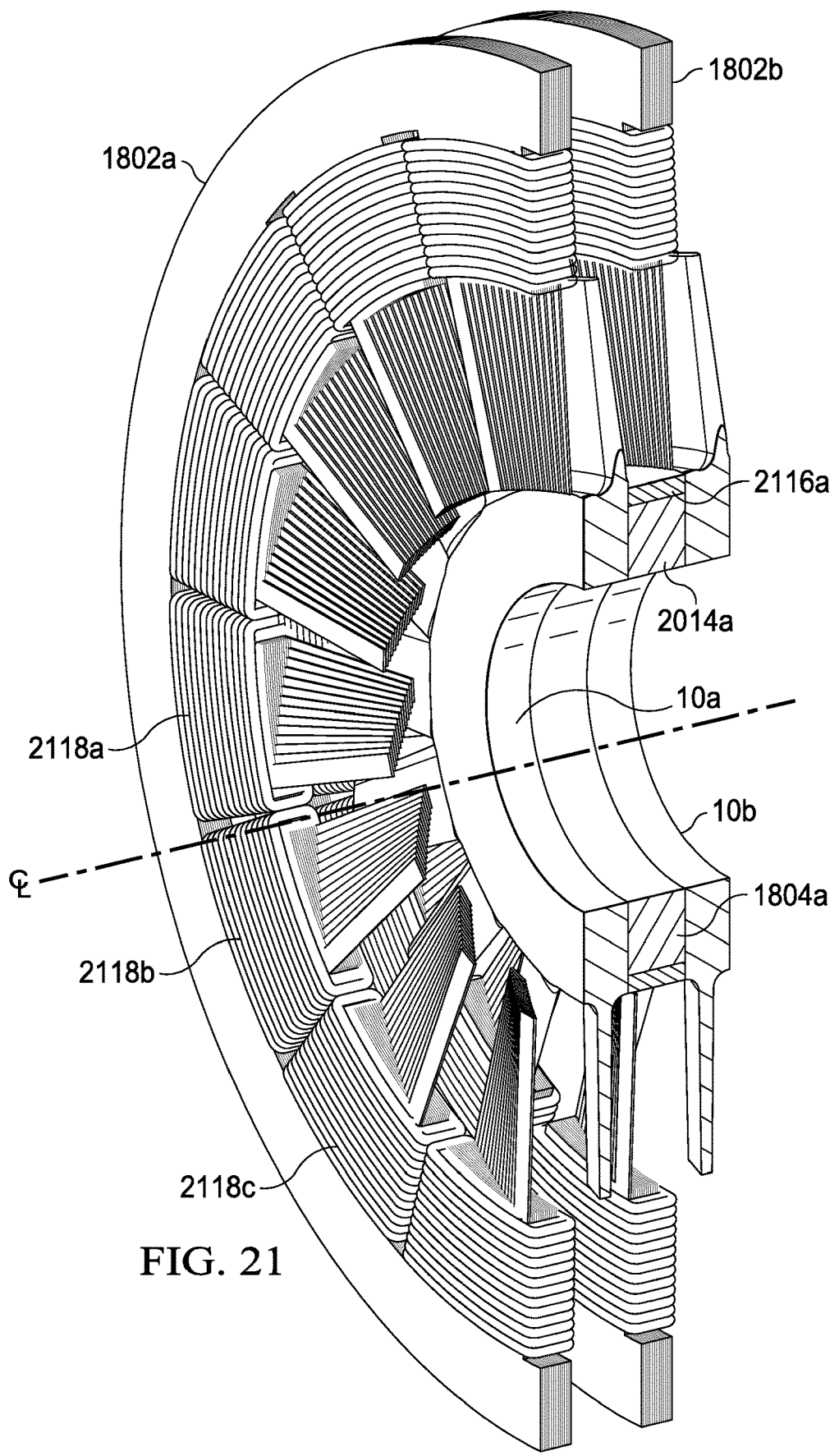
FIG. 21 is a schematic diagram of a cross-section showing multiple stators and multiple rotors.

FIG. 21 is a schematic diagram of a cross-section showing multiple stators and multiple rotors. For example, the first magnetic section 2014a is positioned in a sleeve 2116a and is sandwiched between two vane sections (namely, the first vane section 10a and the second vane section 10b). The first rotor 1804a is arranged with respect to the second stator 1802b such that the first magnetic section 2014a is radially aligned with the stator vanes of the first rotor 1804a. The vane sections are positioned between the first stator 4a and the second stator 4b. As described earlier, electric machine windings (e.g., a first winding 2118a, a second winding 2118b, a third winding 2118c, or more or fewer windings) are wrapped within the slots formed in each stator. Electrical power applied to the electric machine windings produces electrical fields in the stator sub-assemblies that act against the first magnetic section 2014a to result in a net torque in the first rotor 1804a causing a rotation which, in turn, causes the fluid to be driven in the space between the rotor vanes and the stator vanes. Conversely, flowing the fluid in the space between the rotor vanes and the stator vanes causes the first rotor 1804a to rotate which, in turn, generates electrical power.

In some implementations, the space between the stator vanes has a sealing can to prevent back flow within the blower system. The space has a clearance between rotating and non-rotating parts. For example, the space can be substantially 0.020 inches. The sealing can is a non-metallic part that can prevent eddy current losses due to heat from the electric machine windings. The blower system 1800 can include multiple stators and rotors arranged in stages as described above. Lead wires can be connected in series or parallel for each stage and linked together to form a uniform blower system that can be driven by a single variable speed drive (VSD).

Figure 22:
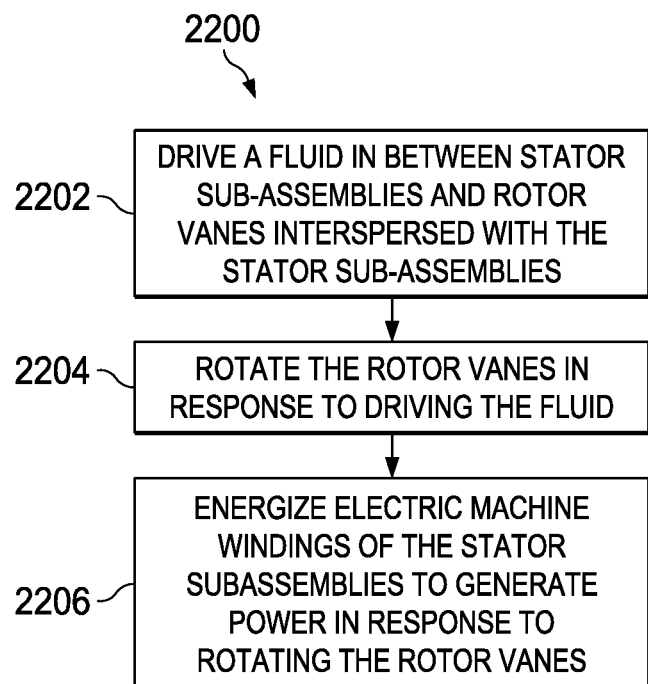
FIG. 22 is a flowchart of an example of a process for operating an integrated blower system.

FIG. 22 is a flowchart of an example of a process 2200 for operating an integrated blower system, for example, the blower system 1800. The process 2200 can be implemented to generate power by operating the integrated blower system 1800 in a generator mode. As described above, the blower system 1800 can include electric stator components and fluidic stator components interspersed with the electric stator components. The electric stator components can include multiple stator sub-assemblies and multiple electric machine windings attached to the multiple stator sub-assemblies to produce magnetic fields in the multiple stator sub-assemblies. The fluidic stator components can include multiple stator vanes formed in the multiple stator sub-assemblies, and multiple slots formed in the respective multiple stator sub-assemblies. Each slot is formed as an angled vane configured to drive the fluid.

The blower system 1800 can include a rotor carried to rotate within the stator. The rotor can include electric rotor components and fluidic rotor components interspersed with the electric rotor components. The fluidic rotor components include multiple vane sections carried to rotate about the longitudinal axis. Each rotor vane is designed, arranged and configured to drive the fluid. The electric rotor components can include multiple magnetic sections arranged between the multiple vane sections, each configured to produce magnetic fields in the multiple stator sub-assemblies.

At 2202, a fluid can be driven between the stator and the rotor. For example, the blower system 1800 can be positioned in a wellbore at a depth from the surface. Production fluids that flow through the wellbore can be driven between the stator and the rotor, for example, between the fluidic stator components (e.g., the stator sub-assemblies) and the fluidic rotor components (e.g., the rotor vanes).

At 2204, the rotor vanes can be rotated in response to driving the fluid. For example, the rotor and the stator can be arranged to compressively drive the production fluid through the blower system 1800. As the production fluid flows between the rotor and the stator, the rotor vanes rotate. In some implementations, the pressure of the wellbore alone can be sufficient to drive the production fluid through the blower system 1800. In some implementations, a top-side compressor can assist driving the production fluid through the blower system.

At 2206, the electric machine windings of the stator sub-assemblies are energized to generate power in response to rotating the rotor vanes. As described above, a rotation of the rotor vanes causes a rotation of the magnetic sections, which, in turn, generate an electric field in the electric machine windings thereby generating electrical power. In implementations in which magnetic bearings are used to rotate the rotor within the stator, all or portions of the generated electrical power can be used power the magnetic bearings.

The process 2200 was described in the context of implementing the blower system 1800 in a generator mode in a wellbore. Alternatively, the blower system 1800 can be implemented as a compressor outside a wellbore or outside a well system. Also, the blower system 1800 can be implemented in a motor mode as a pump, e.g., a turbo-molecular pump, to drive fluid. For example, a fluid can be flowed to one end (e.g., an inlet end) of the blower system 1800. The electric machine windings can be energized, for example, by providing electrical power to the windings. The electric field generated by the windings can interact with the magnetic fields of the permanent magnet to induce a torque that rotates the rotor core. In response, the rotor vanes can drive the fluid between the rotor and the stator.

In some implementations, one or more of the stators in the blower system 1800 can be implemented for on-board power generation for auxiliaries in the blower, providing a local power source for the blower system 1800 at a specific voltage that is different from the VSD power driving the blower system 1800. Heat from the electric machine can be carried away from the blower system 1800 directly to the fluid to maintain motor operating temperatures as well as heating the fluid for reduced instance of condensate formation in the wellbore. In this manner, the likelihood of the condensate blocking fluid flow can be minimized or eliminated.

Alternatively or in addition to any of the implementations described in this specification, a seal can be deployed around a blower of the downhole blower system 124 positioned downhole in a wellbore. As described above, a hydrocarbon wellbore (e.g., a gas wellbore or other hydrocarbon wellbore) can benefit from a blower deployed in the wellbore, for example, deep within the wellbore, to help lift the hydrocarbons to the surface. To improve efficiency, the wellbore can be sealed around the blower to limit or prevent recirculation in the wellbore around the blower. The blower can also be anchored to the wellbore to prevent the blower from rotating. Techniques described in this disclosure can be implemented to seal or anchor (or both) a blower in the wellbore.

Figure 23A:
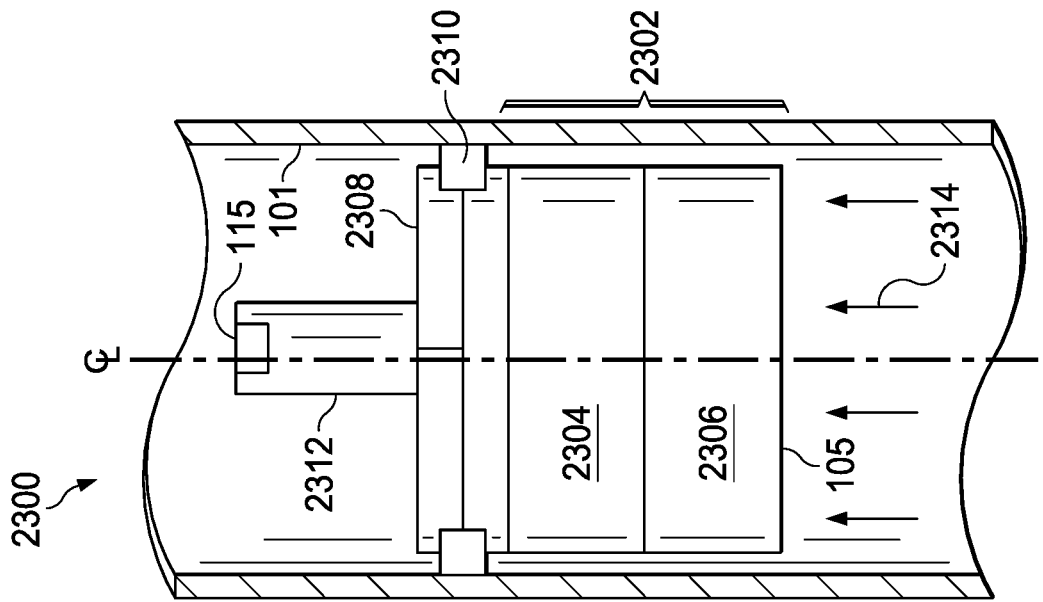
FIG. 23A is a schematic diagram of a wellbore in which a blower system is disposed downhole.

FIG. 23A is a schematic diagram of a wellbore 2300 in which a blower system 2302 (similar or identical to the downhole-type blower system 124) is disposed downhole. The blower system 2302 resides inside (for example, deep within) the wellbore 2300. The blower system 2302 includes a blower 2304 fluidly coupled to the wellbore 2300. The blower 2304 assists production of hydrocarbons from a bottom of the wellbore to the surface. In some implementations, the blower 2304 creates a pressure differential within the wellbore 2300 to assist flow of the hydrocarbons in an uphole direction.

The blower 2304 can be coupled to (for example, electrically or mechanically or both) an electric machine 2306 (e.g., a motor, a generator, a motor-generator or other electric machine) that can operate in either a generator mode or a motor mode. In a generator mode, the electric machine 2306 receives energy (e.g., rotational energy of the compressor vanes, mechanical energy of compressed fluid, other energy or combinations of them) from the blower 2304 and converts the energy into electrical energy or power. In a motor mode, the electric machine 2306 provides electrical energy to power the blower 2304.

Production fluids 2314, e.g., hydrocarbons, gas or combinations of them, can flow through the wellbore 2300 in an uphole direction, i.e., from a downhole location toward the surface. With reference to the uphole direction of flow of the production fluids 2314, the electric machine 2306 can be positioned upstream of the blower 2304. The outlet to the blower 2304 can be positioned upstream of the blower 2304.

A seal assembly 2308 can be coupled to the blower system 2302. The seal assembly 2308 can include a seal 2310 that can seal an outer surface 105 of the blower system 2302 to an inner surface 101 of the wellbore 2300. In FIG. 23A, the seal 2310 is shown in a compressed state before being energized. The seal 2310 can be in the compressed state when deployed. For example, the seal assembly 2308, with the seal 2310 in the compressed state, can be coupled to the blower system 2302 at the surface. When disposed in the wellbore 2300, the seal assembly 2308 can be downstream of the blower 102.

An electromagnetic actuator 2312 (e.g., a solenoid) is coupled to the seal assembly 2308, for example, to the seal 2310. The electromagnetic actuator 2312 can receive power and responsively deploy the seal 2310 to seal the outer surface 105 of the blower system 2302 with the inner surface 101 of the wellbore 2300. In some implementations, the electromagnetic actuator 2312 can receive power through a power input port 115 coupled to the electromagnetic actuator 2312.

At the power input port 115, the electromagnetic actuator 2312 and the electric machine 2306 can be electrically connected in parallel. In such implementations, each of the electromagnetic actuator 2312 and the electric machine 2306 can receive power, simultaneously or at separate times, from a power source (not shown) disposed within or outside the wellbore 2300. The power input port 115 can be electrically connected to the power source and can transmit power from the power source to the electric machine 2306 or the electromagnetic actuator 2312 or both. The electromagnetic actuator 2312 can deploy the seal 2310 in response to receiving the power from the power source.

Alternatively, at the power input port 115, the electromagnetic actuator 2312 and the electric machine 2306 can be connected in series. In such implementations, the electromagnetic actuator 2312 can receive power from the electric machine 2306 to deploy the seal 2310. For example, when the electric machine 2306 is operated in the motor mode, the electric machine 2306 can transmit power to the blower 2304 to operate the blower 2304. Alternatively or additionally, the electric machine 2306 can transmit power to the electromagnetic actuator 2312, which can deploy the seal 2310 in response to receiving the power from the electric machine 2306.

In some implementations, the electromagnetic actuator 2312 can receive power from the electric machine 2306 operating in the generator mode. For example, in the generator mode, the electric machine 2306 can generate power in response to production fluids 2314 flowing through the blower 2304. In such implementations, the power input port 115 can receive a portion of the power generated by the electric machine 2306. Using the received power, the electromagnetic actuator 2312 can deploy the seal 2310.

Figure 23B:
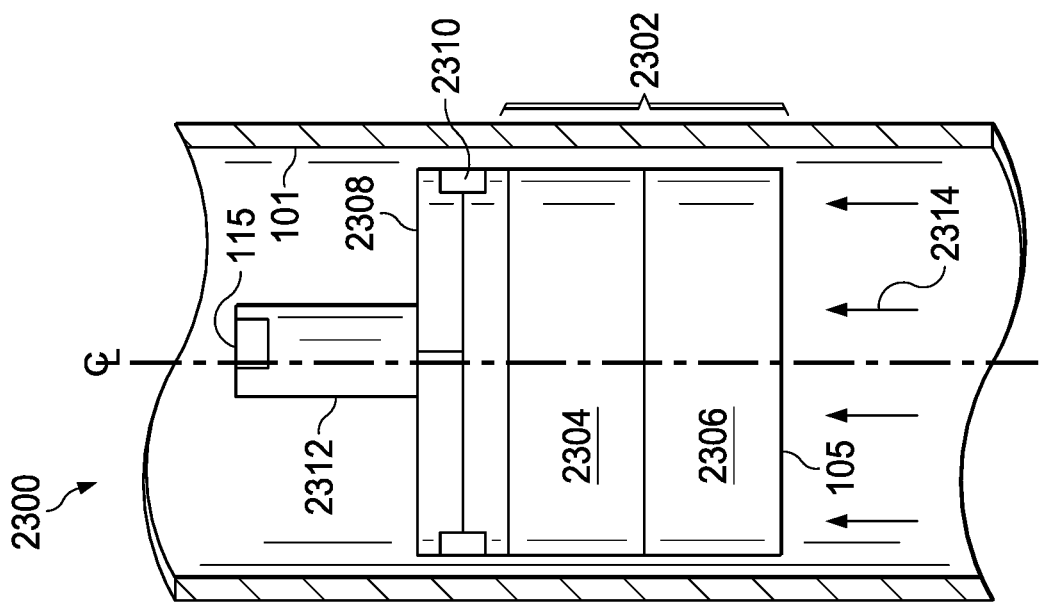
FIG. 23B is a schematic diagram of the wellbore in which the seal has been energized in response to receiving power from the electromagnetic actuator.

FIG. 23B is a schematic diagram of the wellbore 2300 in which the seal 2310 has been energized in response to receiving power from the electromagnetic actuator 2312. As described above, the seal 2310 seals the outer surface 105 of the blower system 2302 to the inner surface 101 of the wellbore. Doing so can prevent recirculation of the production fluids 2314 in the wellbore 2300 around the blower 2304. Alternatively or in addition, the seal 2310 can anchor the blower 2304 in the wellbore 2300 to prevent rotation of the blower 2304 in the wellbore 2300.

Figure 24:
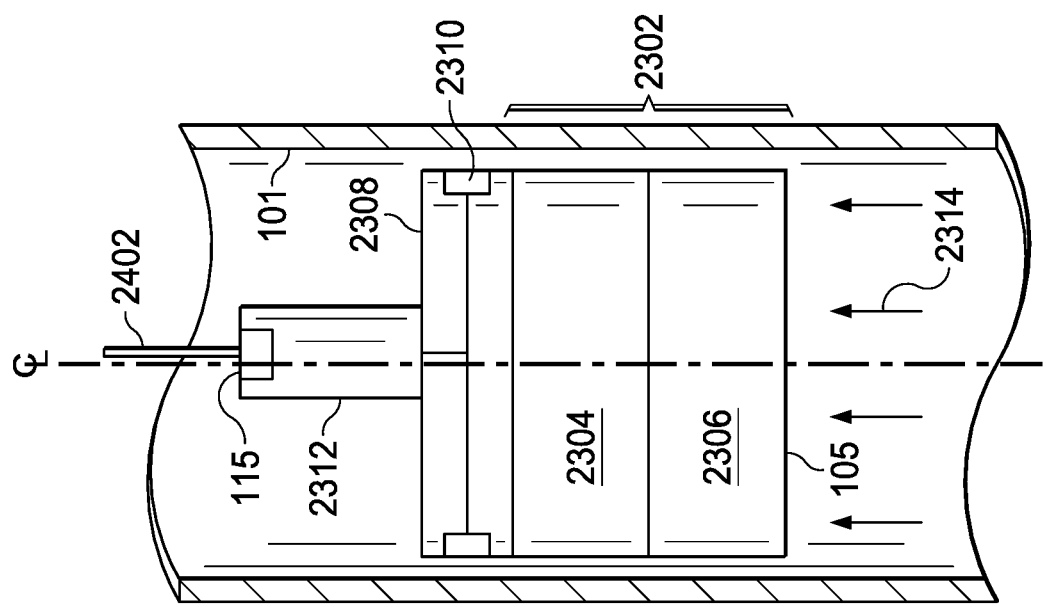
FIG. 24 is a schematic diagram of the blower system, the seal assembly and the electromagnetic actuator being deployed in the wellbore.

FIG. 24 is a schematic diagram of the blower system 2302, the seal assembly 2308 and the electromagnetic actuator 2312 being deployed in the wellbore 2300. In some implementations, a sub-assembly including the blower system 2302, the seal assembly 2308 and the electromagnetic actuator 2312 can be coupled to each other at the surface and lowered into the wellbore 2300 to a downhole location. The wellbore conditions (e.g., pressure, temperature, or other wellbore conditions) at the downhole location are different from corresponding conditions at a surface of the wellbore 2300. Moreover, the downhole location is significantly nearer a bottom of the wellbore 2300 compared to a top of the wellbore 2300. The sub-assembly can be lowered to the downhole location using a wireline 2402. The wireline 2402 can be flexible and have sufficient mechanical strength to carry the weight of the sub-assembly and additional components used to lower the sub-assembly to the downhole location. The wireline 2402 can be braided into an integral electrical cable as a combined power delivery and mechanical suspension device. In some implementations, the wireline 2402 can be coupled to the power input port 115 to deliver power to the port 115. For example, power from the power source can be transmitted to the power input port 115 through the wireline 2402. In some implementations, the wireline 2402 can be disconnected from the sub-assembly after the seal 2310 has been energized. In such implementations, an electrical power line (not shown) can be coupled to the power input port 115 to provide power to actuate the electromagnetic actuator 2312. Alternatively, power can be provided using techniques similar to those described above negating the need for the electrical power line.

Figure 25:
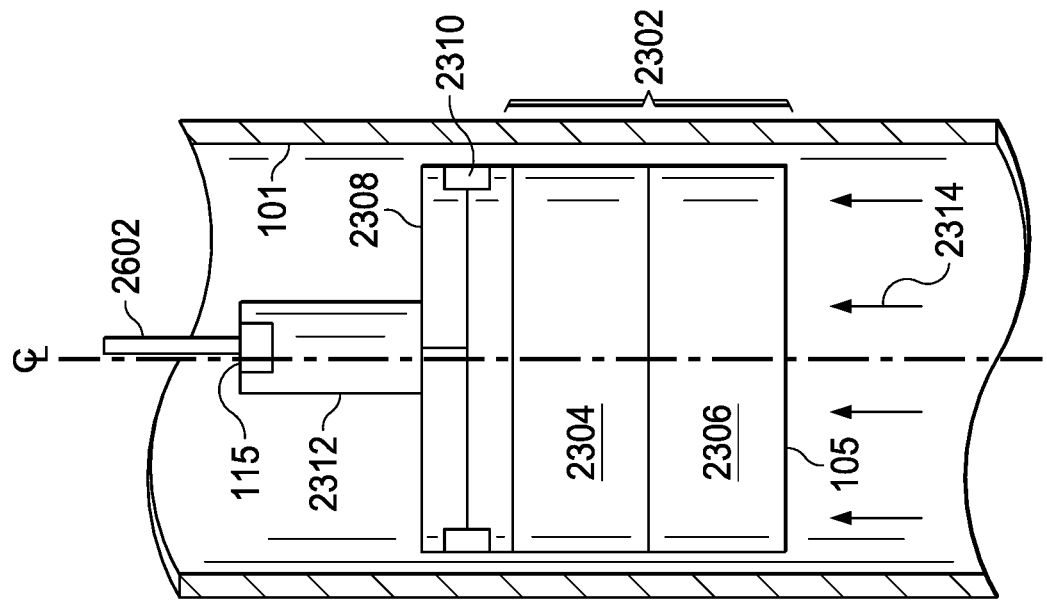
FIG. 25 is a schematic diagram of the blower system, the seal assembly and the electromagnetic actuator being deployed in the wellbore.
Figure 26:
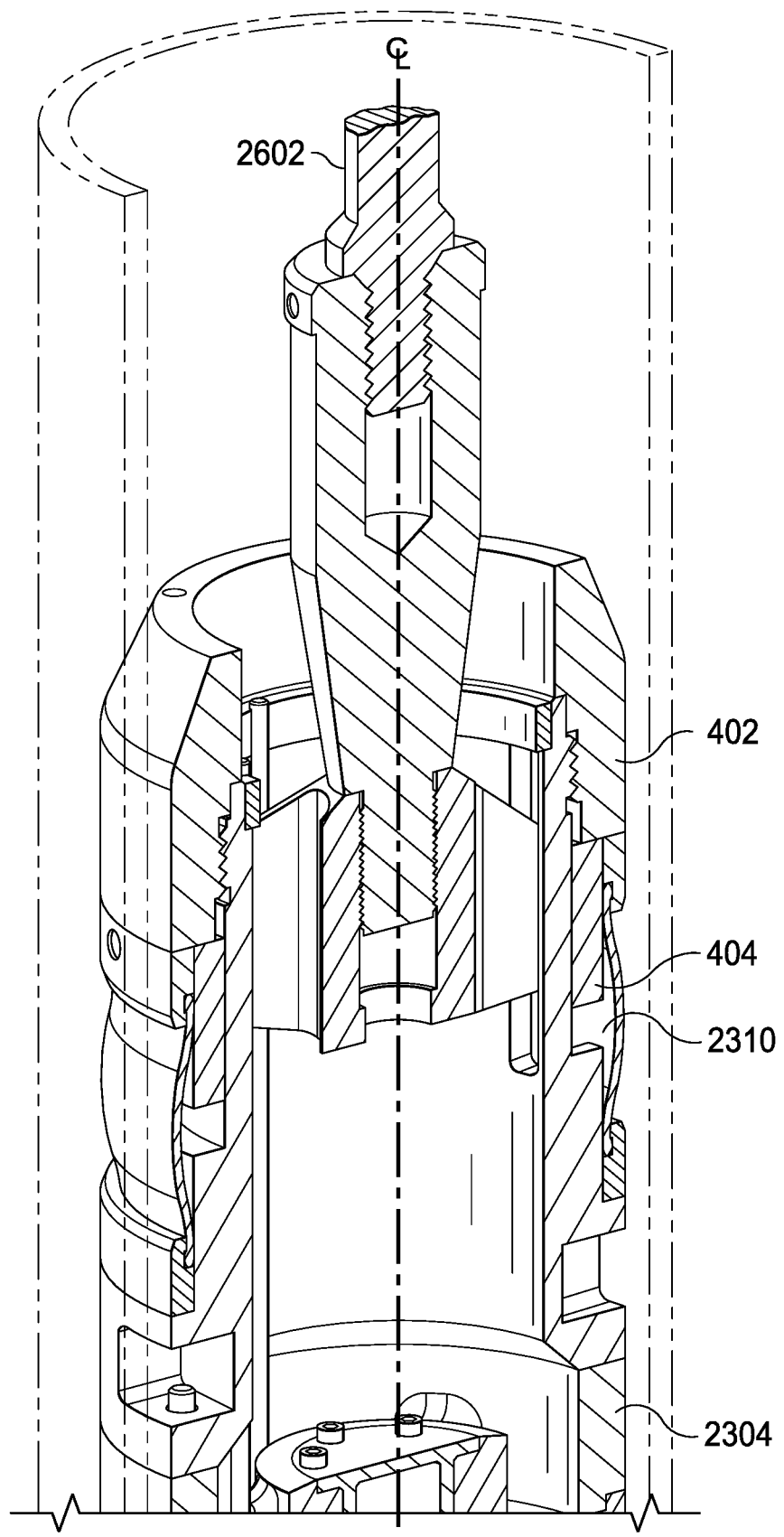
FIG. 26 is a schematic diagram of a cross-sectional view of the sucker rod carrying the sub-assembly.

FIG. 25 is a schematic diagram of the blower system 2302, the seal assembly 2308 and the electromagnetic actuator 2312 being deployed in the wellbore 2300. In some implementations, the sub-assembly including the blower system 2302, the seal assembly 2308 and the electromagnetic actuator 2312 can be lowered to the downhole location using one or more sucker rods (e.g., sucker rod 2602). FIG. 26 is a schematic diagram of a cross-sectional view of the sucker rod 2602 carrying the sub-assembly. The blower system 2302 (blower 2304 shown in FIG. 26) hangs from a downhole end of the sucker rod 2602 and stretches the seal 2310 flat. A collar stop 402 prevents the seal 2310 from overstretching. To compress the seal, the blower system 2302 is designed to sit on the collar-stop 402 that is locked into a recess formed between two ends of casing pipe. When the blower system 104 sits down onto the collar stop 404, the weight of the sucker rod 2602 (and other sucker rods connected to the sucker rod 2602) slides a slider 404 in the downhole direction to compress the seal 2310 axially and against the inner surface 101 of the wellbore 2300. In some implementations, an electrical power line (not shown) can be coupled to the power input port 115 to provide power to actuate the electromagnetic actuator 2312. The one or more sucker rods can be disconnected from the sub-assembly after the seal 2310 has been energized. The electrical power line (not shown) can remain coupled to the power input port 115 to provide power to actuate the electromagnetic actuator 2312. Alternatively, power can be provided using techniques similar to those described above negating the need for the electrical power line.

Figure 27:
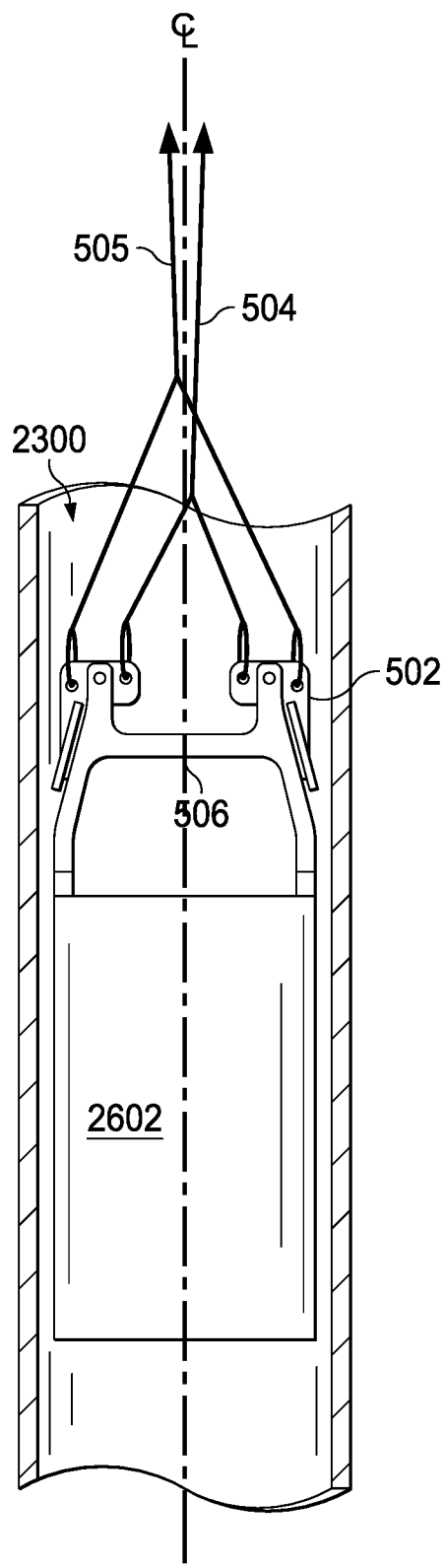
FIG. 27 is a schematic diagram of a seal being deployed using brake shoes.
Figure 28:
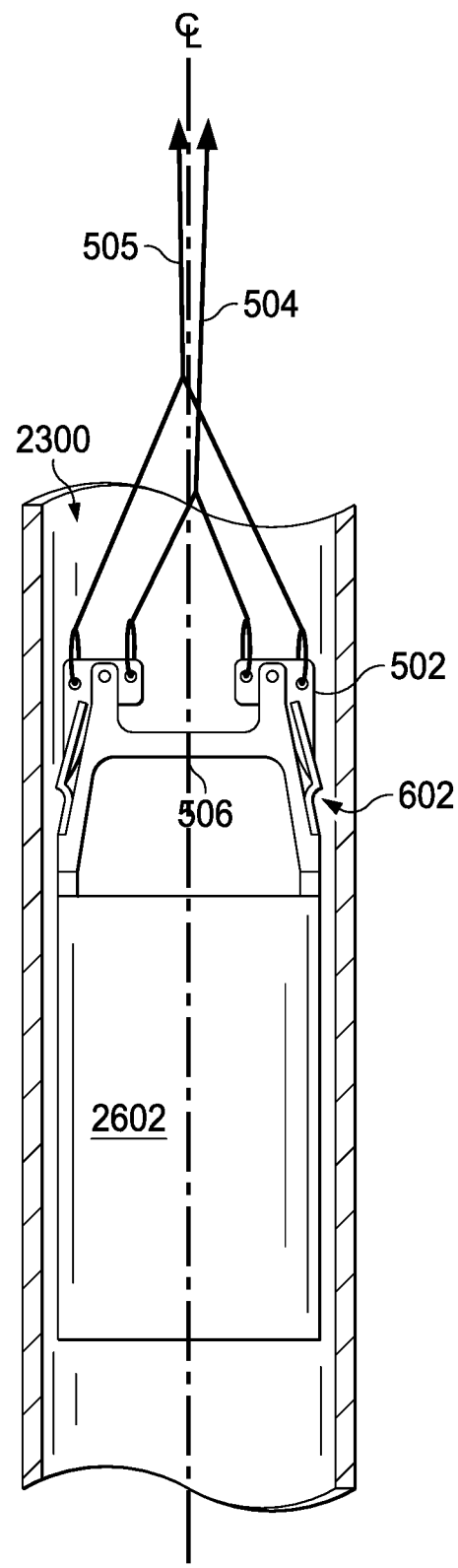
FIG. 28 is a schematic diagram of the seal being deployed using other techniques.

In the example techniques described above, the seal 2310 was deployed in response to transmitting power to the electromagnetic actuator 2312 (e.g., a solenoid). In some implementations, a seal, e.g., the seal 2310, coupled to a blower system, e.g., the blower system 2302, can be deployed using other techniques. FIG. 27 is a schematic diagram of a seal being deployed using brake shoes. The uphole end of the blower system 2302 can be coupled to braking shoe levers 502 that are also coupled to a first wireline 504 that is used to deploy the blower system 2302 into the wellbore 2300. The uphole end is also coupled to a second wireline 505 that is used to pull or retract braking shoes attached to the braking shoe levers 502 into the inner diameter of the wellbore 2300. The braking shoes seal and anchor the blower system 2302 to the wellbore 2300. The geometry of the braking shoe levers 502 can be tuned to have a machine weight that can self-energize the braking shoe levers 502 in the wellbore 2300. A hookable grab bar 506 can be disposed between the braking shoe levers 502 and the blower system 2302 as a redundant retrieval feature. FIG. 28 is a schematic diagram of the seal being deployed using other techniques. Similar to FIG. 27, the uphole end of the blower system 2302 can be coupled to braking shoe levers 502 that are also coupled to the second wireline 505. In addition, levers 602 can be attached to an elastomeric sealing skirt for both traction and sealing.

Figure 29A:
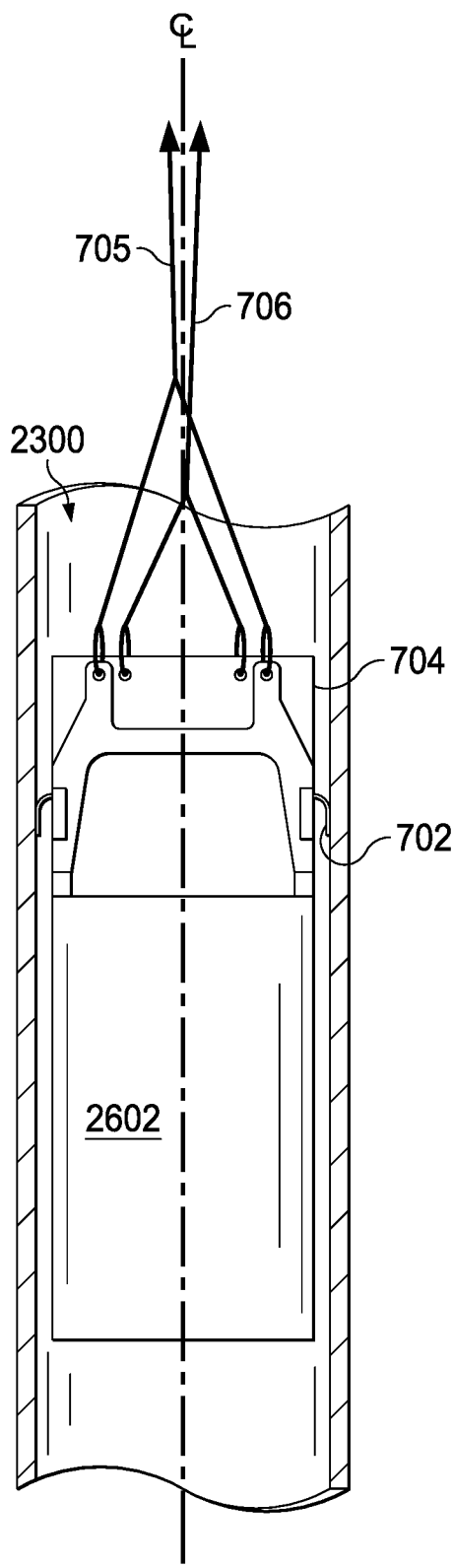
FIG. 29A and FIG. 29B are schematic diagrams of a seal being deployed using other techniques.
Figure 29B:
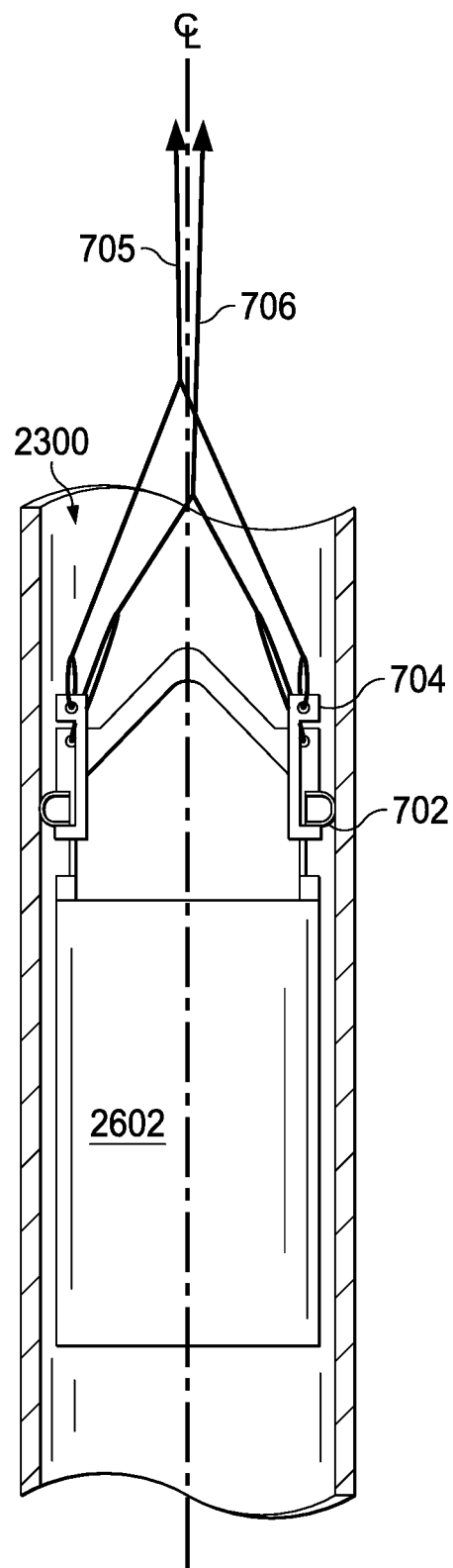

FIG. 29A is a schematic diagram of a seal being deployed using other techniques. The uphole end of the blower system 2302 can be coupled to a seal ring 702 that can initially be compressed. A sleeve 704 can keep the seal ring 702 compressed during deployment. A sub-assembly including the seal ring 702 and the blower system 2302 can be deployed using a wireline that can lower the sub-assembly to the downhole location. A first wireline 705 can be rigidly mounted to the blower 2304 to deploy or retrieve the blower system 2302. A second wireline 706 can raise the sleeve 704 to uncover the compressed seal ring 702, which can then expand (as shown in in FIG. 29B) and push against the inner surface 101 of the wellbore 2300. When the tension in the second wireline 706 is lowered and that in the first wireline 705 is increased, the seal relaxes and the compressed seal ring 702 lowers allowing the sub-assembly to be retrieved.

Figure 30:
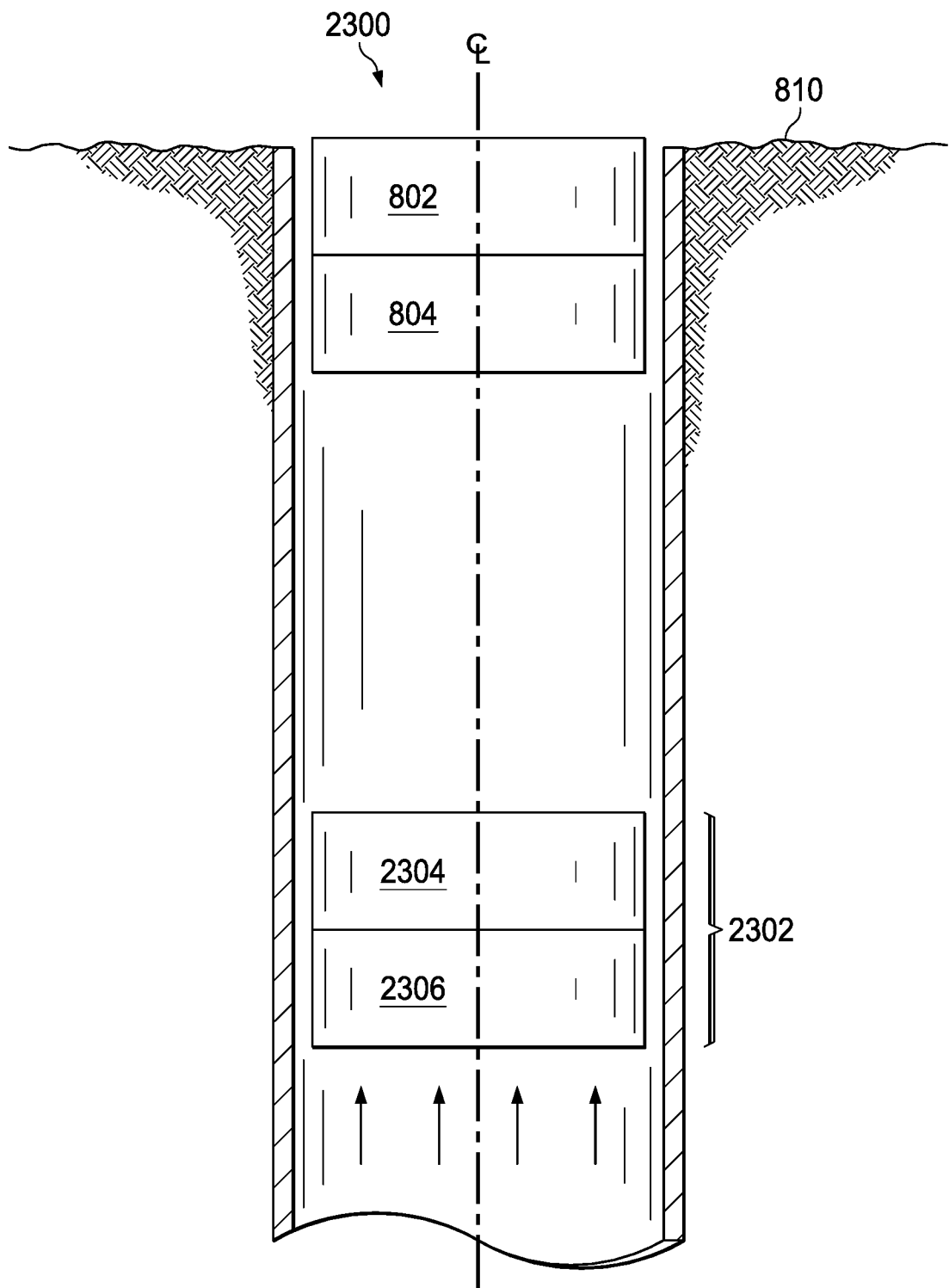
FIG. 30 is a schematic diagram of the wellbore in which an uphole blower system is disposed uphole of the downhole blower system.

FIG. 30 is a schematic diagram of the wellbore 2300 in which an uphole blower system is disposed uphole of the downhole blower system 2302. The uphole blower system resides for example, at or near the surface 810 of the wellbore 2300. The uphole blower system includes an uphole blower 804 fluidly coupled to the wellbore 2300. The uphole blower 804 assists production of hydrocarbons from a bottom of the wellbore to the surface. In some implementations, the uphole blower 804 and the downhole blower 2304 cooperate to create a pressure differential within the wellbore 2300 to assist flow of the hydrocarbons in the uphole direction.

The uphole blower 804 can be coupled to (for example, electrically or mechanically or both) an uphole electric machine 806 (e.g., a motor, a generator, a motor-generator or other electric machine) that can operate in either a generator mode or a motor mode. In a generator mode, the uphole electric machine 806 receives energy (e.g., rotational energy of the compressor vanes, mechanical energy of compressed fluid, other energy or combinations of them) from the uphole blower 804 and converts the energy into electrical energy or power. In a motor mode, the uphole electric machine 806 provides electrical energy to power the uphole blower 2304.

In some implementations, the electromagnetic actuator 2312 can receive all or portion of the power needed to deploy the seal 2310 from the uphole electric machine 804. For example, the electromagnetic actuator 2312 can receive power from the uphole electric machine 806 operating in the generator mode. In the generator mode, the uphole electric machine 806 can generate power in response to production fluids 2314 flowing through the uphole blower 804. In such implementations, the power input port 115 can receive a portion of the power generated by the uphole electric machine 806. Using the received power, the electromagnetic actuator 2312 can deploy the seal 2310. In another example, when the uphole electric machine 806 is operated in the motor mode, the uphole electric machine 806 can transmit power to the uphole blower 804 to operate the uphole blower 804. Alternatively or additionally, the uphole electric machine 806 can transmit power to the electromagnetic actuator 2312, which can deploy the seal 2310 in response to receiving the power from the uphole electric machine 806.

Figure 31:
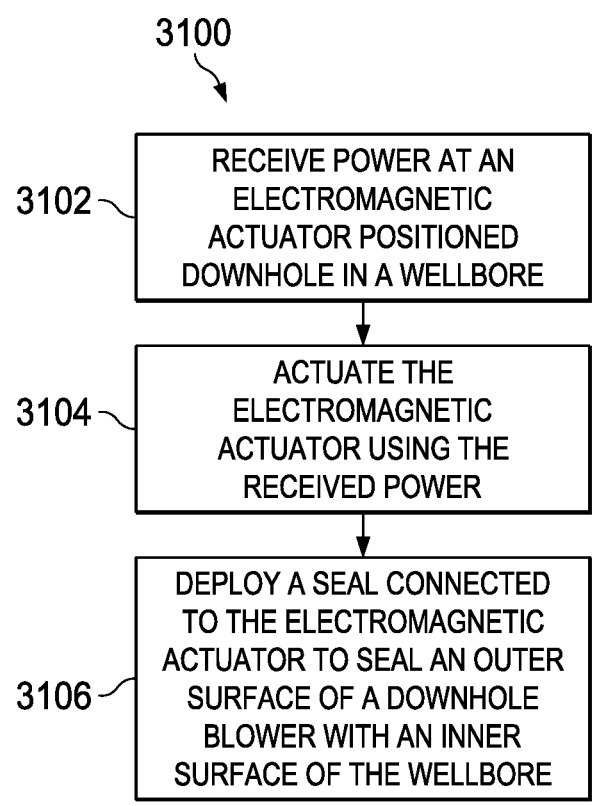
FIG. 31 is a flowchart of an example of a process for deploying a seal surrounding a downhole blower system.

FIG. 31 is a flowchart of an example of a process 3100 for deploying a seal surrounding a downhole blower system. At 3102, power is received at an electromagnetic actuator positioned downhole in a wellbore. For example, the seal 2310 is attached to the outer surface 105 of the downhole blower system (e.g., a downhole gas blower). The electromagnetic actuator 2312 is connected to the seal 2310 that can seal the outer surface 105 of the downhole blower system 2302 to the inner surface 101 of the wellbore 2300. The blower system 2302 with the seal 2310 and the electromagnetic actuator 2312 is deployed in the wellbore 2300. At 3104, the electromagnetic actuator is actuated using the received power. For example, the electromagnetic actuator 2312 is actuated using power received using one or more of the power transmission techniques described above. At 3106, a seal connected to the electromagnetic actuator is deployed. For example, the seal 2310 is deployed to seal the outer surface 105 of the blower system 2302 with the inner surface 101 of the wellbore 2300. Doing so can prevent recirculation of production fluids 2314 through the wellbore or prevent rotation of the blower 2304 within the wellbore 2300 or both.

The techniques described here can be implemented to yield a construction that is simply, inexpensive, and physically robust. The blower system can be deployed without special hydraulic or electrical requirements and can be easily retrievable with minimum or no risk of being stuck in the wellbore. The concepts described herein with respect to a blower could also be applied to a compressor having a higher pressure ratio and lower throughput.

A number of implementations have been described. Nevertheless, it will be understood that various modifications may be made. Accordingly, other implementations are within the scope of the following claims.

What is claimed is:

1. A downhole-type blower system comprising:
a blower configured to be positioned in a wellbore, the blower configured to rotatably drive or be driven by fluid produced through the wellbore;
an electric machine configured to be positioned downhole of the blower, the electric machine configured to rotatably drive or be driven by the blower;
a bearing shaft coupling the blower and the electric machine, the bearing shaft configured to transfer rotation between the blower and the electric machine; and
a passive magnetic radial bearing assembly configured to magnetically support the bearing shaft and comprising a passive magnetic radial bearing, the passive magnetic radial bearing comprising electrically conductive, non-magnetic stator spacers between stator magnets of the passive magnetic radial bearing, and comprising a protective can or a sleeve, the passive radial magnetic bearing configured to dampen vibrations.

2. The downhole-type blower system of claim 1, wherein the bearing shaft is made from a non-magnetic material.

3. The downhole-type blower system of claim 1, wherein the bearing shaft comprises a shaft magnet assembly comprising a plurality of axially-magnetized magnets.

4. The downhole-type blower system of claim 3, wherein the plurality of axially-magnetized magnets are radially imbedded into the bearing shaft.

5. The downhole-type blower system of claim 3, wherein the plurality of axially-magnetized magnets are arranged so that magnet polarities alternate along an axis of the bearing shaft.

6. The downhole-type blower system of claim 3, wherein an exterior surface of the shaft magnet assembly is substantially flush with an outer surface of the bearing shaft.

7. The downhole-type blower system of claim 3, wherein the passive magnetic radial bearing comprises a stator magnet assembly comprising the stator magnets and stator spacers, the stator magnet assembly surrounding the bearing shaft.

8. The downhole-type blower system of claim 7, wherein identical poles of the stator magnets and the plurality of axially-magnetized magnets are substantially in line with one another.

9. The downhole-type blower system of claim 7, wherein the stator magnets are separated from each other by the stator spacers, and the plurality of axially-magnetized magnets are separated from each other by a second plurality of spacers.

10. The downhole-type blower system of claim 9, wherein the second plurality of spacers are non-magnetic and electrically non-conductive.

11. The downhole-type blower system of claim 1, wherein the passive magnetic radial bearing assembly is a first passive magnetic radial bearing assembly, and wherein the downhole-type blower system further comprises a plurality of passive magnetic radial bearing assemblies configured to magnetically support the bearing shaft, the plurality of passive magnetic radial bearing assemblies comprising the first passive magnetic radial bearing assembly.

12. The downhole-type blower system of claim 11, further comprising an active damper coupled to the bearing shaft, the active damper configured to damp a vibration of the bearing shaft responsive to transferring the rotation between the blower and the electric machine.

13. The downhole-type blower system of claim 12, wherein the active damper comprises:
a damper magnet coupled to the bearing shaft, the damper magnet positioned between the plurality of passive magnetic radial bearing assemblies, wherein the vibration of the bearing shaft induces an induced vibration in the damper magnet;
a first damper magnet pole shoe and a second damper magnet pole shoe coupled to a first pole and a second pole, respectively of the damper magnet, the first damper magnet pole shoe and the second damper magnet pole shoe configured to maintain uniformity of magnetic fields generated by the damper magnet; and
a damper sleeve positioned over outer diameters of the damper magnet, the first damper magnet pole shoe and the second damper magnet pole shoe.

14. The downhole-type blower system of claim 13, further comprising:
a plurality of radial velocity sensing coils placed in a plane adjacent to the first damper magnet pole shoe and coupled to the first pole of the damper magnet, the plurality of radial velocity sensing coils configured to be exposed to a magnetic field emanated from the first pole of the damper magnet, wherein a radial movement of the damper magnet induces an electrical voltage in the plurality of radial velocity sensing coils.

15. The downhole-type blower system of claim 14, wherein the damper magnet is a first damper magnet facing the plurality of radial velocity sensing coils with the first pole, and wherein the system further comprises a second damper sensing magnet positioned axially opposite the plurality of radial velocity sensing coils and oriented to face the plurality of radial velocity sensing coils with a pole opposite the first pole.

16. The downhole-type blower system of claim 14, further comprising:
a plurality of radial damper actuator coils placed in a second plane adjacent to the second damper magnet pole shoe and coupled to a second pole of the damper magnet, the plurality of radial damper actuator coils configured to be exposed to a magnetic field emanated from the second pole of the damper magnet, wherein an electrical current in the plurality of radial damper actuator coils causes a force to be exerted on the damper magnet.

17. The downhole-type blower system of claim 16, wherein the damper magnet is a first damper magnet facing the plurality of radial damper actuator coils with the second pole, and wherein the system further comprises a second damper sensing magnet positioned axially opposite the plurality of radial damper actuator coils and oriented to face the plurality of radial damper actuator coils with a pole opposite the second pole.

18. The downhole-type blower system of claim 16, further comprising:
a first printed circuit board (PCB) comprising the plurality of radial velocity sensing coils; and
a second printed circuit board (PCB) comprising the plurality of radial damper actuator coils.

19. The downhole-type blower system of claim 1, wherein the passive magnetic radial bearing comprises the protective can to cover an inner diameter of the stator magnets and stator spacers, and comprises the sleeve to cover an outer diameter of the bearing shaft adjacent to the protective can.

* * * * *